United States Patent
Wade et al.

(10) Patent No.: US 11,413,565 B2
(45) Date of Patent: Aug. 16, 2022

(54) METAL-ORGANIC FRAMEWORKS CONTAINING METAL-HYDROXIDE MOIETIES AND METHODS OF MAKING AND USING THEREOF

(71) Applicant: Ohio State Innovation Foundation, Columbus, OH (US)

(72) Inventors: Casey Wade, Dublin, OH (US); Caitlin Bien, Columbus, OH (US); Zhongzheng Cai, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/251,498

(22) PCT Filed: Jun. 11, 2019

(86) PCT No.: PCT/US2019/036597
§ 371 (c)(1),
(2) Date: Dec. 11, 2020

(87) PCT Pub. No.: WO2019/241281
PCT Pub. Date: Dec. 19, 2019

(65) Prior Publication Data
US 2021/0138385 A1      May 13, 2021

Related U.S. Application Data

(60) Provisional application No. 62/683,128, filed on Jun. 11, 2018.

(51) Int. Cl.
*B01D 53/02* (2006.01)
*B01J 20/22* (2006.01)

(52) U.S. Cl.
CPC ............ *B01D 53/02* (2013.01); *B01J 20/226* (2013.01); *B01D 2253/204* (2013.01); *B01D 2257/302* (2013.01); *B01D 2257/404* (2013.01); *B01D 2257/504* (2013.01); *B01D 2257/7022* (2013.01); *B01D 2259/40088* (2013.01)

(58) Field of Classification Search
CPC ...... B01D 2257/404; B01D 2259/4575; B01D 2257/302; B01D 2253/204; B01D 2257/7022; B01D 2258/06; B01D 53/0462; B01D 2259/40088; B01D 2259/4566; B01D 53/02; B01D 2257/504; B01D 2258/0283; B01J 20/3433; B01J 20/226; B01J 20/3085; B01J 20/3483; Y02C 20/40
See application file for complete search history.

(56) References Cited

U.S. PATENT DOCUMENTS

| | | | | |
|---|---|---|---|---|
| 9,662,632 B1 | * | 5/2017 | Allendorf | ............... B01D 53/02 |
| 2013/0131344 A1 | * | 5/2013 | Yaghi | .................. B01J 31/181 |
| | | | | 546/2 |
| 2015/0047505 A1 | | 2/2015 | Schroder et al. | |
| 2018/0361370 A1 | * | 12/2018 | Lin | ...................... B01J 31/2208 |

FOREIGN PATENT DOCUMENTS

| | | |
|---|---|---|
| WO | 2017/184991 A1 | 10/2017 |
| WO | 2018/044874 A1 | 3/2018 |

OTHER PUBLICATIONS

International Search Report and Written Opinion issued by the International Searching Authority (ISA/US) in PCT Application No. PCT/US2019/036597 dated Oct. 9, 2019. 10 pages.

Bloch, Eric D., et al. "Metal insertion in a microporous metal-organic framework lined with 2, 2'-bipyridine." Journal of the American Chemical Society 132.41 (2010): 14382-14384.

Zhou, Tianhua, et al. "Post-synthesis modification of a metal-organic framework to construct a bifunctional photocatalyst for hydrogen production." Energy & Environmental Science 6.11 (2013): 3229-3234.

Darunte, Lalit A., et al. "Direct air capture of CO2 using amine functionalized MIL-101 (Cr)." ACS Sustainable Chemistry & Engineering 4.10 (2016): 5761-5768.

Demessence, Aude, et al. "Strong CO2 binding in a water-stable, triazolate-bridged metal-organic framework functionalized with ethylenediamine." Journal of the American Chemical Society 131.25 (2009): 8784-8786.

Denysenko, Dmytro, et al. "Postsynthetic Metal and Ligand Exchange in MFU-41: A Screening Approach toward Functional Metal-Organic Frameworks Comprising Single-Site Active Centers." Chemistry—A European Journal 21.22 (2015): 8188-8199.

Denysenko, Dmytro, et al. "Scorpionate-Type Coordination in MFU-41 Metal-Organic Frameworks: Small-Molecule Binding and Activation upon the Thermally Activated Formation of Open Metal Sites." Angewandte Chemie International Edition 53.23 (2014): 5832-5836.

(Continued)

*Primary Examiner* — Timothy C Vanoy
(74) *Attorney, Agent, or Firm* — Meunier Carlin & Curfman LLC

(57) ABSTRACT

Disclosed are MOFs containing nucleophilic transition metal hydroxide (M-OH) groups. In certain embodiments, these MOFs can include a plurality of metal ions, each coordinated with one or more hydroxide ligands and one or more backbone ligands. In certain embodiments, the MOFs can comprise Kuratowski cluster-based secondary building units (SBUs). These MOFs can exhibit excellent performance for low pressure $CO_2$ capture via a $CO_2/HCO_3^-$ fixation mechanism in which cooperative inter-cluster hydrogen bonding interactions enhance $CO_2$ capture performance. Also provided are methods of making MOFs including one or more metal hydroxide moieties, as well as methods of using these MOFs to capture an acidic gas (e.g., $CO_2$, $SO_2$, $NO_2$, or acetylene).

35 Claims, 24 Drawing Sheets

(56) References Cited

OTHER PUBLICATIONS

Ganguly, Sanjoy, Joel T. Mague, and D. Max Roundhill. "Formation of monometallic bis (bicarbonato) complexes of palladium (II) by the insertion of carbon dioxide into palladium (II)-hydroxide bonds." Inorganic Chemistry 31.18 (1992): 3831-3835.

Goeppert, Alain, et al. "Air as the renewable carbon source of the future: an overview of CO 2 capture from the atmosphere." Energy & Environmental Science 5.7 (2012): 7833-7853.

Huang, D., et al. "Rybak/Akimova EV, Holm RH." Proc. Natl. Acad. Sci. USA 108 (2011): 1222-1227.

Hwang, Tsang-Lin, and A. J. Shaka. "Water suppression that works. Excitation sculpting using arbitrary wave-forms and pulsed-field gradients." Journal of Magnetic Resonance, Series A 112.2 (1995): 275-279.

James, J. T.; Macatangay, A. NASA Tech. Rep. No. JSC-CN-18669, Carbon Dioxide—Our Common "Enemy" NASA/Johnson Sp. Center, Houston, TX, USA, 2009. (Presented Submar. Air Monit. Air Purif. Conf. Oct. 19-22, 2009, San Diego, CA.).

Jin, Chaonan, et al. "Mimic carbonic anhydrase using metal-organic frameworks for CO2 capture and conversion." Inorganic chemistry 57.4 (2018): 2169-2174.

Kumar, Amrit, et al. "Direct air capture of CO2 by physisorbent materials." Angewandte Chemie International Edition 54.48 (2015): 14372-14377.

Kumar, Amrit, et al. "Hybrid ultramicroporous materials (HUMs) with enhanced stability and trace carbon capture performance." Chemical Communications 53.44 (2017): 5946-5949.

Lee, Woo Ram, et al. "Diamine-functionalized metal-organic framework: exceptionally high CO 2 capacities from ambient air and flue gas, ultrafast CO 2 uptake rate, and adsorption mechanism." Energy & Environmental Science 7.2 (2014): 744-751.

Li, Hao, et al. "Incorporation of Alkylamine into metal-Organic frameworks through a brønsted acid-Base reaction for CO2 capture." ChemSusChem 9.19 (2016): 2832-2840.

Li, Jian-Rong, et al. "Carbon dioxide capture-related gas adsorption and separation in metal-organic frameworks." Coordination Chemistry Reviews 255.15-16 (2011): 1791-1823.

Liao, Pei-Qin, et al. "Monodentate hydroxide as a super strong yet reversible active site for CO 2 capture from high-humidity flue gas." Energy & Environmental Science 8.3 (2015): 1011-1016.

Liao, Pei-Qin, et al. "Putting an ultrahigh concentration of amine groups into a metal-organic framework for CO 2 capture at low pressures." Chemical science 7.10 (2016): 6528-6533.

Lindskog, Sven. "Structure and mechanism of carbonic anhydrase." Pharmacology & therapeutics 74.1 (1997): 1-20.

Lohr, Tracy L., Warren E. Piers, and Masood Parvez. "Reversible insertion of carbon dioxide into Pt (II)-hydroxo bonds." Dalton transactions 42.41 (2013) 14742-14748.

Looney, Adrian, et al. "Tris (pyrazolyl) hydroboratozinc hydroxide complexes as functional models for carbonic anhydrase: on the nature of the bicarbonate intermediate." Journal of the American Chemical Society 115.11 (1993): 4690-4697.

Madden, David G., et al. "Flue-gas and direct-air capture of CO2 by porous metal-organic materials." Philosophical Transactions of the Royal Society A: Mathematical, Physical and Engineering Sciences 375.2084 (2017): 20160025.

Martínez-Prieto, Luis Miguel, et al. "Reversible Reactions of Ni and Pd Hydroxo Pincer Complexes [(iPrPCP) M—OH] with CO2: Solid-State Study of the Decarboxylation of the Monomeric Bicarbonate Complexes [(iPrPCP) M—OCOOH](M= Ni, Pd)." European Journal of Inorganic Chemistry 2013.32 (2013): 5555-5566.

Mason, Jarad A., et al. "Evaluating metal-organic frameworks for post-combustion carbon dioxide capture via temperature swing adsorption." Energy & Environmental Science 4.8 (2011): 3030-3040.

McDonald, Thomas M., et al. "Capture of carbon dioxide from air and flue gas in the alkylamine-appended metal-organic framework mmen-Mg2 (dobpdc)." Journal of the American Chemical Society 134.16 (2012): 7056-7065.

Nakamoto, Kazuo, Y. Anantarama Sarma, and Hisanobu Ogoshi. "Normal Coordinate Analyses of Hydrogen-Bonded Compounds. IV. The Acid Carbonate Ion." The Journal of Chemical Physics 43.4 (1965): 1177-1181.

Palmer, Donald A., and Rudi Van Eldik. "The chemistry of metal carbonato and carbon dioxide complexes." Chemical Reviews 83.6 (1983): 651-731.

Rouquerol, J., Philip Llewellyn, and F. Rouquerol. "Is the BET equation applicable to microporous adsorbents." Stud. Surf. Sci. Catal 160.07 (2007): 49-56.

Sanz-Pérez, Eloy S., et al. "Direct capture of CO2 from ambient air." Chemical reviews 116.19 (2016): 11840-11876.

Sattler, Wesley, and Gerard Parkin. "Low temperature NMR spectroscopic investigation of a zinc bicarbonate compound: Thermodynamics of bicarbonate formation by insertion of CO2 into the zinc hydroxide bond of [TpBut, Me] ZnOH." Polyhedron 32.1 (2012): 41-48.

Sattler, Wesley, and Gerard Parkin. "Structural characterization of zinc bicarbonate compounds relevant to the mechanism of action of carbonic anhydrase." Chemical Science 3.6 (2012): 2015-2019.

Schmieder, Phillip, et al. "CFA-1: the first chiral metal-organic framework containing Kuratowski-type secondary building units." Dalton Transactions 42.30 (2013): 10786-10797.

Shekhah, Osama, et al. "Made-to-order metal-organic frameworks for trace carbon dioxide removal and air capture." Nature communications 5.1 (2014):4228.

Sumida, Kenji, et al. "Carbon dioxide capture in metal-organic frameworks." Chemical reviews 112.2 (2012): 724-781.

Tsuda, Tetsuo, Yoshiki Chujo, and Takeo Saegusa. "A copper (I)-bicarbonato complex. A water-stable reversible carbon dioxide carrier." Journal of the American Chemical Society 102.1 (1980): 431-433.

Walton, Krista S., and Randall Q. Snurr. "Applicability of the BET method for determining surface areas of microporous metal-organic frameworks." Journal of the American Chemical Society 129.27 (2007): 8552-8556.

Yoshida, T., et al. "Hydration and reduction of carbon dioxide by rhodium hydride compounds. Preparation and reactions of rhodium bicarbonate and formate complexes, and the molecular structure of RhH2 (O2COH)(P (i-Pr) 3) 2." Journal of the American Chemical Society 101.15 (1979): 4212-4221.

Yu, Jiamei, et al. "CO2 capture and separations using MOFs: computational and experimental studies." Chemical reviews 117.14 (2017): 9674-9754.

International Preliminary Report on Patentability issued for Application No. PCT/US2019/036597, dated Dec. 24, 2020.

Bhatt, Prashant M., et al. "A fine-tuned fluorinated MPF addresses the needs for trace CO2 removal and air capture using physiosorption." Journal of the American Chemical Society 138.29 (2016): 9301-9307.

\* cited by examiner

TBAOH = tetrabutylammonium hydroxide 40 wt % in water $MZn_4(OH)_4bt_6 + CO_2 \longrightarrow (MCO_3H)Zn_3(OH)_3bt_6$ $M\ (-\Delta H_{rxn},\ kJmol^{-1}) = Zn\ (52.4)\ Ni\ (52.8)\ Co\ (32.7)$

Empirical formulas for charge inverted SBUs with mixed donor ligands:

n = 1:

↓ X⁻

+ 0.33 X (extraframework anion)

n = 2:

X-type ligand(Cl⁻, OH⁻, etc)

METAL-ORGANIC FRAMEWORKS CONTAINING METAL-HYDROXIDE MOIETIES AND METHODS OF MAKING AND USING THEREOF

CROSS-REFERENCE TO RELATED APPLICATIONS

This application is a national stage application filed under 35 U.S.C. § 371 of PCT/US2019/036597 filed Jun. 11, 2019, which claims benefit of U.S. Provisional Application No. 62/683,128, filed Jun. 11, 2018, which is hereby incorporated herein by reference in its entirety.

STATEMENT REGARDING FEDERALLY SPONSORED RESEARCH OR DEVELOPMENT

This invention was made with Government Support under Grant No. 80NSSC18K1504 awarded by the National Aeronautics and Space Administration (NASA). The Government has certain rights in the invention.

BACKGROUND

Direct air capture of $CO_2$ has been considered as a means of halting or reversing the effects of anthropogenic $CO_2$ emissions on climate change. Moreover, $CO_2$ is acutely toxic at concentrations above 5000 ppm, leading to the need for efficient $CO_2$ removal systems in confined environments such as submarines and spacecraft. Liquid amine scrubbing and causticization are well-studied technologies for trace $CO_2$ removal. However, these processes are energy-intensive and may not be economically viable on large scale. As a result, solid adsorbents have been explored as more energy efficient alternatives. Amine-functionalized porous oxides, polymers, and metal-organic frameworks (MOFs) can be used for trace $CO_2$ capture. However, in some cases, thermal regeneration can result in adsorbent degradation via amine oxidation or volatilization. Hybrid ultramicroporous materials (HUMs) such as SIFSIX-3-Cu, TIFSIX-3-Ni, and NbOFFIVE-1-Ni employ a combination of optimized pore size and strong physisorptive interactions that enable adsorption of $CO_2$ at very low pressures while maintaining mild regeneration temperatures. Although significant advances have been made toward developing solid adsorbents for trace $CO_2$ capture applications, further work is needed to improve capacity, stability, selectivity, and regeneration requirements.

SUMMARY

Metal-organic frameworks (MOFs) have emerged as state-of-the-art adsorbents for molecular separation processes owing to their well-defined porous structures and tunable chemical functionality. While MOFs containing Lewis acidic metal-sites have been widely studied for gas separation applications, materials with Lewis basic functionalities have been much less developed.

Provided herein are MOFs containing nucleophilic transition metal hydroxide (M-OH) groups. In certain embodiments, these MOFs can include a plurality of metal ions, each coordinated with one or more hydroxide ligands and one or more backbone ligands.

In some embodiments, the MOF can comprise OD secondary building units (SBUs). In certain embodiments, the MOFs can comprise Kuratowski cluster-based secondary building units (SBUs). These MOFs can exhibit excellent performance for low pressure $CO_2$ capture via a $CO_2/HCO_3^-$ fixation mechanism in which cooperative inter-cluster hydrogen bonding interactions enhance $CO_2$ capture performance.

Also provided are methods of making MOFs including one or more metal hydroxide moieties. The methods can involve postsynthetic modification of a precursor MOF (e.g., via post-synthetic ligand exchange) to introduce one or more nucleophilic metalhydroxide moieties into the MOF framework. Accordingly, described herein are method of forming a porous metal-organic framework (MOF) comprising one or more metal-hydroxide moieties for use in the capture of an acidic gas. These methods can comprise providing a precursor MOF comprising a plurality of metal ions, each coordinated with an auxiliary ligand and at least one backbone ligand, wherein the at least one backbone ligand comprises a first coordination moiety and a second coordination moiety; and reacting the precursor MOF under conditions effective to perform postsynthetic ligand exchange of the auxiliary ligand for a hydroxide ligand, thereby forming the MOF comprising one or more metal-hydroxide moieties.

The MOFs described herein can be used to capture an acidic gas (e.g., $CO_2$, $SO_2$, $NO_2$, or acetylene) from a mixture of gases. Accordingly, also provided are methods for capturing an acidic gas from a gas mixture that comprise contacting the gas mixture with a MOFs containing nucleophilic transition metal hydroxide (M-OH) groups described herein. The acidic gas can be a trace gas in the gas mixture (i.e., the acidic gas can be present in the gas mixture at a concentration of 5,000 ppm or less). Upon exposure to the acidic gas, the MOF can bind the acidic gas, removing it from the gas mixture. If desired, the MOF can later be thermally regenerated (e.g., via heating to release the bound acidic gas). In this way, the MOFs can function as regenerable filters to remove $CO_2$ from gas mixtures.

DETAILED DESCRIPTION

Definitions

Figure 1:
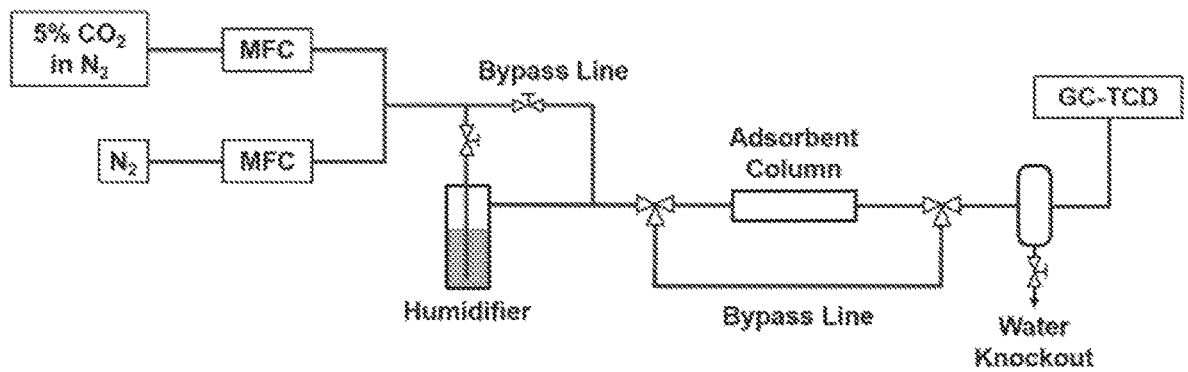
FIG. 1 illustrates a schematic of the $CO_2$ breakthrough setup used to analyze $CO_2$ capture in the Examples described herein.

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven, carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1-20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphatiethioxy, heteroaliphatiethioxy, alkylthioxy, heteroalkylthioxy, arylthioxy, heteroarylthioxy, acyloxy, and the like, each of which may or may not be further substituted).

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3-14 carbon atoms, each of which may be substituted or unsubstituted. Substituents include, but are not limited to, any of the previously mentioned substituents, i.e., the substitutes recited for aliphatic moieties, or for other moieties as disclosed herein, resulting in the formation of a stable compound. In some cases, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein may be attached via an alkyl or heteroalkyl moiety and thus also include -(alkyl)aryl, -(heteroalkyl)aryl, -(heteroalkyl)heteroaryl, and -(heteroalkyl)heteroaryl moieties. Thus, as used herein, the phrases "aryl or heteroaryl moieties" and "aryl, heteroaryl, -(alkyl)aryl, -(heteroalkyl)aryl, -(heteroalkyl)heteroaryl, and -(heteroalkyl)heteroaryl" are interchangeable. Substituents include, but are not limited to, any of the previously mentioned substituents, i.e., the substituents recited for aliphatic moieties, or for other moieties as disclosed herein, resulting in the formation of a stable compound.

It will be appreciated that aryl and heteroaryl groups (including bicyclic aryl groups) can be unsubstituted or substituted, wherein substitution includes replacement of one or more of the hydrogen atoms thereon independently with any one or more of the following moieties including, but not limited to: aliphatic; alicyclic; heteroaliphatic; heterocyclic; aromatic; heteroaromatic; aryl; heteroaryl; alkylaryl; heteroalkylaryl; alkylheteroaryl; heteroalkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$F; —CHF$_2$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)R$_x$; —S(O)$_2$R$_x$; —NR$_x$(CO)R$_x$ wherein each occurrence of R$_x$ independently includes, but is not limited to, aliphatic, alicyclic, heteroaliphatic, heterocyclic, aromatic, heteroaromatic, aryl, heteroaryl, alkylaryl, alkylheteroaryl, heteroalkylaryl or heteroalkylheteroaryl, wherein any of the aliphatic, alicyclic, heteroaliphatic, heterocyclic, alkylaryl, or alkylheteroaryl substituents described above and herein may be substituted or unsubstituted, branched or unbranched, saturated or unsaturated, and wherein any of the aromatic, heteroaromatic, aryl, heteroaryl, -(alkyl)aryl or -(alkyl)heteroaryl substituents described above and herein may be substituted or unsubstituted. Additionally, it will be appreciated, that any two adjacent groups taken together may represent a 4, 5, 6, or 7-membered substituted or unsubstituted alicyclic or heterocyclic moiety. Additional examples of generally applicable substituents are illustrated by the specific embodiments described herein.

The terms "halo" and "halogen" as used herein refer to an atom selected from the group consisting of fluorine, chlorine, bromine, and iodine.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

Compositions and methods comprising metal organic frameworks (MOFs) and related uses are generally provided. In some embodiments, a MOF comprises a plurality of metal ions, each coordinated with one or more hydroxide ligands and one or more backbone ligands.

The term "metal-organic framework" is given its ordinary meaning in the art and refers to a one-, two-, or three-dimensional coordination polymer including metal ions and ligands which function as organic structural units (referred to herein as backbone ligands), wherein a portion of the metal ions are each chemically bonded to at least one bi-, tri- or poly-dentate ligand. The metal ions, in addition to being coordinated with at least one organic structure unit, are also be bound to one or more additional ligands (e.g., hydroxide ligands and optionally other auxiliary ligands), as described in more detail herein.

In some embodiments, the MOF may include a single type of backbone ligand may be employed. In other embodiments, the MOF may include a mixture of different backbone ligands. For example, the MOF may include a first type of backbone ligand and a second type of backbone ligand. When multiple types of backbone ligands are present, the multiple types of backbone ligands may be present in any suitable ratio.

In some embodiments, the MOF can comprise a plurality of metal ions, each coordinated with one or more hydroxide ligands and one or more backbone ligands, wherein each of the one or more backbone ligands comprises a first coordination moiety and a second coordination moiety. The first coordination moiety and the second coordination moiety can be arranged about an organic core. If desired, backbone ligands can further include additional coordination moieties (e.g., a third coordination moiety, a fourth coordination moiety, etc.).

The organic core comprising at least two coordination moities may be any suitable core. In some embodiments, the core is aromatic. Generally, the core comprises a rigid structure formed from fused aryl and/or heteroaryl rings. In some embodiments, the organic core comprises a plurality of fused aryl and/or heteroaryl rings. In some cases, the organic core comprises a plurality of fused aryl rings. In some cases, the organic core comprises one or more of benzyl, thiophenyl, carbazolyl, pyrrolyl, indolyl, and furanyl rings.

In some embodiments, a portion of the metal ions are associated with two, three, four ligands, five, or six backbone ligands, and each of those backbone ligands is individually associated with one, two, three, four, five, or six metal ions. In some embodiments, a portion of the metal ions are associated with two backbone ligands, and each of those backbone ligands is individually associated with two metal ions. In some embodiments, a portion of the metal ions are associated with three backbone ligands, and each of those backbone ligands is individually associated with three metal ions. In some embodiments, a portion of the metal ions are associated with two backbone ligands, and each of those backbone ligands is individually associated with three metal ions. In some embodiments, the backbone ligand can be charged. In some embodiments, the backbone ligand can have a charge of (−1), or (−2), or (−3), or (−4). In some embodiments, the backbone ligand can have a charge of (−2).

In some embodiments, the first coordination moiety and the second coordination moiety comprise carboxylate moieties. In these embodiments, the backbone ligand can comprise two carboxylates arranged about an organic core. In some embodiments, the organic core further comprise a chelating group, such as a bipyridine group. By way of example, in some embodiments, the at least one backbone ligand can be defined by the formula below

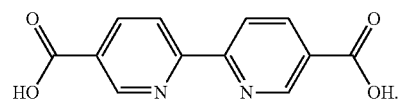 [SMILES: O=C(O)c1ccc(-c2ccc(C(=O)O)cn2)nc1]

In some embodiments, the first coordination moiety can comprise a heterocyclic moiety and the second coordination moiety can comprise a carboxylate moiety. In these embodiments, the backbone ligand can comprise a carboxylates and a heterocyclic moiety arranged about an organic core. By way of example, in some embodiments, the at least one backbone ligand can be defined by the formula below

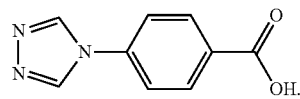 [SMILES: O=C(O)c1ccc(-n2cnnc2)cc1]

In some embodiments, the first coordination moiety and the second coordination moiety comprise heterocyclic moieties. In these embodiments, the backbone ligand can comprise two heterocyclic moieties arranged about an organic core. The heterocyclic moieties can be the same heterocycle, or different heterocycles. In certain embodiments, the heterocyclic moieties can comprise triazole moieties (e.g., 1,2,3-triazoles, 1,2,4-triazoles, or a combination thereof).

In certain embodiments, the at least one backbone ligand comprises one or more ligands defined by the formula below

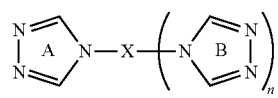

wherein n is 1, 2, or 3, and X represents one or more bonds formed between ring A and each ring B.

In some of these embodiments, X can comprise an adamantyl or azaadamantyl moiety. For example, the at least one backbone ligand comprises one of the following

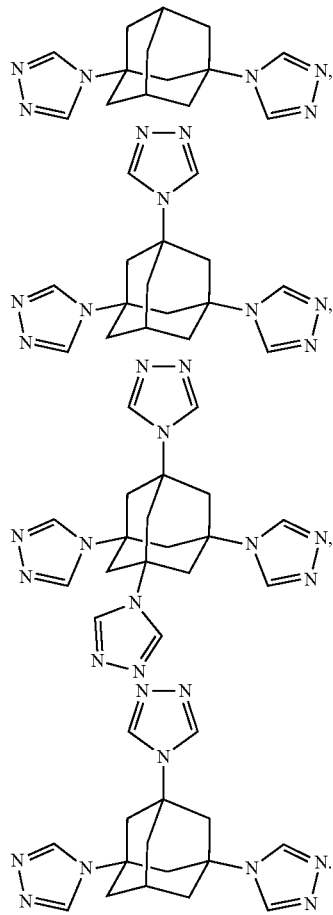

In other embodiments, X can comprise a phenyl ring. For example, the at least one backbone ligand comprises one of the following

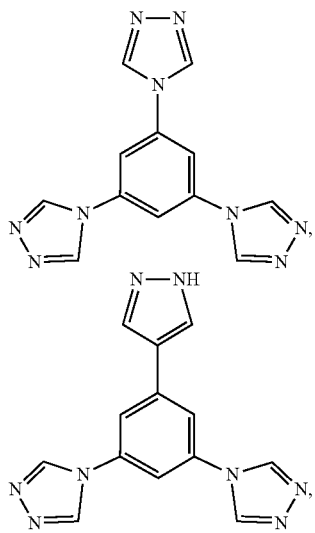

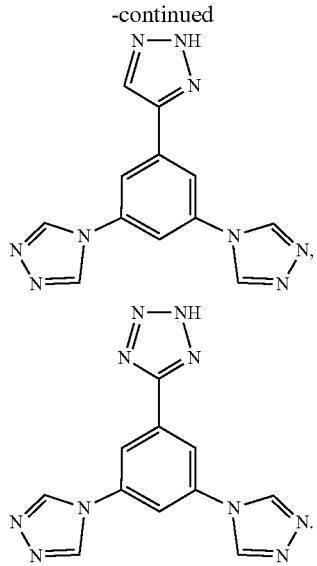

In certain embodiments, the at least one backbone ligand comprises one or more ligands defined by the formula below

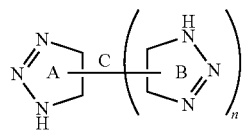

wherein n is 1, 2, or 3, and C represents one or more bonds formed between ring A and each ring B.

In certain embodiments, n is 1. In certain embodiments, C comprises an aromatic ring or a plurality of fused aryl and/or heteroaryl rings. In some cases, C can comprise a plurality of fused aryl rings.

In certain embodiments, the at least one backbone ligand can comprise one of the following

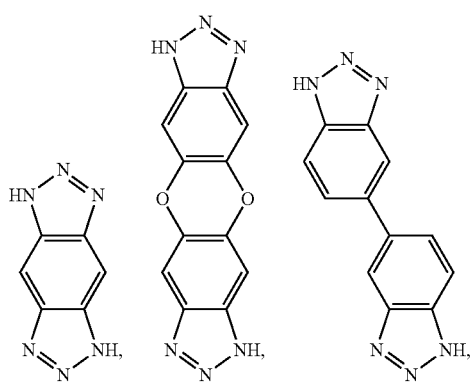

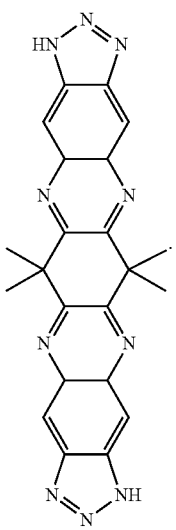

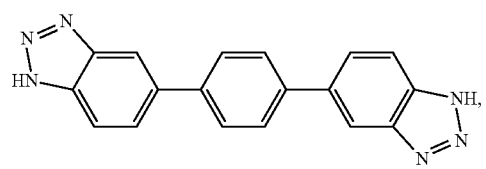

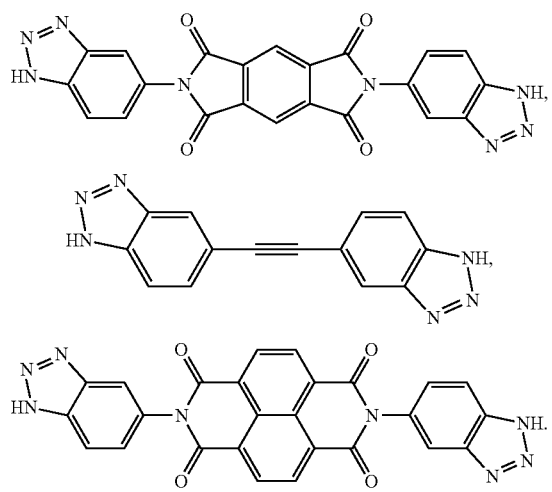

Other suitable backbone ligands include the following

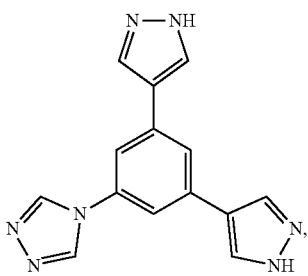

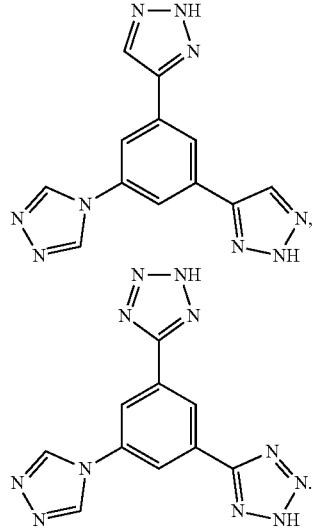

The plurality of metal ions in the MOFs described above can in principle be any first row transition metal. In certain embodiments, the plurality of metal ions are selected from the group consisting Mn, Fe, Co, Ni, Cu, Zn, and combinations thereof.

In some embodiments, the MOF comprises 0D secondary building units (SBUs) (also referred to as 0D clusters or 0D nodes). In certain embodiments, the MOF can comprise Kuratowski cluster-based secondary building units (SBUs). These MOFs can exhibit excellent performance for low pressure $CO_2$ capture via a $CO_2/HCO_3^-$ fixation mechanism.

In some embodiments, the MOF comprises a CFA-1, MFU-4, or MFU-4l type framework.

In some embodiments, the metal-hydroxide moieties can be present in the MOF at a M-OH site density of from 1.5 mmol g$^{-1}$ to 7.5 mmol g$^{-1}$.

In some embodiments, the MOFs can be characterized by a metal-metal distance, measured between metal centers of neighboring SBUs by x-ray crystallography, of from 5 Å to 15 Å, such as from 5 Å to 12 Å.

In certain embodiments, the MOF does not comprise a chain-type secondary building unit (SBU). For example, in particular embodiments, the MOF is not [Mn$^{II}$Mn$^{III}$(OH)Cl$_2$(bbta)](MAF-X25ox) or [Co$^{II}$Co$^{III}$(OH)Cl$_2$(bbta)] (MAF-X27ox).

In certain embodiments, the porous metal-organic framework (MOF) can comprise MOF-253 (Al(OH)(bpydc)) or UiO-67-bpy (Zr$_6$O$_4$(OH)$_4$(bpyd)$_6$), wherein bpydc is defined by the formula below

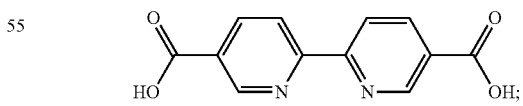

and
wherein the MOF further comprises one or more M(OH)$_2$ species immobilized at one or more bipyridine sites within the MOF.

In these embodiments, M is, individually for each occurrence in the MOF, selected from the group consisting of Mn, Fe, Co, Ni, Cu, and Zn. The one or more metal-hydroxide moieties are present in the MOF comprising the one or more metal-hydroxide moieties at a M-OH site density of from 1.5 mmol g$^{-1}$ to 7.5 mmol g$^{-1}$. The MOF can be characterized by a metal-metal distance, measured between metal centers of neighboring SBUs by x-ray crystallography, of from 5Å to 15 Å, such as from 5 to 12 Å.

Also provided are methods of making MOFs including one or more metal-hydroxide moieties. The methods can involve postsynthetic modification of a precursor MOF (e.g., via post-synthetic ligand exchange) to introduce one or more nucleophilic metal-hydroxide moieties into the MOF framework.

Accordingly, described herein are method of forming a porous metal-organic framework (MOF) comprising one or more metal-hydroxide moieties for use in the capture of an acidic gas. These methods can comprise:

providing a precursor MOF comprising a plurality of metal ions, each coordinated with an auxiliary ligand and at least one backbone ligand, wherein the at least one backbone ligand comprises a first coordination moiety and a second coordination moiety; and reacting the precursor MOF under conditions effective to perform postsynthetic ligand exchange of the auxiliary ligand for a hydroxide ligand, thereby forming the MOF comprising one or more metal-hydroxide moieties.

Also provided are methods of forming a porous metal-organic framework (MOF) comprising one or more metal-hydroxide moieties for use in the capture of an acidic gas that comprise:

providing a precursor MOF selected from the group consisting of MOF-253 (Al(OH)(bpydc)) and UiO-67-bpy (Zr$_6$O$_4$(OH)$_4$(bpyd)$_6$), wherein bpydc is defined by the formula below

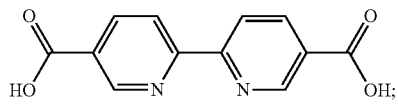 [SMILES: O=C(O)c1ccc(-c2ccc(C(=O)O)cn2)nc1]

reacting the precursor MOF under conditions effective to perform postsynthetic metal insertion, thereby immobilizing MX$_2$ species at one or more bipyridine sites within the MOF where M represents a metal ion and X represents an auxiliary ligand; and performing postsynthetic ligand exchange of the auxiliary ligands for hydroxide ligands, thereby forming the MOF comprising one or more metal-hydroxide moieties.

In some embodiments, reacting the precursor MOF under conditions effective to perform postsynthetic ligand exchange can comprises direct reaction with hydroxide. This can comprise, for example, contacting the precursor MOF with a hydroxide source. Examples of suitable hydroxide sources include NaOH, KOH, LiGH, CsOH, tetraalkylammonium hydroxides (e.g., tetrabutylammonium hydroxide), or a combination thereof.

In some embodiments, reacting the precursor MOF under conditions effective to perform postsynthetic ligand exchange can comprise reaction with water and an organic base. This can comprise, for example, contacting the precursor MOF with an aqueous solution comprising an organic base. Examples of suitable organic bases include 2,6-Lutidine (Lut), trialkylamine (e.g., triethylamine, trimethylamide), dialkylamines (diethylamine, dimethylamine), 1,8-Diazabicyclo[5.4.0]undec-7-ene (DBU), and combinations thereof.

In some embodiments, reacting the precursor MOF under conditions effective to perform postsynthetic ligand exchange can comprise basic ligand exchange and hydrolysis. This can comprise, for example, contacting the precursor MOF with a nucleophile (e.g., an alkoxide or a thiolate) followed by hydrolysis. Basic ligand exchange and hydrolysis can also comprise contacting the precursor MOF with formate (e.g., lithium formate, sodium formate, or potassium formate), followed by heating the precursor MOF to drive off carbon dioxide and hydrolysis.

In some embodiments, reacting the precursor MOF under conditions effective to perform postsynthetic ligand exchange can comprise bicarbonate exchange followed by thermolysis.

The at least one backbone ligand can comprise any of the backbone ligands described above.

In some embodiments, the auxiliary ligand may be found above and/or below the metal ion (e.g., as apical ligands). An auxiliary ligand may or might not be charged. Non-limiting examples of auxiliary ligands include halides (e.g., Cl, I, and Br), aliphatic and aromatic carboxylates (e.g., acetate, propionate, butanoate, and benzoate), triflate, nitrate, sulfate, hydrogen sulfate, phosphate, hydrogen phosphate, dihydrogen phosphate, perchlorate, azide, cyanide, nitrite, thiocyanate, hydrogen, $C_1$-$C_4$ alkyl, $C_1$-$C_4$ alkoxy, $C_1$-$C_4$ alkylthio, and a solvent molecules (e.g., coordinating solvents such as water, pyridine, tetrahydrofuran, diethyl ether, etc.).

The plurality of metal ions in the MOFs described above can in principle be any first row transition metal. In certain embodiments, the plurality of metal ions are selected from the group consisting Mn, Fe, Co, Ni, Cu, Zn, and combinations thereof.

In some embodiments, the MOF comprises 0D secondary building units (SBUs) (also referred to as 0D clusters or 0D nodes). In certain embodiments, the MOF can comprise Kuratowski cluster-based secondary building units (SBUs). These MOFs can exhibit excellent performance for low pressure $CO_2$ capture via a $CO_2$/$HCO_3^-$ fixation mechanism. In some embodiments, the MOF comprises a CFA-1, MFU-4, or MFU-4l type framework.

In some embodiments, the metal-hydroxide moieties can be present in the MOF comprising one or more metal-hydroxide moieties at a M-OH site density of from 1.5 mmol g$^{-1}$ to 7.5 mmol g$^{-1}$.

In some embodiments, the MOF comprising one or more metal-hydroxide moieties can be characterized by a metal-metal distance, measured between metal centers of neighboring SBUs by x-ray crystallography, of from 5 Å to 15 Å, such as from 5 Å to 12 Å.

Also described herein are porous metal-organic framework (MOF) prepared by the methods described herein.

The MOFs described herein can be used to capture an acidic gas (e.g., $CO_2$, $SO_2$, $NO_2$, or acetylene) from a mixture of gases. Accordingly, also provided are methods for capturing an acidic gas from a gas mixture that comprise contacting the gas mixture with a MOFs containing nucleophilic transition metal hydroxide (M-OH) groups described herein. The acidic gas can be a trace gas in the gas mixture (i.e., the acidic gas can be present in the gas mixture at a concentration of 5,000 ppm or less). Upon exposure to the acidic gas, the MOF can bind the acidic gas, removing it from the gas mixture.

If desired, the MOF can later be thermally regenerated (e.g., via heating to release the bound acidic gas). Thermally regenerating the MOF can comprise, for example, heating the MOF to a temperature of from 80° C. to 160° C.

In this way, the MOFs can function as regenerable filters to remove $CO_2$ from gas mixtures. Accordingly, also provided are scrubbers and filters for the removal of an acidic gas from a gas stream. The scrubbers and filters can comprise a MOF described herein disposed along a flow path for a gas stream.

By way of non-limiting illustration, examples of certain embodiments of the present disclosure are given below.

EXAMPLES

Example 1: A Bioinspired Metal-Organic Framework for Trace $CO_2$ Capture

A Zn benzotriazolate metal-organic framework (MOF), [$Zn(ZnO_2CCH_3)_4(bibta)_3$] (1, bibta$^{2-}$=5,5'-bibenzotriazolate), was subjected to a mild $CH_3CO_2^-$/$HCO_3^-$ ligand exchange procedure followed by thermal activation to generate nucleophilic Zn—OH groups that resemble the active site of α-carbonic anhydrase. The post-synthetically modified MOF, [$Zn(ZnOH)_4(bibta)_3$] (2*), exhibits excellent performance for trace $CO_2$ capture and can be regenerated at mild temperatures. IR spectroscopic data and DFT calculations reveal that inter-cluster hydrogen bonding interactions augment a Zn—OH/Zn-02COH fixation mechanism Background Compared to amine-functionalized adsorbents, porous materials containing nucleophilic hydroxyl binding sites have been less studied for $CO_2$ capture applications. MOFs containing Co$^{III}$—OH or Mn$^{III}$—OH groups can exhibit good $CO_2$ uptake under simulated flue gas conditions, but existing MOFs exhibit only modest capacities at atmospheric $CO_2$ concentrations. These materials were prepared by postsynthetic oxidation of Co$^{II}$/Mn$^{II}$-based MOFs, limiting the approach to metals with accessible M$^{II/III}$ redox couples. Inspired by the $CO_2$ fixation mechanism of α-carbonic anhydrases (α-CA), we considered that the use of more strongly nucleophilic Zn—OH groups analogous to the enzyme active site might provide materials with improved low-pressure $CO_2$ uptake. Although Zn-based MOFs can be used to mediate the conversion of $CO_2$ to $HCO_3^-$ in aqueous solution, only observed substoichiometric turnovers have been observed. The generation of Zn—OH groups for gas-solid phase adsorption has not been investigated.

In this example, a mild and convenient postsynthetic modification protocol for generating biomimetic Zn—OH species within the benzotriazolate MOF CFA-1 is described. The resulting material displays excellent $CO_2$ adsorption at ultralow concentrations resulting from a $CO_2$/$HCO_3^-$ chemisorption mechanism and cooperative inter-cluster hydrogen bonding interactions reminiscent of secondary coordination sphere interactions in α-CA.

Materials and Methods

General Considerations. $Zn(OAc)_2.2H_2O$ (Alfa Aesar), N,N-dimethylformamide (DMF, Fisher), $NaHCO_3$(Fisher, 99.9%), and glacial acetic acid (Fisher) used for synthetic preparations were used as received. $H_2$bibta was synthesized according a reported procedure using 3,3'-diaminobenzidine purchased from Acros (99%, #112080250) and $NaNO_2$ purchased from Alfa Aesar (97%, 14244). Tetrahydrofuran (Fisher) was degassed by sparging with ultra-high-purity argon and dried via passage through columns of drying agents using a solvent purification system from Pure Process Technologies. All other solvents and reagents were purchased from commercial suppliers and used as received. Routine powder X-ray diffraction patterns for phase identification were collected on a Rigaku Miniflex 600 diffractometer using Nickel-filtered Cu-Kα radiation (λ=1.5418 Å). Indexing and Pawley refinements were carried out using the PDXL2 software suite in the data range 2θ=3-45°. Elemental microanalyses were performed by Atlantic Microlab, Norcross, Ga. Solution-state NMR spectra were measured using a Bruker DPX 400 MHz spectrometer. For $^1$H NMR spectra, the solvent resonance was referenced as an internal standard. Solvent-suppressed $^1$H NMR spectra were collected using 1800 water selective excitation sculpting with default parameters and pulse shapes. Briefly, spectra were collected using selective pulses of 1 ms with the transmitter frequency set to the center of the solvent resonance. The recycle delay between scans was 2 s, 16K points were collected, and the acquisition time was 0.7 s. Samples of 1 and 2 were digested for solution state $^1$H NMR analysis by suspending 15-20 mg of solid in $CF_3CO_2H$ (0.5 mL) and gently heating the suspensions until all of the solids dissolved. DMSO-$d_6$ (0.1 mL) was then added to the solutions to provide a lock signal for shimming.

Synthesis of 1. A screw top 250 mL media bottle (Fisherbrand, FB-800-250) was charged with 100 mL of DMF, 4 mL of acetic acid and 0.740 g of $Zn(OAc)_2.2H_2O$ (3.39 mmol, 4 eq). The mixture was sonicated to ensure complete dissolution of the solids. $H_2$bibta (0.200 g, 0.84 mmol, 1 eq) was added and the bottle was tightly sealed with a new polypropylene cap (Fisherbrand, FB800STDCAP). The resulting light brown suspension was heated to 90° C. for 16 hours, and the temperature was increased to 120° C. for an additional 24 hours. The precipitated light brown powder was washed with DMF (3×20 mL) and iPrOH (2×20 mL). The PXRD pattern and IR spectrum of 1 matches that reported for CFA-1. Elemental analysis calculated for $Zn_5$($OAc$)$_4$(bibta)$_3$.$2H_2O$ ($Zn_5C_{44}H_{34}N_{18}O_{10}$) (%): C 40.47, H 2.32, N 19.31; found: C 40.61, H 2.45, N 19.20. The sample of 1 used for combustion elemental analysis was dried under vacuum at 100° C. for 1h. However, exposure to air prior to analysis appears to have resulted in the adsorption of 2 $H_2O$ molecules per formula unit.

Synthesis of 2. A sample of 1 (0.250 g) was soaked in a 0.1 M aqueous solution of $NaHCO_3$(5×20 mL, 30 min. per soak). The light brown solid was then collected by filtration and washed with water (3×20 mL) and anhydrous THF (3×20 mL). The sample used for combustion elemental analysis was dried under vacuum at 100° C. for 1h to generate 2*. However exposure to air prior to analysis is presumed to have generated $Zn_5$($HCO_3$)($OH$)$_3$(bibta)$_3$. Elemental analysis calculated for $Zn_5$($HCO_3$)($OH$)$_3$(bibta)$_3$. ($Zn_5C_{37}H_{24}N_{18}O_6$) (%): C, 38.93, H, 2.65, N, 22.08; found: C, 38.45, H, 2.33, N, 22.12.

Gas Adsorption Measurements. Single component, gas adsorption isotherms were measured using a Micromeritics 3Flex Surface Characterization Analyzer. All measurements were performed using ultra high purity grade gases (99.999%) purchased from Praxair ($N_2$: NI 5.0UH-K; $CO_2$: CD 5.0LS-K; 02: OX 5.0RS-K; He: HE 5.0UH-K). Prior to analysis, samples (100-200 mg) were transferred to oven-dried and tared sample tubes equipped with TranSeals™ (Micrometrics) and heated to 100° C. (1° C. min$^{-1}$) under vacuum until the outgas rate was less than 3 mbar min$^{-1}$. Surface areas were calculated from $N_2$ adsorption isotherms (77 K) by fitting the isotherm data to the BET equation with the appropriate pressure range (0.0001≤P/$P_0$≤0.1) determined by the consistency criteria of Rouquerol. A Micrometrics thermocouple-controlled heating mantle was used to maintain the sample temperature for isotherms measured between 300 and 353 K.

Thermogravimetric Analysis and Thermal Swing Cycling Measurements. TGA data were recorded using a TA Instruments Q50 or Discovery SDT 650 under a flow of $N_2$ or Ar gas. Thermal swing cycling measurements were carried out using a TA Instruments Q50. Samples of 2-$CO_2$ (10-15 mg) were quickly transferred to a 100 μL Pt sample pan, loaded into the balance/furnace under a flow of dry $N_2$ (50 mL min$^{-1}$), and heated to 100° C. for 30 min. The adsorption steps were carried by cooling the sample to 27° C., switching the sample flow gas (50 mL min$^{-1}$) to 395 ppm $CO_{2/21}$% $O_2/N_2$ balance, 5% $CO_{2/95}$% $N_2$, or pure $CO_2$ (99.998%), and maintaining the sample temperature at 27° C. for 20-200 min. The desorption steps were performed by switching the sample flow gas to dry $N_2$, heating to 100° C. at a rate of 5° C. min$^{-1}$, and maintaining the sample temperature at 100° C. for 20-25 min.

DRIFTS and ATR-IR Measurements. DRIFTS spectra were recorded on a Nicolet iS50 spectrometer equipped with a liquid $N_2$-cooled MCT detector and Praying Mantis diffuse reflectance accessory (Harrick Scientific). Background spectra were collected with anhydrous KBr. Samples of 2-$CO_2$ were diluted with anhydrous KBr and loaded into the sample cup of a high temperature reaction chamber fitted with ZnSe windows. The chamber was sealed and placed under a flow of dry $N_2$ gas. DRIFTS spectra were measured periodically while heating the sample from 25° C. to 200° C. ATR-IR measurements were conducted on a Nicolet iS10 with a diamond ATR accessory.

Isosteric Heat of Adsorption Calculations. The isosteric heat of adsorption ($Q_{st}$) of $CO_2$ was estimated from the single component adsorption isotherms measured at 300, 313, 333, and 353 K using the MicroActive software (version 3.01, Micromeritics Instrument Corporation) accompanying the Micromeritics 3Flex gas sorption analyzer. An interpolated curve is generated by spline fitting of data points to determine the pressures at equivalent loadings for each temperature. The interpolated points are then used to generate isosteres (Figure S9) and $Q_{st}$ is calculated at fixed loadings from the slope of the isosteres according to the Clausius-Clapeyron equation (1).

$$(\ln p)_n = \left(\frac{Q_{st}}{R}\right)\left(\frac{1}{T}\right) + C \qquad (1)$$

$CO_2$ Breakthrough Experiments. FIG. 1 illustrates the experimental setup used to conduct $CO_2$ breakthrough experiments. A sample of 2-$CO_2$ (0.204 g) was loaded in a repurposed check valve (Swagelok SS-4C-1) and packed with wire mesh and quartz filter discs. The sample was activated at 100° C. under a flow of dry He (50 mL min$^{-1}$). The activated sample mass was calculated to be 0.185 g based on TGA analysis of 2-$CO_2$. An anhydrous inlet gas stream of 3890 ppm $CO_2$ in $N_2$ was generated by mixing 5% $CO_2/N_2$ with $N_2$ using calibrated mass flow controllers. The humidified gas stream was generated by passing the mixed inlet gas through a 1 L stainless steel column containing 60% (by volume) of Raschig rings and 100 mL water at room temperature. Breakthrough measurements were carried out at 23° C. with an inlet gas flow rate of 25 mL min$^{-1}$. Prior to starting the column breakthrough measurements, the system was purged with the mixed inlet gas using the bypass line shown in FIG. 1 until the $CO_2$ concentration was saturated at 3890 ppm. At t=0 min, the inlet gas was diverted from the bypass line through the adsorption column using 3-way valves. As a result, the initial measured concentration of $CO_2$ is 3890 ppm and gradually decreases owing to mixing in the volume between the column outlet and GC-TCD. Breakthrough curves were constructed by sampling the outlet gas at fixed intervals using a gas chromatograph (Agilent 6890 N) equipped with a Supelco Carboxen® 1004 micropacked column and TCD detector. Integration of the area above the breakthrough curves under anhydrous conditions yielded capacities of 2.7-3.2 mmol of $CO_2$/g of 2* for trials 1-3. Owing to the long sample intervals (~20 min, limited by the GC-TCD gas analysis time), breakthrough times could not be precisely calculated, introducing error in the estimated adsorption capacities. A nearly complete loss of capacity was observed under humid conditions.

Periodic DFT calculations. Periodic density functional theory (DFT) calculations, implemented in the open-source Quantum Espresso package, were employed to compute the $CO_2$ binding energies at the $Zn_A$ and $Zn_E$ sites in 2-$CO_2$. The atomic coordinates from the single crystal X-ray structure of CFA-1 were used as a starting point, and the $CH_3CO_2^-$ ligands were replaced with either $OH^-$ or $HCO_3^-$ groups.

The following structures were optimized to calculate the binding energies:

2-A—$HCO_3^-$ ligands at all $Zn_A$ and $OH$ ligands at all $Zn_E$ sites

2-E1-proximal—$OH$ ligands at all $Zn_A$ sites; one $HCO_3^-$ ligand at each adjacent pair of $Zn_E$ sites; $HCO_3^-$ ligand adopts a proximal geometry with the $Zn_E$—$OH$ group as the hydrogen bond acceptor 2-E1-distal—$OH$ ligands at all $Zn_A$ sites; one $HCO_3^-$ ligand at each adjacent pair of $Zn_E$ sites; $HCO_3^-$ ligand adopts a distal geometry with the $Zn_E$—$OH$ group as the hydrogen bond acceptor 2-E1-ZnOHdonor—$OH$ ligands at all $Zn_A$ sites; one $HCO_3^-$ ligand at each adjacent pair of $Zn_E$ sites; $HCO_3^-$ ligand adopts a proximal geometry with the $Zn_E$—$OH$ group as the hydrogen bond donor 2-E2—$OH$ ligands at all $Zn_A$ sites; $HCO_3^-$ ligands at all $Zn_E$ sites 2-$CO_2$— $HCO_3^-$ ligands at all $Zn_A$ and $Zn_E$ sites The Perdew-Burke-Ernzerhof (PBE) exchange-correlation functional and Troullier-Martins type norm-conserving pseudopotentials were used. The kinetic cutoff was set to 90 Rydberg and Gamma point was used. All atomic positions were relaxed until the residual forces on every atom were smaller than 10-3 Rydberg/Bohr and the energy difference between two consecutive BFGS cycles was less than 10-4 Rydberg. In these calculations, the cell dimensions (lattice parameters) were kept fixed. A further convergence test showed that the computed binding energies were insensitive to whether or not the lattice parameters of the cells were relaxed; the difference was found to be less than 1 kJ/mol (i.e., without cell relaxation versus with cell relaxation).

Calculated $CO_2$ binding energies and selected interatomic distances from DFT-optimized structures are included below. Distances are given as a range observed in the optimized structures.

|  | 2-A | 2-E1-proximal | 2-E1-distal | 2-E1-ZnOH donor | 2-E2 | 2-$CO_2$ |
|---|---|---|---|---|---|---|
| # of $CO_2$ per unit cell | 2 | 3 | 3 | 3 | 6 | 8 |
| Binding energy per $CO_2$ (kJ mol$^{-1}$) | −37.50 | −71.37 | −60.69 | −49.26 | −68.05 | −59.84 |
| $Zn_A$—$O_{(HCO3)}$ (Å) | 1.967 | — | — | — | — | 1.971 |

-continued

| | 2-A | 2-E1-proximal | 2-E1-distal | 2-E1-ZnOH donor | 2-E2 | 2-CO$_2$ |
|---|---|---|---|---|---|---|
| Zn$_A$...O$_{(HCO3)}$ (Å) | 2.722 | — | — | — | — | 2.673 |
| Zn$_E$—O$_{(HCO3)}$ (Å) | — | 1.946-1.955 | 1.909-1.913 | 1.932-1.936 | 1.999-2.009 | 1.995-2.003 |
| Zn$_E$...O$_{(HCO3)}$ (Å) | — | 2.611-2.672 | — | 3.001-3.057 | 2.394-2.423 | 2.409-2.442 |
| H$_{(ZnHCO3)}$...O$_{(ZnOH)}$ (Å) | — | 1.652-1.674 | 1.802-1.824 | — | 1.585-1.586 | 1.580-1.592 |
| H$_{(ZnOH)}$...O$_{(ZnHCO3)}$ (Å) | — | — | — | 2.525-2.646 | — | — |

Results and Discussion

Figure 2A:
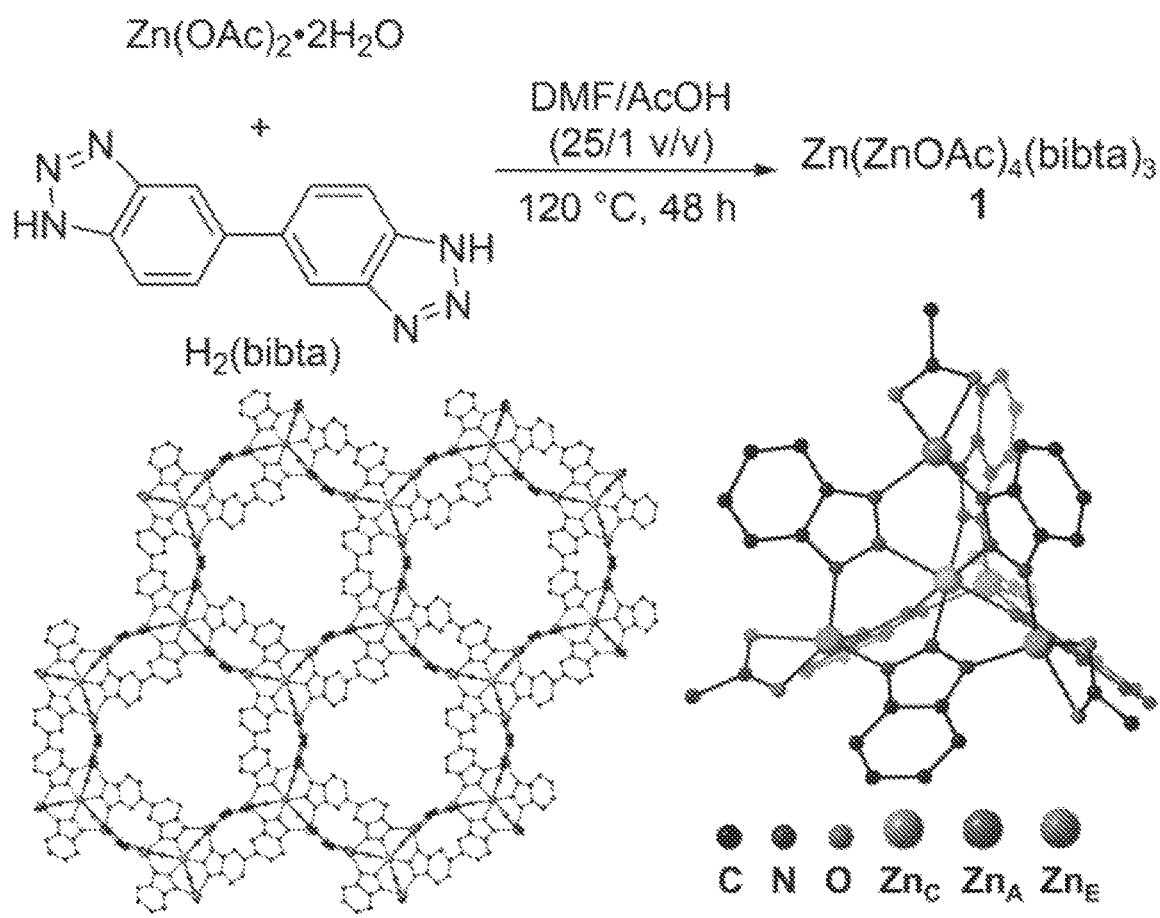
FIG. 2A illustrates the synthesis of 1 and structures of the framework and $Zn(ZnOAc)_4$ SBUs.

Zn(ZnOAc)$_4$(bibta)$_3$ (1, OAc=CH$_3$COO$^-$) has been synthesized as a light brown microcrystalline powder (FIG. 2A). The powder X-ray diffraction (PXRD) pattern of 1 closely matches the pattern simulated from the reported single crystal structure of CFA-1, confirming that the modified synthesis conditions have no impact on the framework structure. 1 contains Kuratowski-type secondary building units (SBUs) with an octahedrally coordinated, central zinc site (Zn$_C$) and crystallographically distinct, peripheral zinc sites (Zn$_A$ and Zn$_E$) that bear a strong resemblance to the α-carbonic anhydrase active site. Furthermore, the Zn$_A$—OAc and Zn$_E$—OAc groups are exposed to the internal surface of the framework channels and are present in high density (~3.16 mmol g$^{-1}$).

Figure 2B:
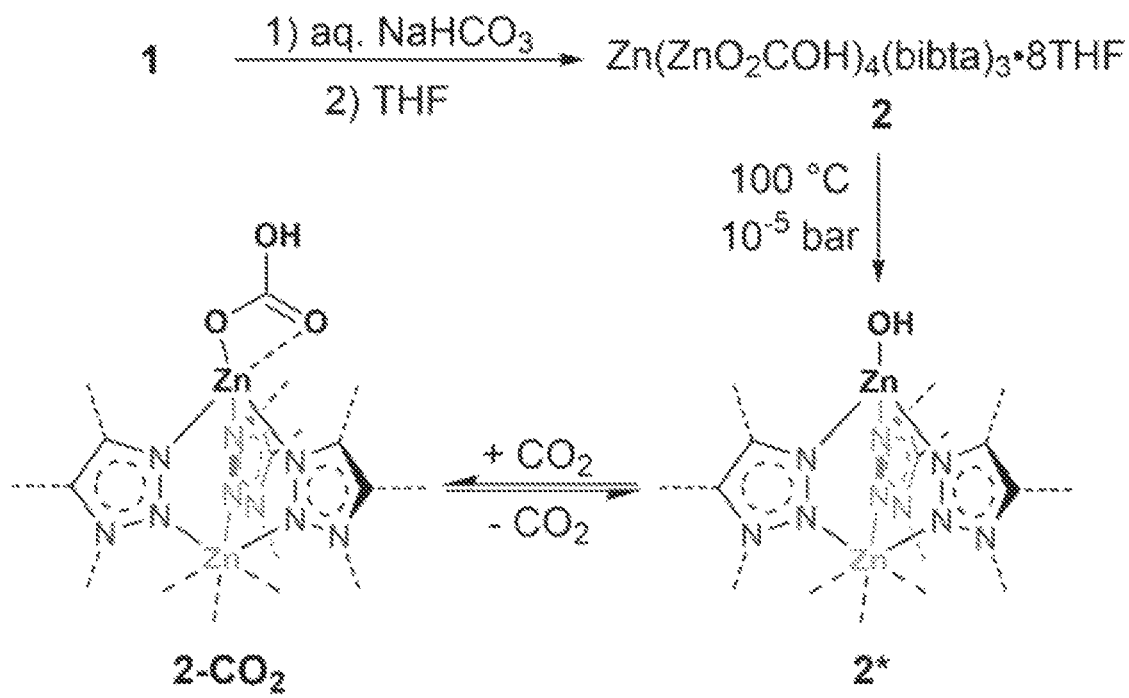
FIG. 2B illustrates the synthesis of 2 and 2* and the mechanism of reversible $CO_2$ fixation.

Attempts to carry out direct Cl$^-$/OH$^-$ exchange in MOFs containing Kuratowski-type Zn SBUs can result in framework decomposition. Considering that CO$_2$ capture should be reversible via Zn—OH/Zn—O$_2$COH interconversion, we decided to examine OAc/HCO$_3^-$ exchange in 1 as an indirect route to generate Zn—OH groups. Gratifyingly, the ligand-exchanged MOF 2 was conveniently prepared by soaking 1 in an aqueous solution of NaHCO$_3$(0.1 M, pH 8.0-8.3) followed by washing with H$_2$O and THF (FIG. 2B). PXRD analysis of the product indicates that 2 retains crystallinity and does not undergo any major structural changes. Only residual amounts of HOAc (<0.1:1 HOAc: H$_2$bibta) were observed in the $^1$H NMR spectra of acid-digested samples of 2, confirming the successful exchange of the OAc ligands. Thermogravimetric analysis (TGA) shows a steep 40% mass loss up to 100° C. followed by a plateau until the onset of framework decomposition around 400° C. The apparent stability of 2 up to 400° C. indicates that volatilization of guest solvent molecules (~8 THF molecules per formula unit) and loss of CO$_2$ from decomposition of the putative Zn-0$_2$COH groups both occur during the initial mass loss.

Figure 3A:
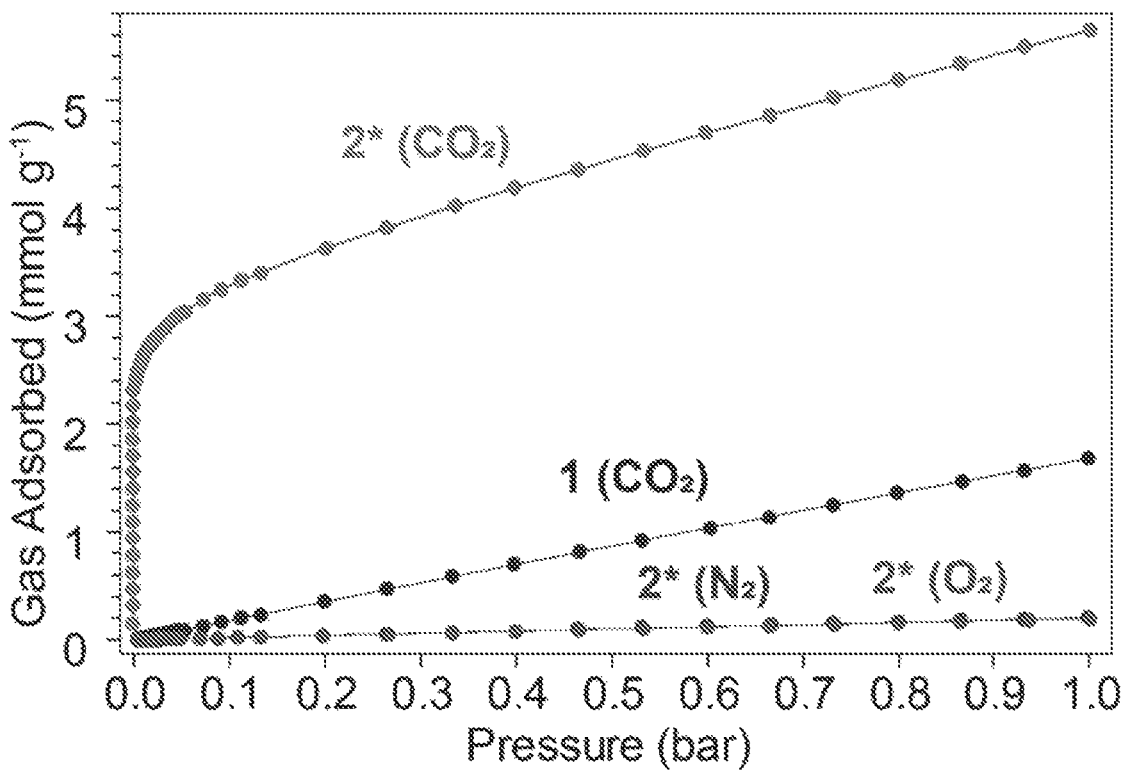
FIG. 3A is a plot showing the $CO_2$, $N_2$ and $O_2$ adsorption isotherms of 1 and 2* up to 1 bar at 300K.
Figure 3B:
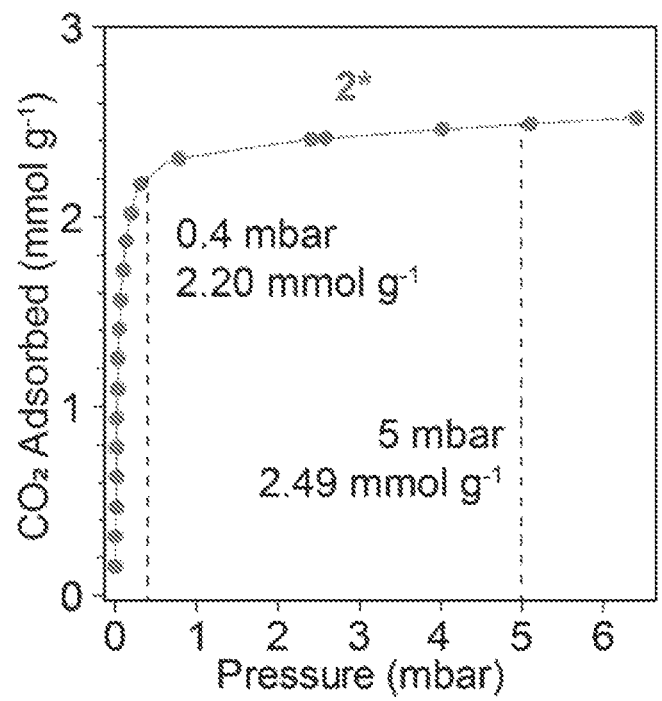
FIG. 3B is a plot showing the low pressure region of the $CO_2$ adsorption isotherm of 2*.

Samples of 2 were activated by heating at 100° C. under high vacuum to generate 2*. N$_2$ adsorption isotherms measured at 77 K for 2* and a similarly activated sample of 1 provided calculated Brunauer-Emmett-Teller (BET) surface areas of 2522 and 2075 m$^2$ g$^{-1}$, respectively. The larger surface area and slight increase in average pore diameter of 2* is consistent with the exchange of OAc$^-$ for smaller OH$^-$ ligands. CO$_2$, N$_2$, and O$_2$ adsorption isotherms measured at 300 K reveal that 2* exhibits remarkably steep CO$_2$ uptake at low pressures but negligible N$_2$ and O$_2$ adsorption (FIG. 3A). On the other hand, 1 shows almost no CO$_2$ uptake in the low-pressure region, supporting the generation of Zn—OH chemisorption sites in 2*. At 0.4 mbar, which is roughly equivalent to the concentration of CO$_2$ in Earth's atmosphere (~400 ppm), 2* exhibits a CO$_2$ capacity of 2.20 mmol g$^{-1}$ (FIG. 3B). This uptake exceeds that of the Co$^{III}$—OH functionalized MAF-27ox (~1.1 mmol g$^{-1}$) and NbOFFIVE-1-Ni (1.3 mmol/g) but is lower than that observed for the amine-functionalized MOFs Mg$_2$(dobdc)-N$_2$H$_4$ (3.89 mmol g$^{-1}$) and Mg$_2$(dobpdc)-en (2.83 mmol g$^{-1}$).

Figure 3C:
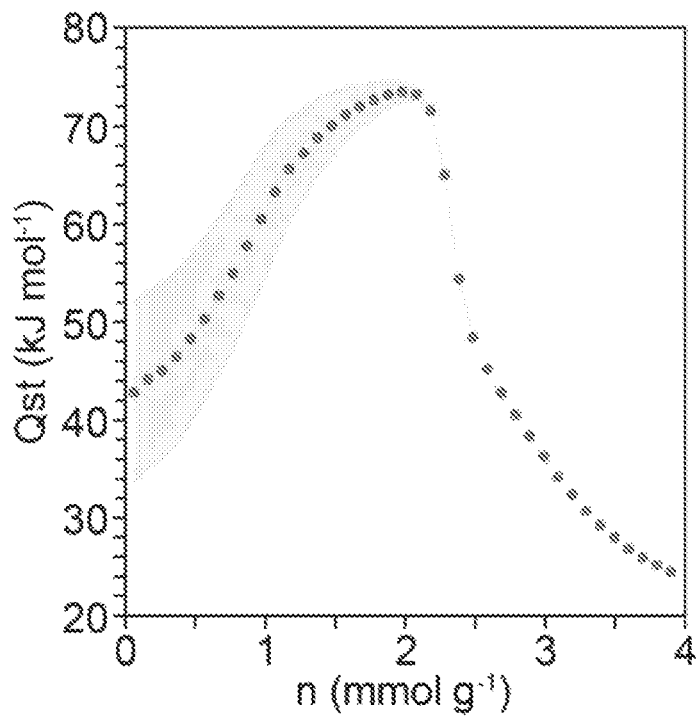
FIG. 3C is a plot showing the isosteric heat of adsorption ($Q_{st}$) for 2* as a function of the amount of $CO_2$ adsorbed (n). The shaded area represents the uncertainty calculated from the linear fit of the isosteres.

CO$_2$ adsorption isotherms were measured over the 300-353 K range and the isosteric heat of adsorption (Q$_{st}$) was calculated as a function of the amount of CO$_2$ adsorbed (n) using the Clausius-Clapeyron equation (FIG. 3C). The plot shows an unusual increase in Q$_{st}$ up to -2.0 mmol g$^{-1}$ followed by a sharp decrease to a value consistent with pore filling and weak physisorptive processes (Q$_{st}$=24 kJ mol$^{-1}$). The large uncertainties in the calculated Q$_{st}$ values suggest that the steep low-pressure CO$_2$ uptake causes equilibration and/or pressure measurement issues which may be responsible for the unusual behavior at low coverage. Nevertheless, the observed maximum of 71 kJ mol$^{-1}$ reflects a strong chemisorption mechanism and is consistent with enthalpies of reaction determined for solution-state CO$_2$ fixation by homogeneous transition metal hydroxide complexes (49-61 kJ mol$^{-1}$).

Figure 4:
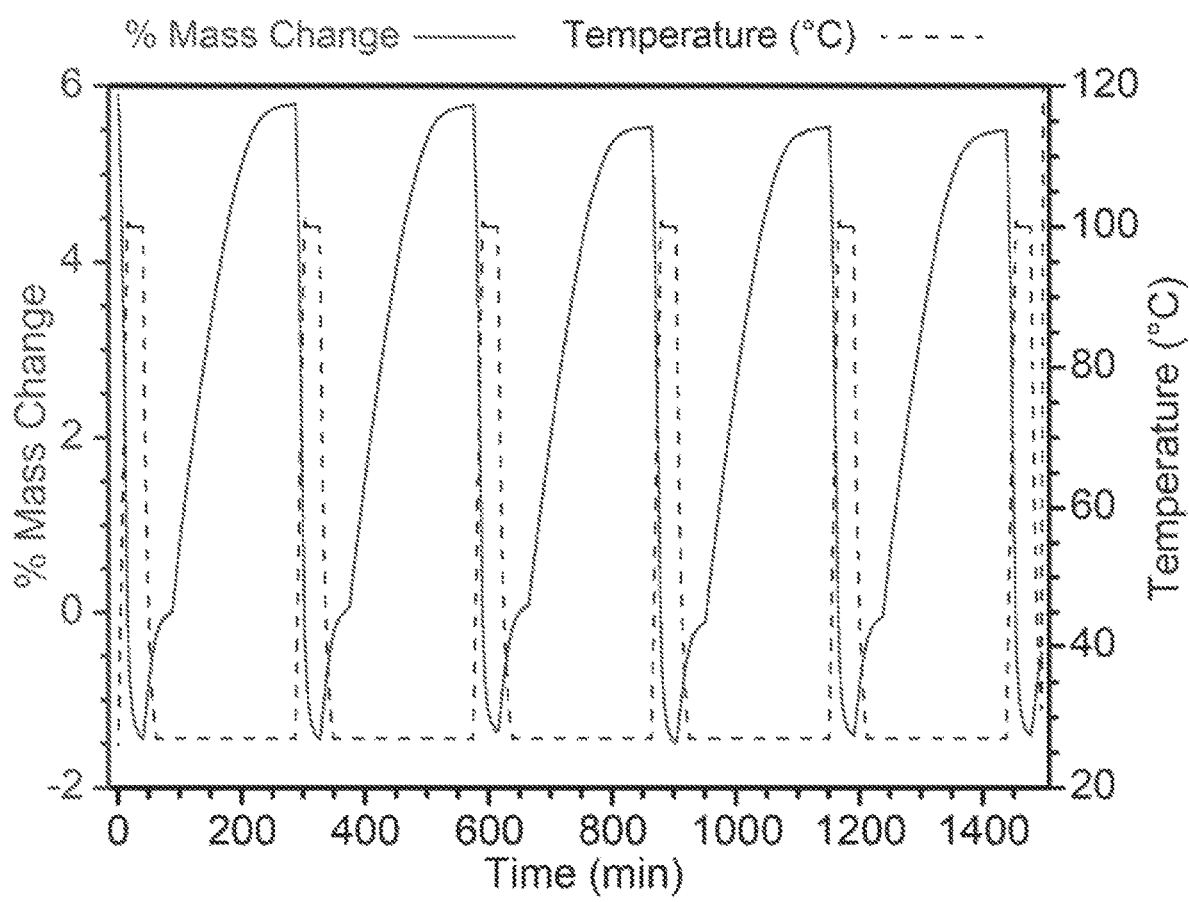
FIG. 4 is a plot showing the adsorption-desorption cycling of 2* under simulated air conditions (395 ppm $CO_2$) showing changes in sample mass (solid trace, left y-axis) and temperature swing (dashed trace, right y-axis).

Thermal swing adsorption (TSA) measurements were carried out to interrogate the stability of 2* to adsorption-desorption cycling and determine its capacity for CO$_2$ uptake from simulated air. At 300 K, the MOF exhibits CO$_2$ uptakes of 9 and 14 wt % upon exposure to 5% CO$_2$ in N$_2$ and pure CO$_2$, respectively. Upon cycling with a simulated air mixture (395 ppm CO$_2$, 21% O$_2$, N$_2$ balance), 2* shows 5.8 wt % uptake (FIG. 4). Only small losses in adsorption capacity were observed after 5-10 adsorption-desorption cycles. Interestingly, the CO$_2$ uptakes measured for 2* in the TSA experiments are lower than predicted from the single component isotherms (9.7% at 0.4 mbar, 13.2% at 50 mbar, and 24.6% at 1 bar). The origin of this disparity is unclear, but similar behavior has been observed for other MOF CO$_2$ sorbents. The performance of 2* under simulated air conditions is slightly better than the 4.6 wt % uptake observed for Mg$_2$(dobdc)-mmen, but modest compared to Mg$_2$(dobpdc)-en (11.8 wt %). However, the temperature required to regenerate 2* (100° C.) is considerably lower than for these amine-grafted materials (150° C.). Column breakthrough curves were also measured for 2* at 298 K using dry and humidified gas mixtures containing 3890 ppm CO$_2$ in N$_2$. Under anhydrous conditions, the CO$_2$ uptake of the MOF adsorbent in the column was in the range of 2.7-3.2 mmol g$^{-1}$ over three runs, close to the expected value based on the single component isotherm (2.45 mmol g$^{-1}$). However, with a water-saturated gas stream, CO$_2$ breakthrough occurred almost immediately, indicating that 2* does not perform well under humid conditions. Nevertheless, the material is stable to ambient conditions and maintains its CO$_2$ uptake capacity in single component isotherm measurements after exposure to air for extended periods of time.

Figure 5:
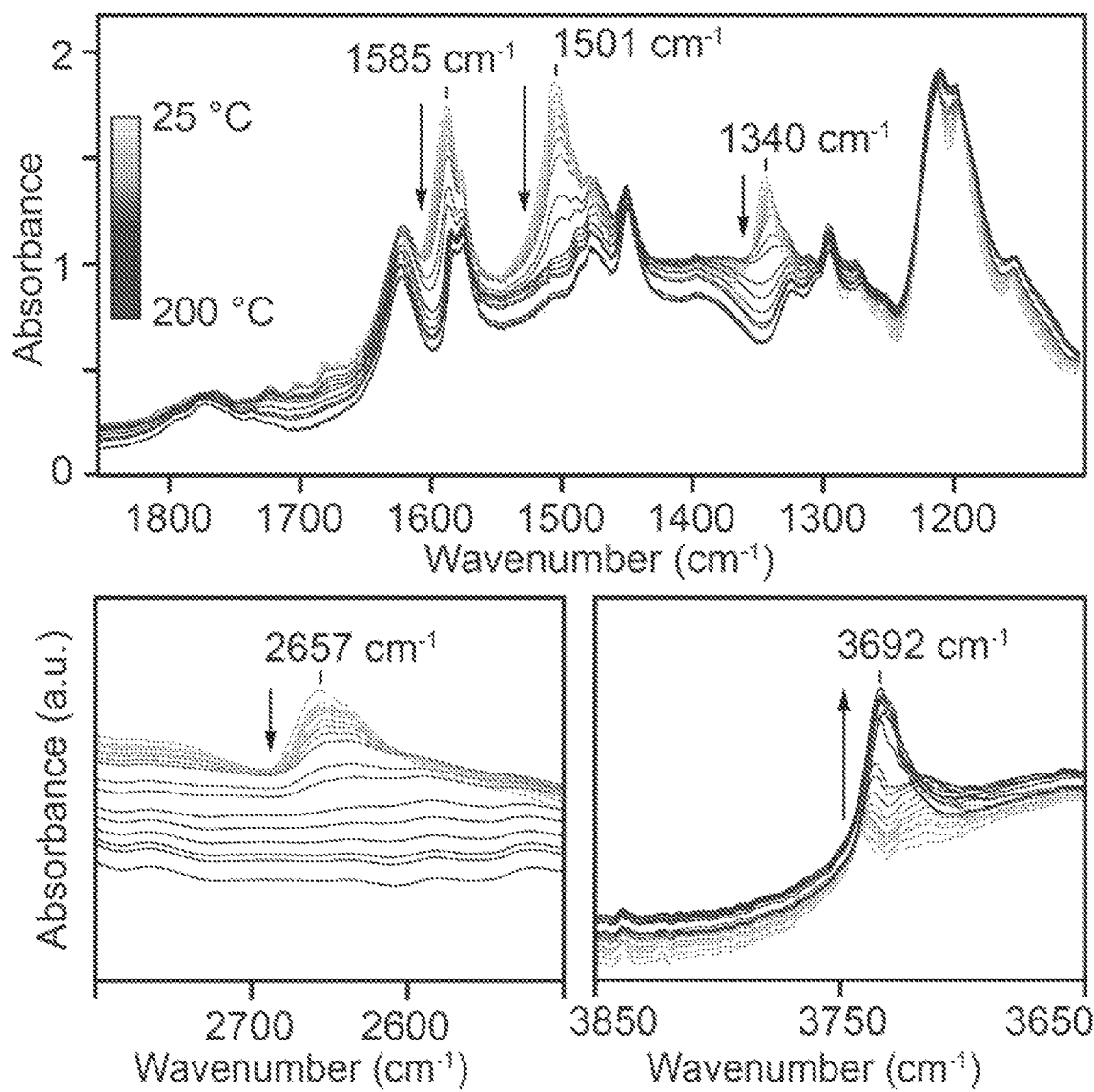
FIG. 5 includes plots showing the evolution of the IR spectrum of 2-$CO_2$ upon heating under a $N_2$ atmosphere.

Diffuse-reflectance IR spectroscopy (DRIFTS) experiments were carried out to gain further insight into the $CO_2$ adsorption mechanism of 2*. At room temperature, the DRIFTS spectrum of 2-$CO_2$ features bands attributable to Zn-02COH groups at 1340, 1501, 1585, and 2657 cm$^{-1}$ (FIG. 5). These assignments were confirmed by comparison with the IR spectrum of the isotopologue 2-$^{13}CO_2$. Upon heating under a flow of dry $N_2$, these bands gradually disappear concomitant with the emergence of a new band at 3692 cm$^{-1}$ corresponding to the O—H stretch of the regenerated Zn—OH groups. The bands appearing at 1340 and 1585 cm$^{-1}$ have been assigned as symmetric and asymmetric C—O stretches of the Zn—$O_2$COH groups. Based on observed trends in homogeneous transition metal bicarbonate complexes, the appearance of the asymmetric C—O stretch at 1585 cm$^{-1}$ suggests that the bicarbonate ligands in 2-$CO_2$ should adopt a bidentate coordination mode. Intriguingly, the low energy O—H stretch observed at 2657 cm$^{-1}$ for 2-$CO_2$ indicates that the Zn-02COH groups are engaged in hydrogen-bonding interactions. This feature has further prompted assignment of the band at 1501 cm$^{-1}$ as an O—H—O bend. These spectral features are consistent with those observed for hydrogen-bonded dimers of transition metal bicarbonate complexes.

Figure 6A:
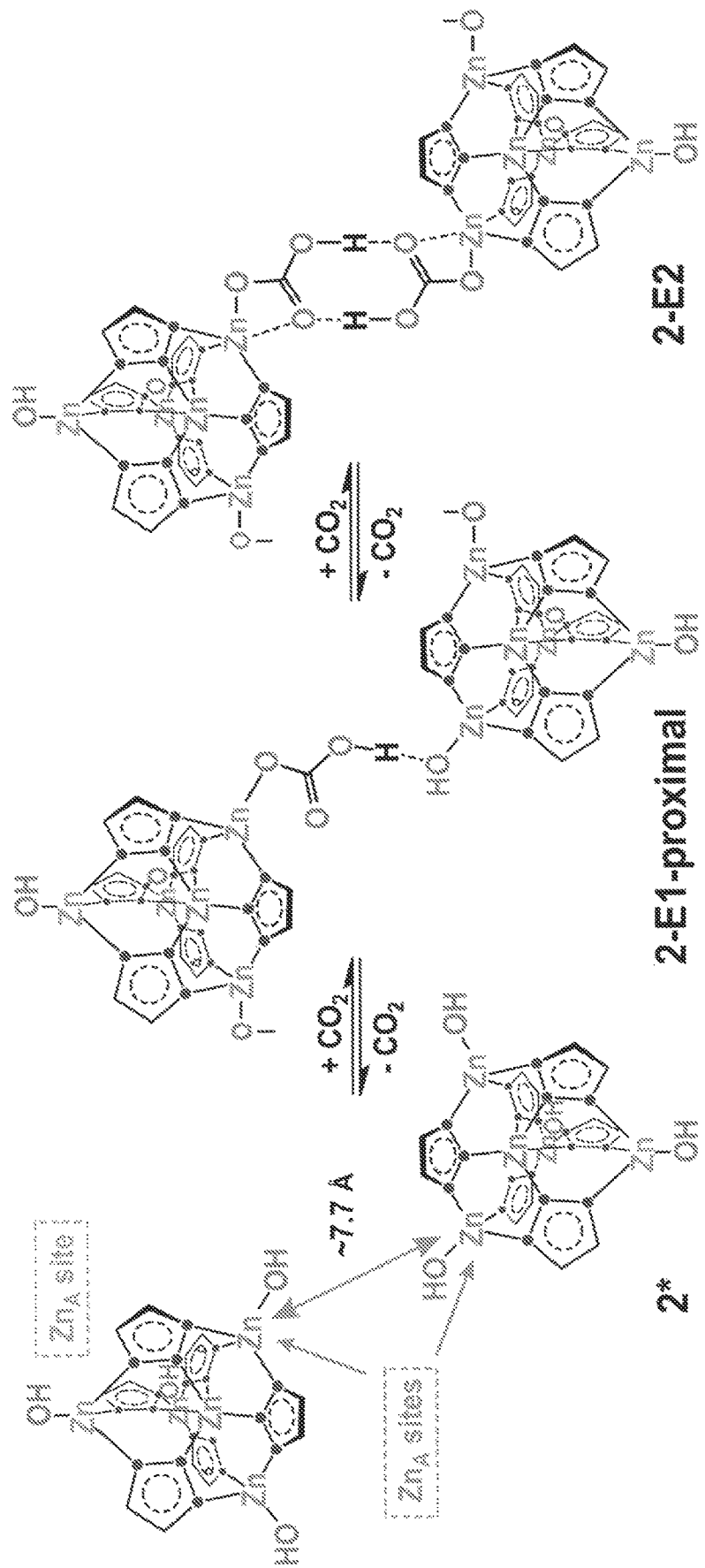
FIG. 6A shows the inter-cluster hydrogen bonding interactions resulting from sequential $CO_2$ chemisorption at the $Zn_E$—OH sites.
Figure 6B:
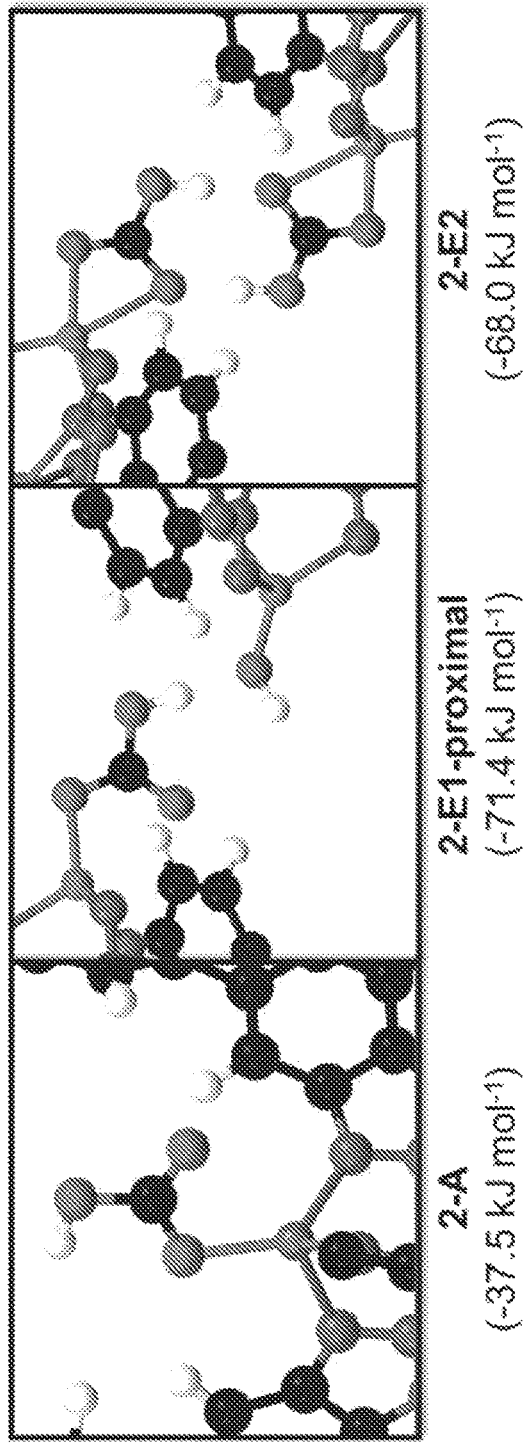
FIG. 6B illustrates the optimized structures of 2-A, 2-E1-proximal, and 2-E2.

The structure of CFA-1 shows that the distance between $Zn_E$ centers of neighboring SBUs (~7.7 Å) is sufficiently short to accommodate inter-cluster hydrogen bonding between coordinated ligands (FIG. 6A). Thus, we considered that these interactions might play a significant role in $CO_2$ capture by 2* in the same way that secondary coordination sphere interactions regulate the activity of α-CA. Periodic DFT calculations were used to explore the nature and strength of the putative hydrogen bonding interactions. Three different hydrogen bonding orientations were investigated for structures containing one $Zn_E$—$O_2$COH group per pair of adjacent $Zn_E$ sites. In the lowest energy structure, 2-E1-proximal, the $Zn_E$—$O_2$COH group engages in a strong hydrogen bonding interaction with the nearby $Zn_E$—OH sites, yielding a $CO_2$ binding energy of −71.4 kJ mol$^{-1}$. The optimized structure containing two adjacent $Zn_E$—$O_2$COH groups (2-E2) shows the formation of strongly hydrogen-bonded bicarbonate dimers with a binding energy of −68 kJ per mol of $CO_2$. In both cases, the formation of inter-cluster hydrogen bonding interactions results in a significant increase in $CO_2$ binding energy versus the isolated $Zn_A$ sites (~37.5 kJ mol$^{-1}$, 2-A). The heat of adsorption plot in FIG. 3C shows a steep drop-off around 2 mmol g$^{-1}$, which is in between the expected uptake of one $CO_2$ per pair of $Zn_E$ sites (~1.36 mmol g$^{-1}$) and binding at both adjacent sites (2.73 mmol g$^{-1}$). This ambiguity coupled with the similar $CO_2$ binding energies calculated for 2-E1-proximal and 2-E2 make it difficult to presently establish which of these hydrogen bonding motifs is operative in 2-$CO_2$. However, it is clear that cooperative hydrogen bonding interactions play an important role in $CO_2$ adsorption by 2*, and further investigations are underway to more fully elucidate their nature and implications.

Conclusion

In summary, a mild post-synthetic ligand exchange procedure followed by thermal activation has been used to generate nucleophilic Zn—OH sites in CFA-1. A $CO_2$/$HCO_3$-chemisorption process aided by inter-cluster hydrogen bonding interactions enables $CO_2$ uptake at partial pressures relevant for trace $CO_2$ capture from air. Although cooperative binding mechanisms have been implicated in gas adsorption by MOFs, they remain rare. The findings in this example illustrate the potential of using bioinspired strategies to design cooperative binding motifs and develop next generation materials for gas adsorption applications.

Example 2. Cobalt-Containing and Nickel-Containing MOFs for Acidic Gas Capture

Figure 7:
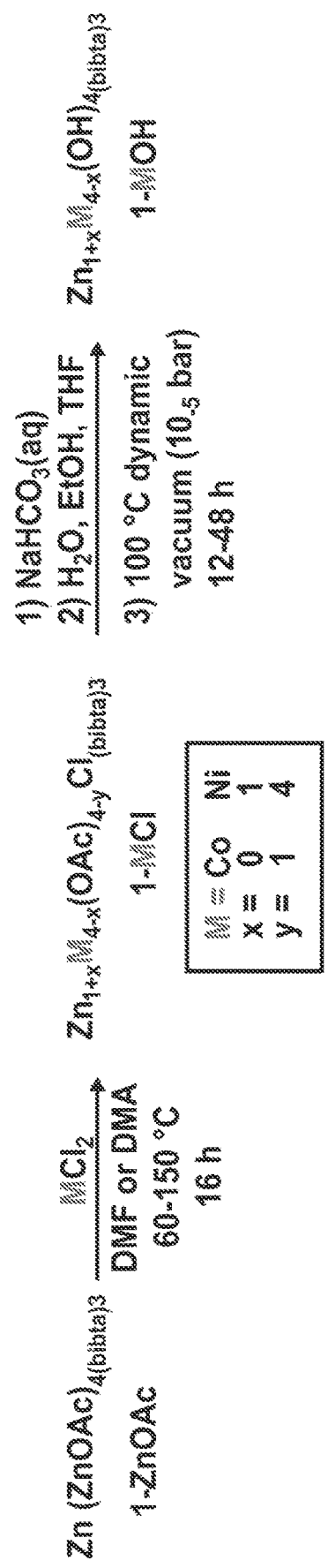
FIG. 7 schematically illustrates the synthesis of heterobimetallic MOFs 1-CoCl and 1-NiCl via postsynthetic metal exchange and 1-CoOH and 1-NiOH via postsynthetic ligand exchange followed by activation.
Figure 8A:
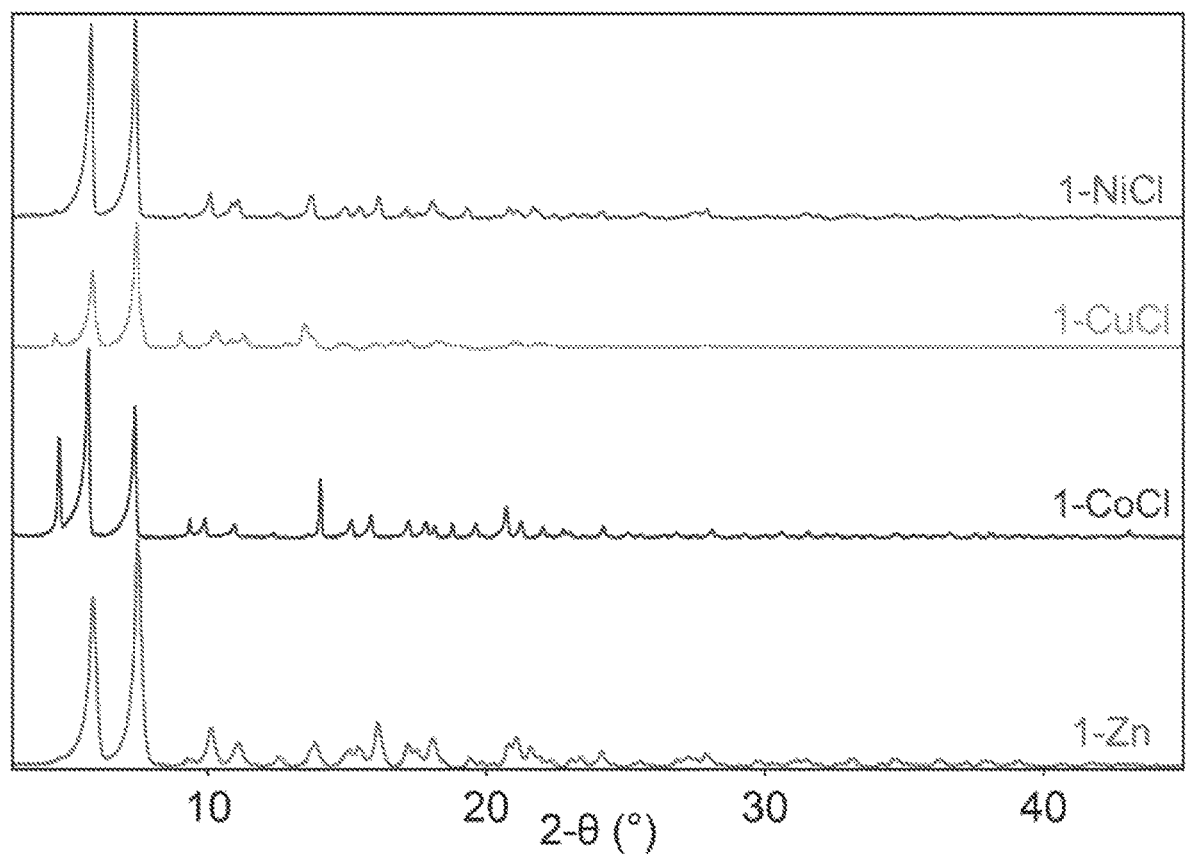
FIG. 8A shows the PXRD patterns of 1-ZnOAc, 1-CoCl, 1-CuCl and 1-NiCl.

In this example, post-synthetic metal exchange procedures were used to synthesize heterobimetallic analogues of CFA-1 (1-ZnOAc, [Zn(ZnO$_2$CCH$_3$)$_4$(bibta)$_3$], bibta$^{2-}$=5,5'-bibenzotriazolate) incorporating cobalt (1-CoCl) or nickel (1-NiCl) at the metal cluster building units (FIG. 7). 1-CoCl was prepared by heating a suspension of 1-Zn in a DMF solution (DMF=N,N-dimethylformamide) of CoCl2 at reflux for 16 h. 1-NiCl was prepared similarly by heating a suspension of 1-ZnOAc in a DMF solution of NiCl$_2$ at 80° C. for 16 h. The solid products were collected by filtration and washed with fresh DMF until the UV-Vis absorption bands corresponding to $CO_2$+ and $Ni^{2+}$ were no longer be detected in the filtrate. The powder X-ray diffraction (PXRD) patterns of 1-CoCl and 1-NiCl closely match that of 1-ZnOAc, indicating that the cation exchange does not result in any major structural changes (FIG. 8A).

Figure 8B:
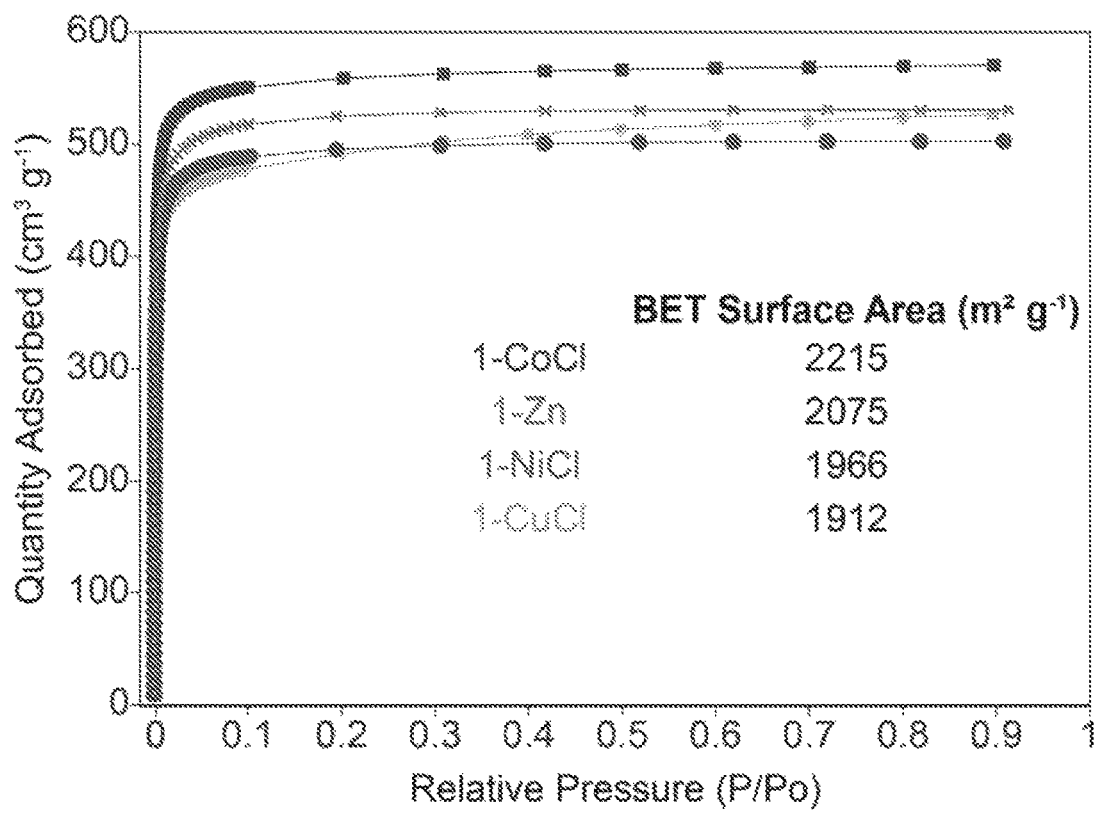
FIG. 8B shows $N_2$ adsorption isotherms (77 K) for 1-ZnOAc, 1-CoCl, 1-CuCl, and 1-NiCl.

Samples of 1-CoCl and 1-NiC were desolvated by heating under dynamic vacuum (10-4 Torr) at 100° C. for 12-24 h. Subsequent $N_2$ adsorption isotherm measurements (77 K) gave calculated Brunauer-Emmett-Teller (BET) surface areas of 2215 and 1966 m$^2$ g$^{-1}$ for 1-CoCl and 1-NiCl, respectively. These values are similar to the BET surface area determined for 1-ZnOAc (2075 m$^2$ g$^{-1}$), supporting cation exchange at the metal cluster building units rather than encapsulation of transition metal salts within the pores of the framework (FIG. 8B). Inductively coupled plasma optical emission spectroscopy (ICP-OES) analysis showed a Co:Zn molar ratio of 4.61:1 in 1-CoCl and a Ni:Zn molar ratio of 1.57:1 in 1-NiCl. The solution-state $^1$H NMR spectrum of a sample of 1-CoCl digested using a 3:1 v/v mixture of CF$_3$CO$_2$H/DMSO-d$_6$ shows a resonance associated with CH$_3$CO$_2$H at -1.8 ppm. Integration of the spectrum showed that CH$_3$CO$_2$H is present in an -1:1 ratio with respect to H$_2$bibta. No CH$_3$CO$_2$H was detected in the solution-state $^1$H NMR spectrum of an acid-digest sample of 1-NiCl. Halide analysis found 2.58 and 10.98 wt % chlorine in samples of 1-CoCl and 1-NiCl. The data described above supports empirical formulas of Co$_4$Zn(OAc)$_3$Cl(bibta)$_3$ for 1-CoCl and Ni$_3$Zn$_2$Cl$_4$(bibta)$_3$ for 1-NiCl.

Figure 9:
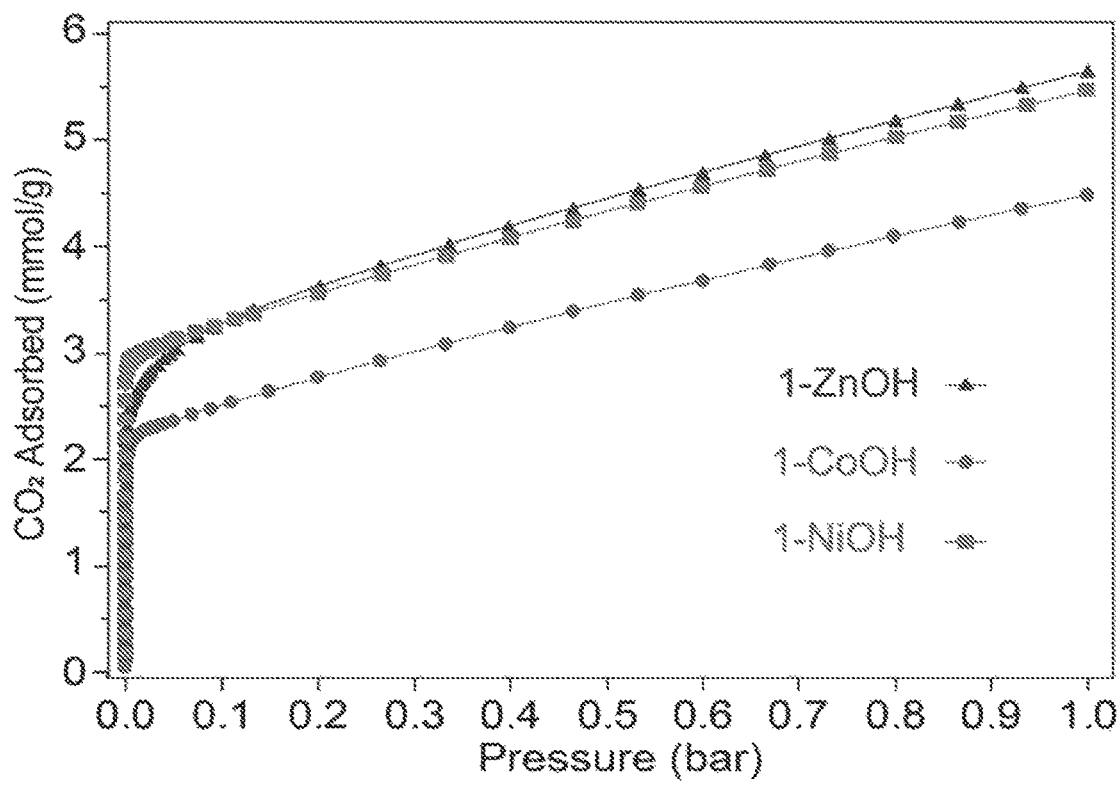
FIG. 9 shows $CO_2$ adsorption isotherms (300 K) for 1-ZnOH, 1-CoOH, and 1-NiOH.

Postsynthetic X-type ligand exchange was carried out by treating as-synthesized samples of 1-CoCl and 1-NiCl with aqueous solutions of 1.0 M NaHCO$_3$. The solids were collected by filtration and washed with water, ethanol, and tetrahydrofuran. Subsequent activation by heating at 100° C. under dynamic vacuum for 16-48 h generated 1-CoOH and 1-NiOH. $CO_2$ isotherms measured at 300 K show steep $CO_2$ uptake at low pressures, suggesting a chemisoprtive mechanism similar to that previously observed for 1-ZnOH ([Zn(ZnOH)$_4$(bibta)$_3$]) (FIG. 9). 1-CoOH and 1-NiOH adsorb 1.68 and 2.75 mmol $CO_2$ g$^4$, respectively, at 0.4 mbar $CO_2$ pressure.

Figure 10A:
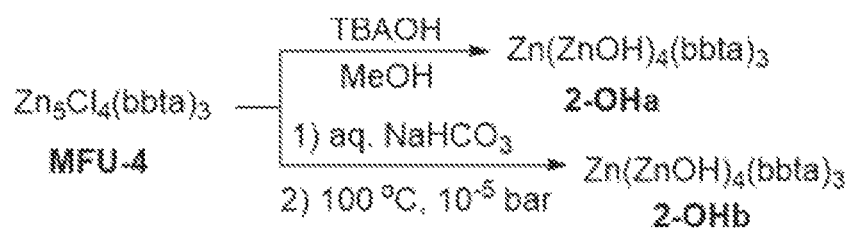
FIG. 10A schematically illustrates the synthesis of 2-OHa/b.
Figure 10A:
Figure 10B:
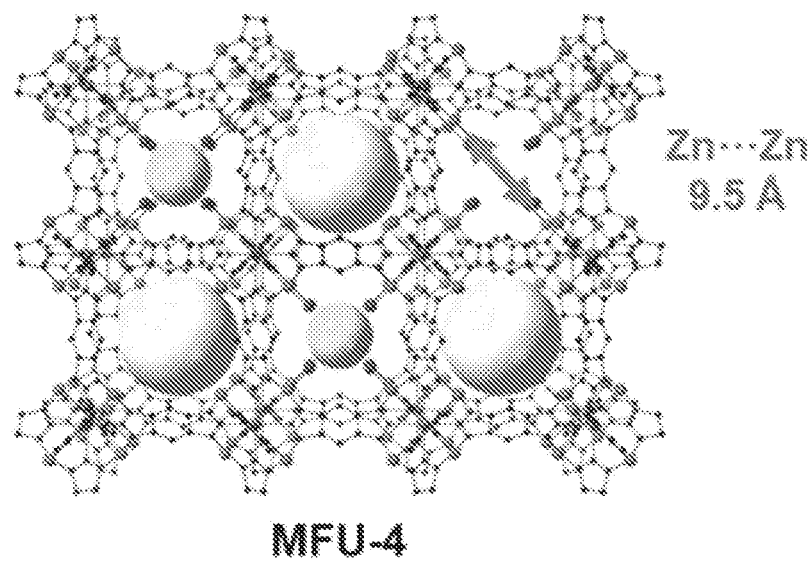
FIG. 10B illustrates the framework structure of MFU-4 showing the alternating system of pores and closest Zn . . . Zn distances.

Two different postsynthetic ligand exchange strategies were used to generate ZnOH-functionalized analogues of MFU-4 (FIG. 10A). MFU-4 adopts a different framework topology than CFA-1 but contains similar metal cluster building units. The Zn—Cl groups of the metal clusters all project into the same symmetry equivalent pore (smaller sphere), leaving the adjacent pores (larger sphere) unfunctionalized (FIG. 10B). The short bbta$^{2-}$ linkers and cubic arrangement of Zn—Cl groups in MFU-4 lead to intercluster Zn . . . Zn distances of ~9.5 Å, which are slightly longer than those found in CFA 1 (~7.7 Å).

Figure 11:
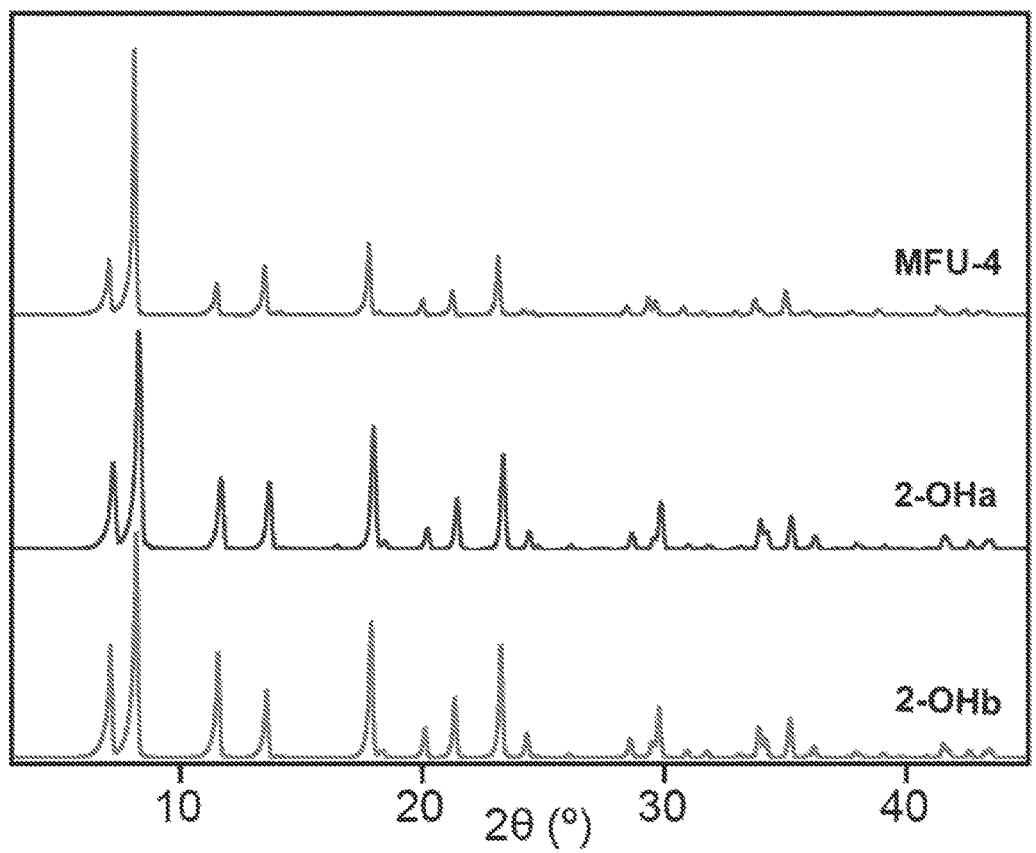
FIG. 11 is a plot showing the PXRD patterns of MFU-4, 2-OHa, and 2-OHb.

MFU-4 was prepared using established procedures. 2-OHa was synthesized using a postsynthetic $Cl^-/HCO_3^-$ ligand exchange procedure (FIG. 10A). The ligand exchange was carried out by treating samples of MFU-4 and MFU-4l with aqueous solutions of 0.1 M $NaHCO_3$. The solid products were collected by filtration and washed with water and tetrahydrofuran. 2-OHa was then obtained by activating the solid product under dynamic vacuum at 100° C. for 12-48 h. For comparison, 2-OHb has also been prepared using a direct $Cl^-/OH^-$ ligand exchange procedure that was recently reported in the literature. The PXRD patterns of the resulting materials closely match that of MFU-4, indicating that the ligand exchange procedures do not result in any major structural changes (FIG. 11). The products were also analyzed by X-ray photoelectron spectroscopy (XPS). The disappearance of the Cl 2p signals in the XPS spectra of 2-OHa and 2-OHb indicate nearly quantitative replacement of chloride with bicarbonate/hydroxide for both ligand exchange procedures. The solution-state $^1H$ NMR spectrum of an acid-digested sample of activated 2-OHa shows only resonances associated with the protonated linker, $H_2bbta$. However, the $^1H$ NMR spectrum of acid-digested 2-OHb shows a signal corresponding to MeOH solvent at 3.17 ppm and integration of the spectrum reveals that MeOH is present in a 0.3:1 ratio with respect to $H_2bbta$.

Figure 12A:
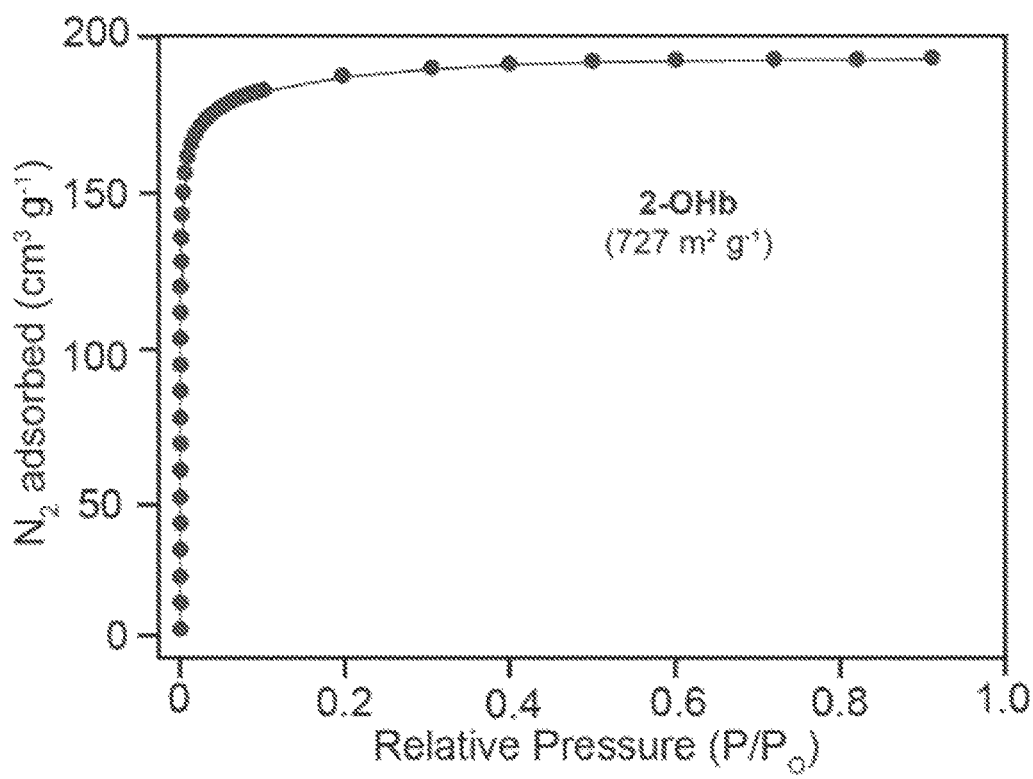
FIG. 12A is a plot showing a $N_2$ isotherm collected at 77 K for 2-OHb.
Figure 12B:
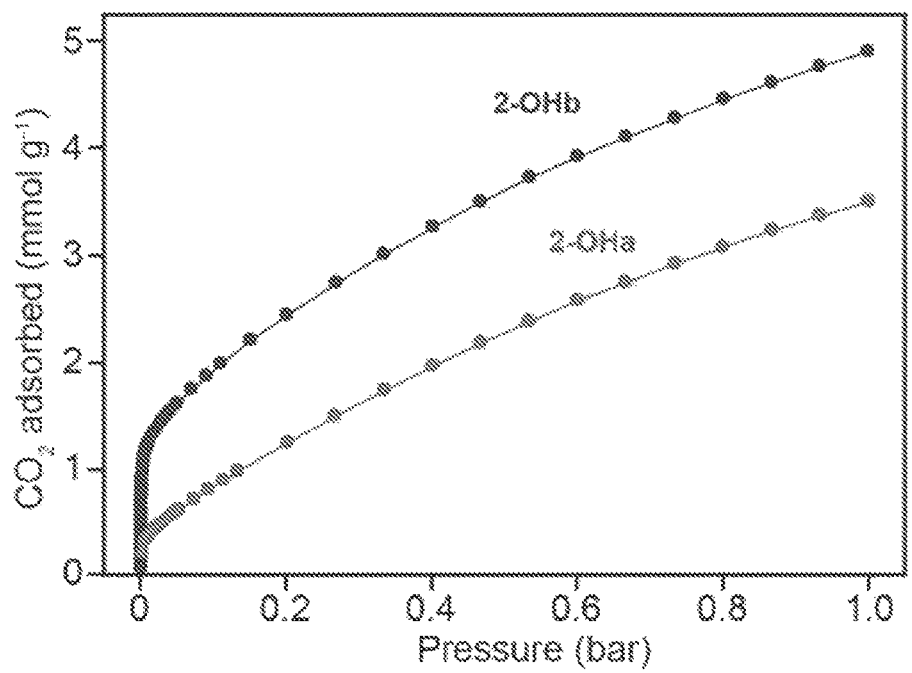
FIG. 12B is a plot showing $CO_2$ isotherms collected at 300 K for 2-OHa and 2-OHb.

A $N_2$ adsorption isotherm (77 K) was measured for 2-OHb and gave a calculated BET surface area of 727 $m^2g^{-1}$ (FIG. 12A). This value is significantly lower than the predicted surface area of MFU-4 (1611 $m^2g^{-1}$), but to the best of our knowledge, no other experimental surface area measurements have been reported. $CO_2$ adsorption isotherms were measured at 300 K for 2-OHa and 2-OHb (FIG. 12B). Both materials exhibit steep $CO_2$ uptake at low pressures and adsorb 0.20 and 0.79 mmol $CO_2$ $g^{-1}$ at 0.4 mbar, respectively. 2-OHb shows a greater low pressure $CO_2$ adsorption capacity than 2-OHa, but neither perform as well as 1-ZnOH, 1-CoOH, or 1-NiOH. The adsorption kinetics of 2-OHa and 2-OHb are also extremely slow and up to 8 days were required for measurement of a full $CO_2$ adsorption isotherm at 300 K.

Example 3. MOFs Including M-OH Moieties for Acidic Gas Capture

Figure 13:
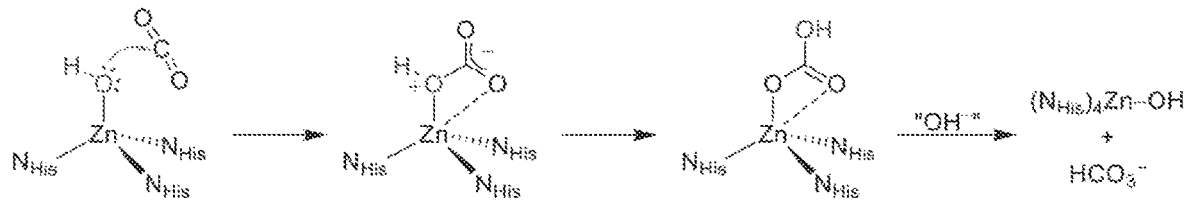
FIG. 13 illustrates the mechanism for conversion of $CO_2$ to bicarbonate at the CA active site.

Carbonic anhydrases (CA) are metalloenzymes that catalyze the hydration of carbon dioxide to bicarbonate at rates approaching one million per second. The active site responsible for this fast chemical reaction contains a tetrahedral zinc ion bearing a terminal hydroxide ligand (FIG. 13). Small molecule mimics of the CA active site can react with atmospheric $CO_2$ in aqueous or organic solutions, but atmospheric $CO_2$ adsorption in the solid state has rarely been reported. However, porous materials containing nucleophilic transition metal hydroxide (M-OH) groups can act as functional mimics of the CA active site, paving the way for a new class of highly selective $CO_2$ adsorbents. This example describes the design and study of porous metal-organic frameworks (MOFs) incorporating functional mimics of the CA active site. Structure-function and composition-function relationships enable the development of new MOF adsorbents for selective, atmospheric $CO_2$ capture and potential application in carbon dioxide removal and atmosphere revitalization systems, for example, in confined environments (e.g., spacecraft, submersibles, mines, etc.).

This example describes two specific directions for the development and study of new $CO_2$ adsorbents:

Direction 1: Postsynthetic modification strategies will be used to generate terminal transition metal hydroxide (M-OH) groups at the secondary building units of thermally and chemically stable benzotriazolate MOFs.

Direction 2: Postsynthetic modification strategies will be used to support terminal M-OH species at bipyridine linker sites of thermally and chemically stable carboxylate MOFs, generating highly reactive species whose molecular analogues have been difficult isolate and study in homogeneous solution.

Background

MOFs are a versatile class of porous coordination polymers that excel in gas storage and separation applications. Their success is in large part due to the availability of an essentially infinite pool of organic and inorganic building blocks that can be used to vary structure and porosity as well as introduce chemically reactive functional groups. MOFs can be used in $CO_2$ capture applications, and strategies can be used to impart selectivity for adsorption of $CO_2$ over other gases. Most MOFs rely on physisorptive interactions (i.e., weak intermolecular forces) to confer selective adsorption of $CO_2$. In these cases, the separation of $CO_2$ from gases such as $N_2$ and $CH_4$ is facilitated by its larger quadrupole moment and polarizability, which lead to stronger interactions with a framework surface. However, the low isosteric enthalpy of adsorption typically associated with physisorption (<50 kJ $mol^{-1}$) precludes efficient $CO_2$ capture at atmospheric concentrations. Moreover, $CO_2$ separation from complex gas mixtures containing $H_2O$ or other polar gas molecules is often not possible owing to their ability to sequester the strongest $CO_2$ binding sites.

MOFs that employ strong chemisorptive interactions (e.g., covalent bond formation) can be used for selective $CO_2$ capture at low pressures. Examples include materials grafted with amine functional groups that react with $CO_2$ to form carbamates have emerged as state-of-the-art adsorbents. Among these, $Mg_2$(dobpdc)-en and $Mg_2$(dobpdc)-mmen ($dobpdc^{4-}$=4,4'-dioxidobiphenyl-3,3'-dicarboxylate, en=ethylenediamine, mmen=N,N'-dimethylethylenediamine) show exceptional $CO_2$ uptake under simulated air conditions, adsorbing 2.83 mmol $g^{-1}$ (11.1 wt %) and 2.0 mmol $g^{-1}$ (8.1 wt %), respectively, at 0.39 mbar and 298 K. Their $CO_2$ uptake at 5 mbar (equivalent to ~4933 ppm $CO_2$ in air) and 298 K is slightly greater, and they significantly outperform Zeolite 5A under these conditions (Table 1). The MOF adsorbents can be fully regenerated upon heating at 150° C., and only small losses in capacity were observed after 5-10 adsorption/desorption cycles. This performance is impressive in terms of the capacity achieved at atmospheric $CO_2$ levels and reflects the high enthalpies of adsorption ($-\Delta H_{ads} \approx$50-90 kJ $mol^{-1}$) associated with carbamate formation. However, the diamine functional groups in these materials are grafted via dative bonds to the framework metal ions, and long term cycling with thermal regeneration will result in gradual loss of the volatile diamines. In addition to decreasing the $CO_2$ affinity, diamine volatilization could potentially pollute other components of an atmosphere revitalization system or result in personal exposure above safety limits in a confined environment. Consequently, a chemisorptive approach that involves non-volatile reactive groups is needed.

TABLE 1

Chemisorption site densities and $CO_2$ adsorption properties of some state-of-the-art adsorbents ($\Delta H_{ads}$ = isosteric heat of adsorption).

| MOF | Formula | Chemisorption Site Density (mmol g$^{-1}$) | $CO_2$ uptake @ 5 mbar (mmol g$^{-1}$ wt %) | $-\Delta H_{ads}$ (kJ mol$^-$) |
|---|---|---|---|---|
| MAF-X27ox | Co$^{II}$Co$^{III}$(OH)Cl$_2$(bbta) | 2.75 | 1.5 (6.2) | 71 |
| Mg$_2$(dobpdc)-mmen | Mg$_2$(dobpdc)(mmen)$_{1.6}$(H$_2$O)$_{0.4}$ | 3.42 | 2.6 (10.3) | 71 |
| Mg$_2$(dobpdc)-en | Mg$_2$(dobpdc)(en)$_{1.6}$(H$_2$O)$_{0.4}$ | 3.79 | 3.3 (12.7) | 50 |
| Zeolite 5A | — | — | 0.85 (3.6) | 45 |

Reversible $CO_2$ capture can be accomplished using MOFs containing Co$^{III}$—OH and Mn$^{III}$—OH groups. For example, MAF-X25ox ([Mn$^{II}$Mn$^{III}$(OH)C$_2$(bbta)]) and MAF-X27ox [Co$^{II}$Co$^{III}$(OH)C$_{12}$(bbta)] (bbta$^{2-}$=benzobistriazolate) exhibit remarkably good $CO_2$ uptake at low partial pressures, adsorbing 3.5 mmol g$^{-1}$ (13.3 wt %) at 0.1 bar and 298 K. The $CO_2$ capture ability of these MOFs is not compromised by the presence of water, and the adsorption behavior is unchanged at 85% relative humidity. However, their capacity deteriorates quickly at lower $CO_2$ pressures and is estimated to be less than 1.5 mmol g$^{-1}$ (6.2 wt. %) at 5 mbar $CO_2$.

MAF-X25ox and MAF-X27ox are prepared by oxidation of the parent MOFs, MAF-X25 (Mn$_2$Cl$_2$(bbta)) and MAF-X27 (Co$_2$Cl$_2$(bbta)), with excess hydrogen peroxide under alkaline conditions. This procedure oxidizes the M$^{II}$ ions in the chain-type secondary building units (SBUs) to reactive M$^{II}$-OH species. The maximum oxidation yield is around 50%, resulting in a reactive site density of 2.75 mmol g$^{-1}$, which in line with the observed $CO_2$ uptake upon exposure to 10% $CO_2$/N$_2$. Thus, the frameworks accommodate alternating M$^{II}$/M$^{III}$-OH species, but not fully oxidized M$^{III}$-OH chains that would maximize the density of chemisorption sites. Moreover, the oxidative preparation limits the approach to metals with accessible M$^{II/III}$ redox couples and precludes the possibility of generating more nucleophilic M$^{II}$-OH groups.

Innovation and Relevance

Nucleophilic M-OH groups incorporated in MOFs mimics the $CO_2$ fixation mechanism of CA active sites, allowing fast and selective $CO_2$ capture from ambient air. Systematic studies of the reactivity and $CO_2$ adsorption behavior of MOFs with different topologies and containing M-OH groups with a range of first row transition metals will enable the development of structure-function and composition-function relationships that provide further insight into this strong chemisorption mechanism. This will guide optimization of CA-mimicking MOF adsorbents for low pressure $CO_2$ capture applications. Importantly, these strategies rely on postsynthetic modification of existing MOFs rather than the design and synthesis of new frameworks with unknown properties. This approach allows for rapid development and study of new $CO_2$ adsorbents by reducing the time needed to optimize linker and MOF syntheses and carry out extensive structural characterization. The materials developed in Directions 1 and 2 will be good candidate adsorbents for $CO_2$ capture and release based on good chemical and thermal stability profiles and a selective and strongly exothermic chemisorption mechanism. The absence of volatile components will provide good reliability and long-term performance. In addition, a theoretical analysis of the $CO_2$ uptake capacities suggests that the target materials should be competitive with or exceed the abilities of current adsorbents.

Figure 14A:
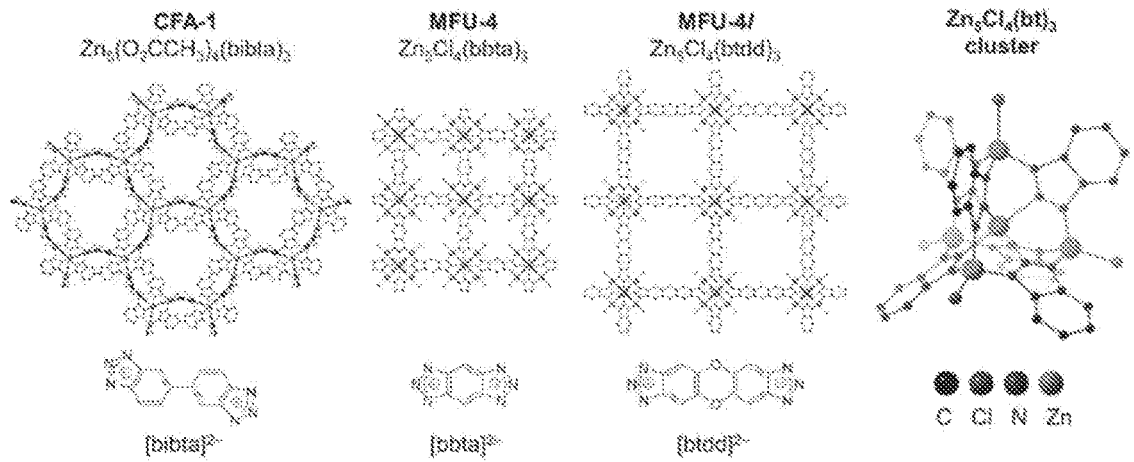
FIG. 14A illustrates the framework structures of CFA-1, MFU-4, and MFU-4l along with the $[Zn_5X_4bt_6]$ cluster building unit.
Figures 14B, 15A:
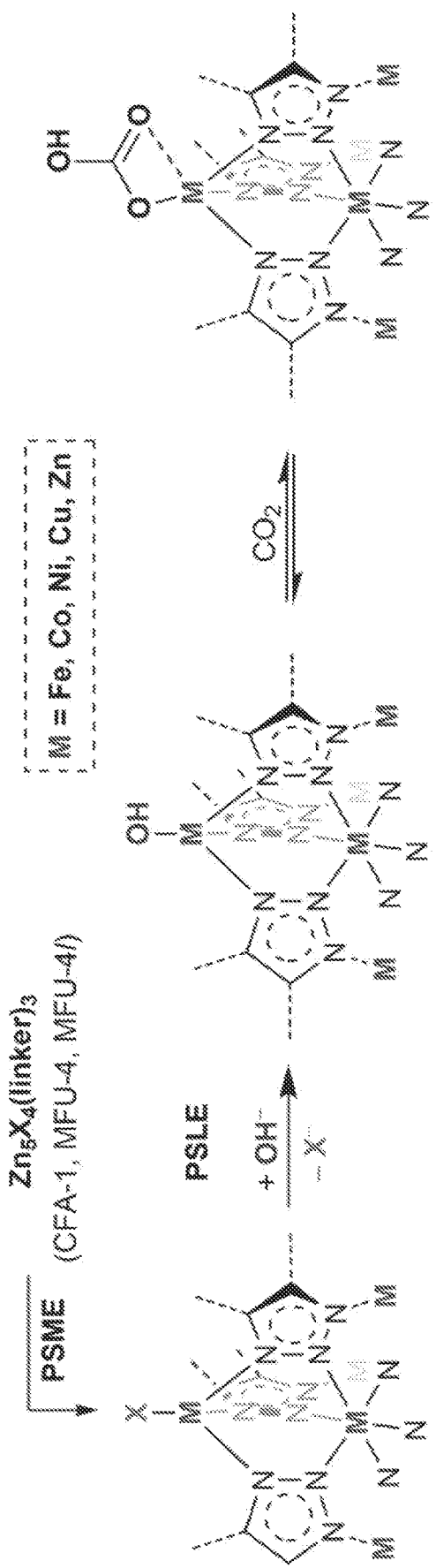
FIG. 14B is a general scheme showing $X^-/OH^-$ postsynthetic ligand exchange (PSLE) and subsequent $CO_2$ capture reaction FIG. 15A show DFT-calculated enthalpies of reaction with $CO_2$. Structure optimizations and frequency calculations were carried out using the BP86 functional and the mixed basis set: 6-31g(d) for C,H; 6-31+g(d) for N,O; LANL2DZ for Zn, Ni, Co.

As part of Direction 1, methodologies for X$^-$/OH$^-$ postsynthetic ligand exchange (PSLE) will be developed for the benzotriazolate MOFs MFU-4, MFU-4l, and CFA-1 (FIGS. 14A-14B). These MOFs exhibit good thermal and chemical stabilities that are in line with the requirements for adsorption-desorption cycling under atmospheric conditions. Unlike the chain-type SBUs found in MAF-X25 and MAF-X27, they contain discrete [Zn$_5$X$_4$bt$_6$] clusters (X=Cl, CH$_3$CO$_2$, bt=benzotriazolate), also referred to as Kuratowski clusters. The SBUs feature four pseudo-tetrahedral metal ions in coordination environments that resemble the CA active site (FIG. 13) and one octahedrally coordinated ion at the center of the cluster. Terminal Zn—X groups are exposed at the internal surface of the pores or channels of these materials and thus poised to interact with guest molecules. Conversion of the Zn—X groups to Zn—OH species will provide a high density of chemisorption sites (~3.3-4.6 mmol g$^4$). The four Zn—OH sites per SBU cluster are all expected to be reactive for M-OH→M-OCO$_2$H chemisorptive processes, but it is possible that positive or negative cooperative effects may occur owing to electronic communication through the cluster. Moreover, the lower oxidation state and oxophilicity of the Zn$^{II}$—OH groups is anticipated to result in more reactive (nucleophilic) sites than for the Co$^{III}$—OH and Mn$^{III}$—OH species found in MAF-X25ox and MAF-X27ox. MFU-4, MFU-4l, and CFA-1 have been synthesized with Cl$^-$ or CH$_3$CO$_2^-$ as X-type ligands. PSLE reactions of Cl$^-$ for HCO$_2^-$, NO$_2^-$, NCO$^-$, CH$_3$CO$_2^-$, and F$^-$ have been successfully carried out in MFU-4l, but attempted Cl$^-$/OH$^-$ exchange by treatment with OH$^-$ sources resulted in framework decomposition. This result points to the difficulty of generating reactive M-OH species in MOFs using direct X/OH$^-$ ligand exchange as even some of the most chemically robust MOFs are susceptible to degradation by OH$^-$. M-OH groups are often present in MOFs with SBUs containing high oxidation state metal ions such as Cr$^{3+}$ and Zr$^{4+}$, but the oxophilicity of these species results in poorly nucleophilic OH groups that do not exhibit $CO_2$ chemisorption via a M-OH→M-OCO$_2$H process. Thus, new and mild PSLE methods for X/OH$^-$ ligand exchange are needed to incorporate reactive Mu-OH species in MOFs.

Figure 15B:
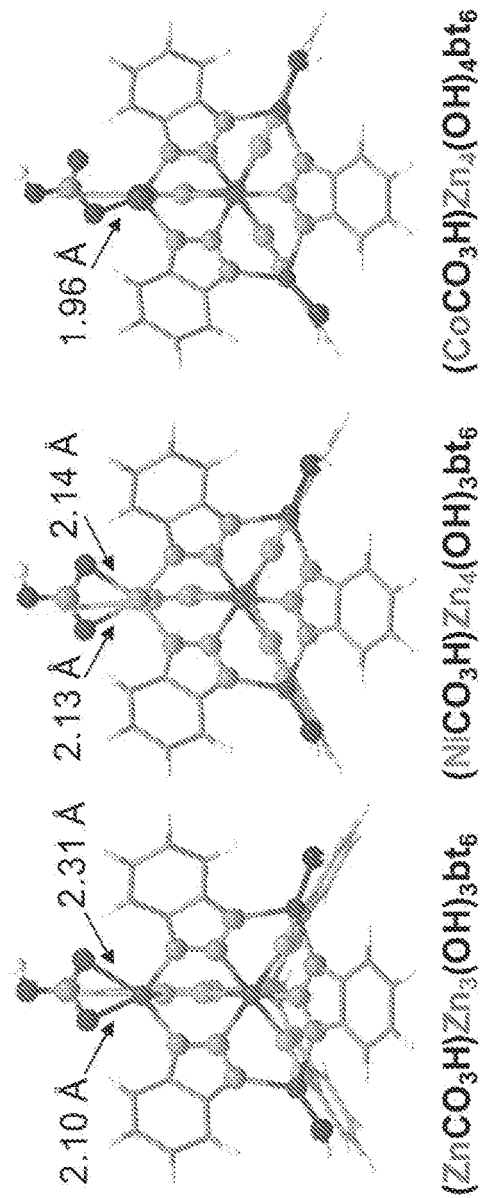
FIG. 15B shows optimized geometries of $(MCO_3H)Zn_4(OH)_4bt_6$ model clusters. Structure optimizations and frequency calculations were carried out using the BP86 functional and the mixed basis set: 6-31g(d) for C,H; 6-31+g(d) for N,O; LANL2DZ for Zn, Ni, Co.
Figure 15B:

The Kuratowski cluster-based SBUs in CFA-1 and MFU-4l are amenable to postsynthetic metal exchange (PSME), allowing facile access to MOFs containing heterobimetallic clusters of the general formula [M$_x$Zn$_{(5-x)}$X$_4$bt$_6$] where M=Mn, Fe, Co, Ni, Cu and x=1-4. Density functional theory (DFT) methods were used to calculate the enthalpies for gas phase reaction of $CO_2$ with some model Kuratowski clusters including Zn$_5$(OH)$_4$bt$_6$ and MZn$_4$(OH)$_4$bt$_6$ (M=Ni, Co) (FIG. 15A). The calculated enthalpies ($-\Delta H_{rxn}$) follow the trend Zn≈Ni>Co. This trend tracks with the decrease in nucleophilicity of the OH ligands across the metal series and appears to correlate with the propensity of the metal to bind the resulting bicarbonate ligand in a bidentate fashion. As shown in FIG. 15B, the $HCO_3^-$ ligand chelates to the Zn and Ni ions in an unsymmetrical and symmetrical fashion, respectively. However, monodentate coordination of $HCO_3^-$ is observed for the Co-containing cluster and is accompanied by a decrease in reaction exothermicity. These theoretical results support the notion that metal composition can be used to develop structure-function relationships and optimize the low pressure capture efficiency and regeneration energy requirements of MOFs containing Kuratowski cluster-based SBUs. Preliminary DFT studies have only focused on monosubstituted (x=1) clusters, but similar experimental and theoretical studies can explore compositions within a range of experimentally available heterobimetallic clusters (x=1-5, M=Mn, Fe, Co, Ni, Cu, Zn). PSME can then be used to systematically vary the identity and composition of metal ions in the SBUs of MFU-4, MFU-4l, and CFA-1 prior to applying the developed $X^-/OH^-$ PSLE methodologies.

Figure 16A:
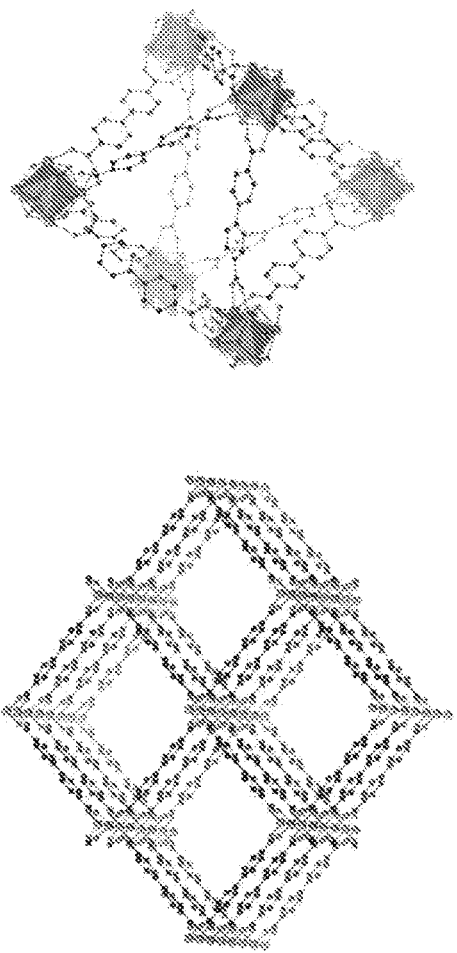
FIG. 16A illustrates the framework structures of MOF-253 and UiO-67-bpy.

Direction 2 involves incorporating M-OH chemisorption sites within MOFs containing chelating linker groups. MOF-253 and UiO-67-bpy contain bifunctional 2,2'-bipyridinedicarboxylate ($bpydc^{2-}$) linkers in which the carboxylate groups engage in framework assembly with $Al^{3+}$ and $Zr^{4+}$ ions, respectively, but the bipyridine (bpy) core remains unmetallated (FIG. 16A). Both MOFs have been studied extensively for applications in heterogeneous catalysis, and postsynthetic metal insertion (PSMI) reactions have been developed to capture and immobilize catalytically active species at the bpy functional groups. Structurally characterized examples of bpy complexes containing first row transition metals and terminal hydroxides are exceedingly rare owing to the propensity for the formation of oxo- or hydroxo-bridged dimers. Consequently, the reactivities of monomeric $(bpy)M(OH)_2$ species remain unexplored.

Figure 16B:
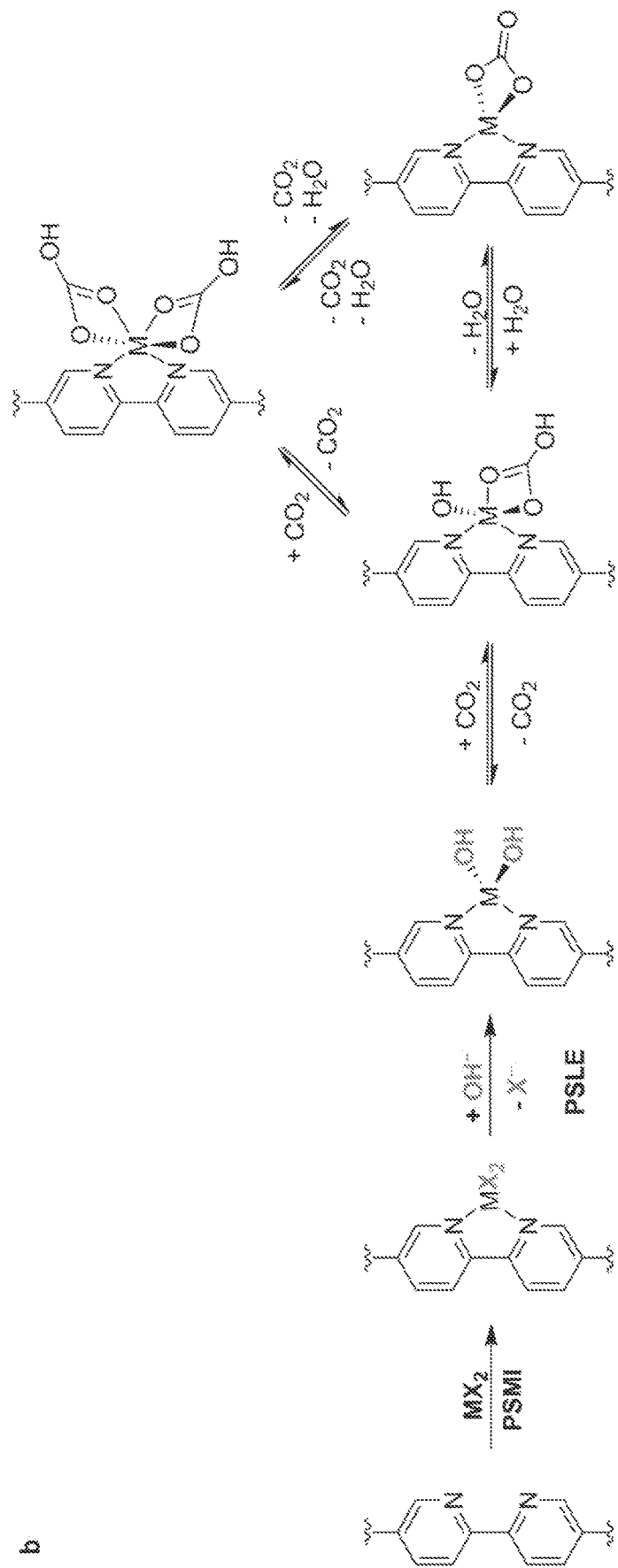
FIG. 16B illustrates a general scheme showing proposed postsynthetic modification sequence and subsequent $CO_2$ capture reaction for bpy-containing MOFs.

As part of Direction 2, PSMI will be used to immobilize first row transition metal species ($MX_2$) at the bpy sites of MOF-253 and UiO-67-bpy (FIG. 16B). Postsynthetic ligand exchange (PSLE) reactions will subsequently be used to generate highly reactive $(bpy)M(OH)_2$ groups that are unable to dimerize owing to immobilization in the MOF. These species are anticipated to function as sites for $CO_2$ chemisorption via the M-OH→M-$OCO_2$H mechanism proposed for other CA active site mimics. In addition, the presence of two terminal OH ligands may result in addition of up to two equivalents of $CO_2$ per group and/or the loss of water to form metal carbonate species. Either of these additional reaction pathways could be highly beneficial for $CO_2$ capture applications resulting in large theoretical $CO_2$ uptake capacities (17-20 wt %) and a highly exothermic chemisorption processes, respectively.

$CO_2$ uptake capacity. All of the parent benzotriazolate- and bpy-based MOFs considered in Directions 1 and 2 exhibit gas-accessible porosity and contain small pores or channels (≤20 Å in diameter) that will facilitate strong physisorption of $CO_2$. Although physisorptive interactions are not expected to be the primary mechanism for $CO_2$ capture from air, they should aid $CO_2$ uptake and chemisorption at the M-OH sites. The estimated $CO_2$ chemisorption uptakes of the benzotriazolate MOFs from Direction 1 (MFU-4-MOH, MFU-4l-MOH, and CFA-1-MOH) and Direction 2 (MOF-253-MOH and UiO-67-bpy-MOH) are presented in Table 2. The values are based on the calculated densities of Zn—OH chemisorption sites and are in the range of 12-20 wt. %, which places them among current state of the art materials such as $Mg_2(dobpdc)$-en and $Mg_2(dobpdc)$-mmen. The estimated $CO_2$ uptakes for the metal exchanged variants (i.e., MFU-4l-CoOH) would be slightly greater on a per mass basis. Within the estimated capacity range, 20-40 kg of MOF adsorbent would need to be cycled during a 24-hour period in order to capture the 4.16 kg of $CO_2$ generated by four persons in a confined space. It is difficult to project the cost of the target MOFs because the reported synthetic procedures have not been optimized for bulk production. However, the target adsorbents rely on cheap and abundant first row transition metals and recent commercialization of other designer MOF adsorbents suggest that these materials can be cost effective.

TABLE 2

Calculated density of M—OH sites and $CO_2$ uptakes for MOFs proposed in Directions 1 and 2 using M = Zn. (*The second value is based on two reactive M—OH sites per $(bpy)M(OH)_2$ group.)

| MOF | Formula | M—OH Site Density (mmol g$^{-1}$) | Est. $CO_2$ uptake (wt %) |
|---|---|---|---|
| CFA-1-MOH | $M_5(OH)_4(bibta)_3$ | 3.64 | 13.8 |
| MFU-4-MOH | $M_5(OH)_4(bbta)_3$ | 4.60 | 16.8 |
| MFU-4l-MOH | $M_5(OH)_4(btdd)_3$ | 3.37 | 12.9 |
| MOF-253-MOH | Al(OH) [bpydc-M(OH)$_2$] | 2.59/5.16* | 10.2/20.4* |
| UiO-67-bpy-MOH | $Zr_6O_4OH_4$ [bpydc-M(OH)$_2$]$_6$ | 2.20/4.40* | 8.8/17.7* |

Figure 17:
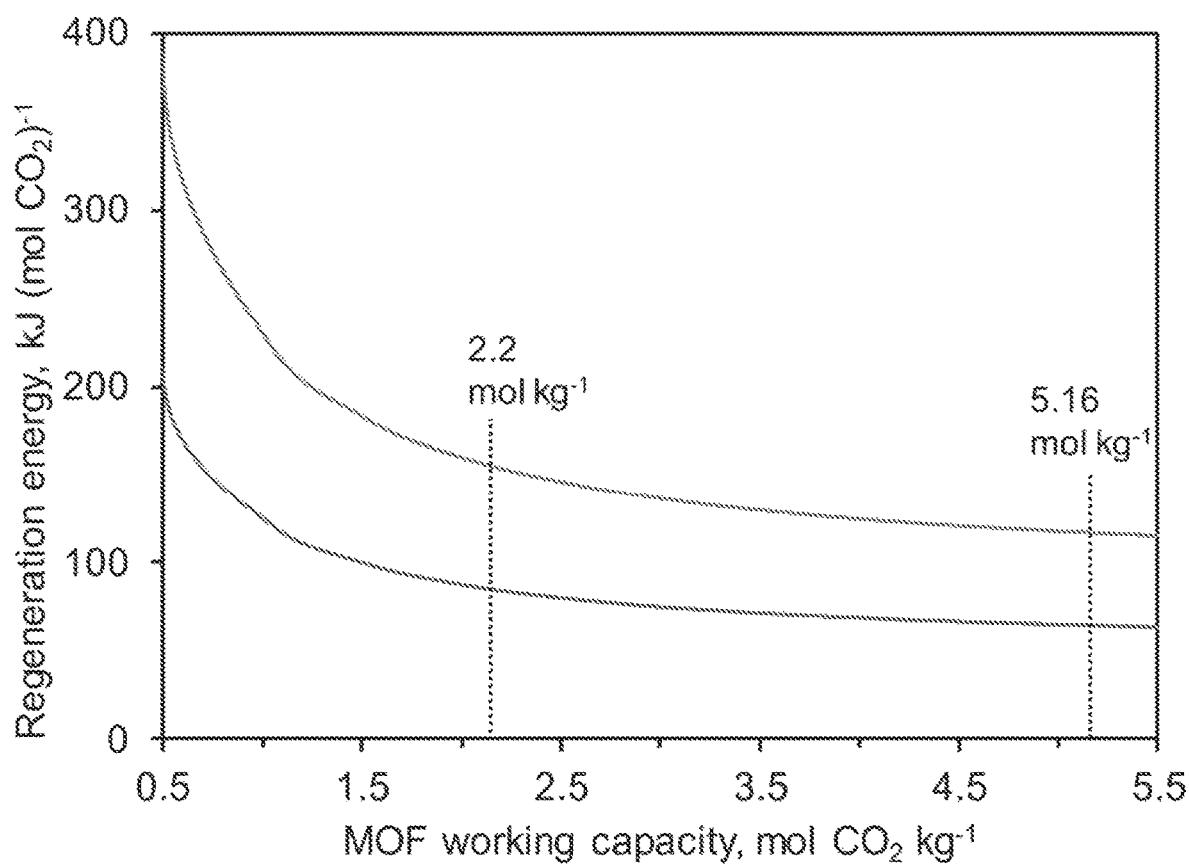
FIG. 17 illustrates regeneration energy per mol $CO_2$ adsorbed as a function of working capacity for a temperature swing of 100 K.

Regeneration requirements. An open loop pressure swing adsorption cycle that releases captured $CO_2$ into space would minimize the energy requirement for adsorbent regeneration. However, for closed loop cycling and $CO_2$ recovery, a thermal swing adsorption (TSA) process would be applied for the MOFs developed in Directions 1 and 2. FIG. 17 shows the estimated thermal regeneration energy requirement as a function of MOF working capacity for a temperature swing of 100 K. The upper (top trace) and lower (bottom trace) bounds are defined by the minimum and maximum expected specific heat capacities ($C_s$=0.76 to 1.4 J g$^{-1}$ K$^{-1}$)[43] and enthalpies of the adsorption for a M-OH→M-$OCO_2$H chemisorption process (50 to 90 kJ mol-). The exponential increase in regeneration energy at low working capacities arises from the increasing sensible heat requirement. This relationship emphasizes the need to maximize $CO_2$ capacity in order to reduce both adsorbent mass and regeneration energy cost. From the estimates in Table 3 and FIG. 17, the 20-40 kg of the MOF adsorbent necessary to capture 4.16 kg of $CO_2$ would require 4-8 hours for full regeneration with a 500 W power load.

TABLE 3

Extent of metal cation ($M^{n+}$) exchange reported for MFU-4l ($M_xZn_{5-x}(btdd)_3$).

| $M^{n+}$ | $Mn^{2+}$ | $Fe^{2+}$ | $Co^{2+}$ | $Ni^{2+}$ | $Cu^{2+}$ |
|---|---|---|---|---|---|
| x | 2 | 2 | 4 | 1.34, 2 | 2 |

Technical Approach and Methodology

Figure 18:
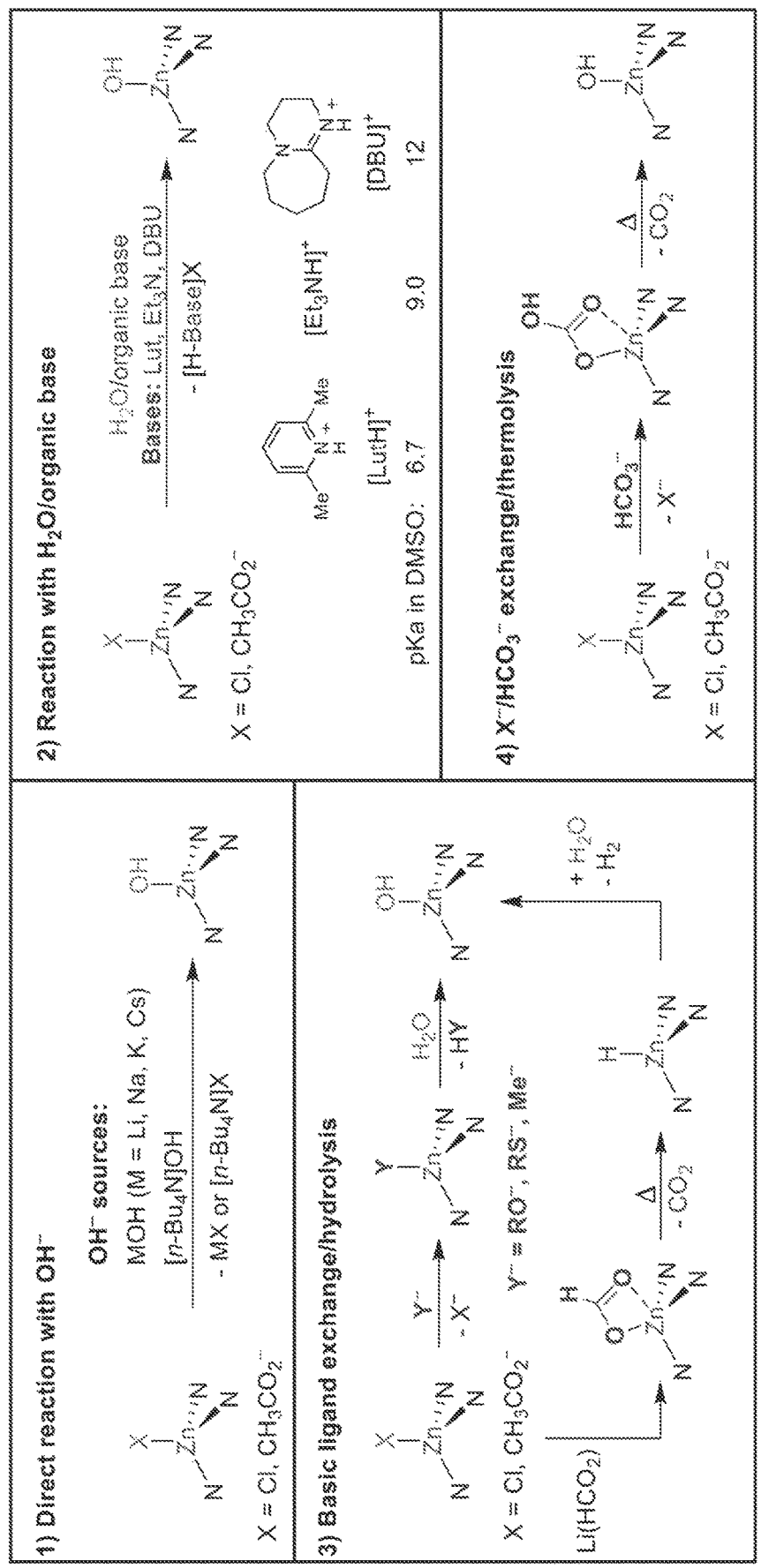
FIG. 18 illustrates proposed strategies for X—/OH— PSLE in benzotriazolate MOFs.

Direction 1. The literature procedures for synthesis of benzotriazolate MOFs MFU-4, MFU-4, and CFA-1 will be optimized for preparation on multi-gram scales. The proposed strategies for carrying out $X^-/OH^-$ PSLE in these materials are shown in FIG. 18. Although direct reaction with $OH^-$ sources such as NaOH or [n-$Bu_4$N]OH would be the most convenient route for the PSLE, the strongly basic conditions necessary to achieve complete exchange are likely to damage the frameworks, and thus some alternative strategies are proposed. Reaction of the benzotriazolate MOFs with weakly coordinating amine bases such as lutidine (Lut), triethylamine ($Et_3N$), or 1,8-diazabicyclo[5.4.0]undec-7-ene (DBU) in the presence of water offers a potentially milder method of generating $OH^-$. Moreover, the pKa's of the conjugate acids span a wide range and are soluble in most polar organic solvents, which will allow for screening of a variety of reaction conditions. A third strategy involves exchanging the X-type ligand for basic organic anions ($Y^-$) such as an alkoxides, thiolates, or alkyl groups. Subsequent reaction of the Zn—Y species with water vapor will generate Zn—OH groups concomitant with low molecular weight byproducts (alcohols, thiols, alkanes) that can be easily removed by washing or vacuum drying. $Cl^-/HCO_2^-$ ligand exchange in MFU-4l followed by thermolysis can be used to generate reactive zinc hydrides (Zn—H). Consequently, this established postsynthetic modification followed by hydrolysis of the hydride group should provide a convenient protocol for generating Zn—OH or other M-OH functionalities. Although it might seem tempting to employ the Zn—H groups for $CO_2$ capture via insertion and regeneration of Zn—$O_2CH$, the Zn—H species are not compatible with water and oxygen, and thus not well-suited for $CO_2$ extraction from air. A fourth PSLE strategy relies on X-type ligand exchange for bicarbonate followed by thermolysis. This approach bears the advantages of requiring only mildly basic bicarbonate sources and forming a more thermodynamically stable product (Zn-$O2COH$) than direct $X^-/OH^-$ exchange.

Postsynthetic metal exchange (PSME) has been studied for MFU-4l, leading to generation of the heterobimetallic MOFs listed in Table 3. Co/Zn PSME has been reported for CFA-1, but was not successful for MFU-4. Nevertheless, Co-MFU-4 [$C_5Cl_4(bibta)_3$] can be obtained by direct solvothermal reaction of $H_2$(bbta) with $CoCl2$. The extent of metal cation exchange in MFU-4l can be controlled by varying the concentration of the exogenous metal salt and temperature, but the values of x given in Table 3 have generally been observed as upper limits. Other early first row transition metal ions such as $Cr^{2+/3+}$ and $Ti^{3+/4+}$ have also been shown to exchange in MFU-4, but may not be preferred for direct $CO_2$ capture from air owing to the 02 sensitive nature of $Cr^{2+}$ and $Ti^{3+}$ and the poor nucleophilic character of $Cr^{3+}$—OH and $Ti^{4+}$—OH species. Metal-exchanged analogues of CFA-1 and MFU-4l will be prepared using the established PSME protocols and subjected to $X^-/OH^-$ PSLE methods optimized for the Zn-based MOFs.

The products of the PSLE and PSME reactions will be characterized by powder X-ray diffraction (PXRD) and $N_2$ sorption analysis to confirm that the structures and porosity are maintained. IR and NMR spectroscopies and elemental analysis via inductively coupled plasma optical emission spectrometry (ICP-OES) will be used to determine the extent of the PSLE and PSME reactions. The products are anticipated to be highly sensitive to $CO_2$ present under ambient conditions, and thus, will be carefully handled in inert atmosphere gloveboxes. $CO_2$ adsorption analysis and FT-IR and UV-Vis spectroscopic experiments will also provide a means of characterizing and quantifying the number of M-OH sites and are described in more detail below.

Figure 19:
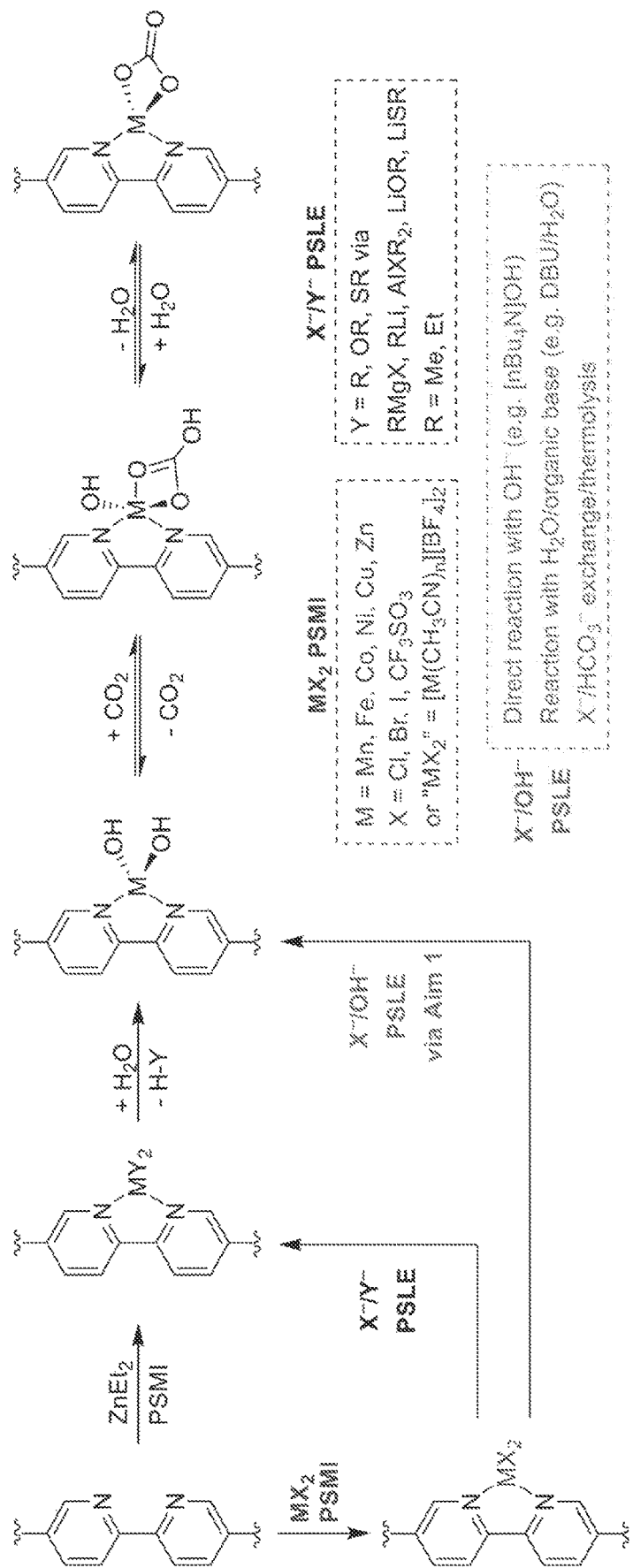
FIG. 19 illustrates proposed strategies for PSMI and PSLE in MOF-253 and UiO-67-bpy.

Direction 2. MOF-253 and UiO-67-bpy will be synthesized following reported procedures. Postsynthetic metal insertion (PSMI) reactions of the bpy-containing MOFs with $ZnEt_2$ followed by hydrolysis with water vapor will provide facile access to immobilized (bpy)Zn(OH)$_2$ species (FIG. 19) Similar to Direction 1, a systematic investigation of first row transition metals will be carried out as a means of building structure-function relationships. However, analogous organometallic precursors with small alkyl ligands (Me or Et) are not readily accessible for other first row transition metals. Thus, alternative strategies involving PSMI followed by PSLE will investigated for Mn, Fe, Co, Ni, and Cu. Importantly, several previous studies have shown that MOF-253 and UiO-67-bpy can be metalated in nearly quantitative yields (1:1 M:bpy linker) using metal dihalide precursors. Acetonitrile complexes of the form [M(CH$_3$CN)n](BF$_4$)$_2$ are also available for all of the metals considered in this study and are expected to be more amenable to PSMI and PSLE reactions than metal dihalide precursors. The $X^-/Y^-$ and $X^-/OH^-$ PSLE strategies planned for (bpy)MX$_2$ MOFs are analogous to those proposed in Direction 1 and similar methods of structural and spectroscopic characterization will be applied.

Characterization of $CO_2$ Uptake by Materials Developed in Directions 1 and 2.

Volumetric, single component isotherms. The $CO_2$ capture properties of the MOFs synthesized in Directions 1 and 2 will be characterized by measuring single component adsorption isotherms. This data will be used to determine the best candidates for further testing of low pressure $CO_2$ capture. In line with the adsorbent mass and regeneration energy considerations previously discussed, a target criterion will be a $CO_2$ capacity of ≥2 mmol g$^{-1}$ (8.1 wt %) at 5 mbar (~4933 ppm) and 283 K. The isosteric enthalpies of adsorption will be estimated by fitting $CO_2$ adsorption isotherms at a series of temperatures (273-313 K) and applying the Clausius-Clapeyron equation. When plotted a function of $CO_2$ loading, the resulting data will provide information about the density and $CO_2$ affinity of M-OH chemisorption sites as well as physisorptive processes that occur at higher loadings. It may be possible to distinguish chemisorption processes occurring at different M-OH sites in MOFs containing heterobimetallic M$_x$Zn$_{5-x}$(bt)$_3$ clusters. However, it is more likely that the equilibrium measurements will exhibit average enthalpies that reflect the distribution of sites. Therefore, systematic analyses and comparison of data for MOFs containing clusters with x=0-4 will be necessary to develop composition-function relationships.

Temperature swing adsorption measurements. Thermogravimetric analysis (TGA) will be used to carry out temperature swing adsorption measurements using simulated air containing ≤4933 ppm $CO_2$ with a 21% 02 and 79% $N_2$ balance. The resulting data will be used to determine the $CO_2$ working capacity and optimal regeneration temperature. The kinetics of adsorption and desorption will also be evaluated as part of these measurements since practical application of these materials in the CDRA will require that both processes occur on a reasonable time scale. Further testing will involve extended adsorption-desorption cycling and testing at various humidities (25-85% RH) in order to determine adsorbent stability and compatibility with humid air. Since these are time consuming measurements, the experiments will initially be limited to the number of cycles that can be achieved in a 72 h period.

Structural and spectroscopic characterization. PXRD analysis will be performed on all samples after $CO_2$ adsorption-desorption cycling to determine if any changes in performance can be attributed to loss of crystallinity or structural changes. Variable temperature PXRD experiments under atmospheres with varying $CO_2$ concentration will also be used to determine if the MOFs undergo structural changes during $CO_2$ adsorption-desorption cycling. In particular, analogues of MOF-253, namely MIL-53, have been characterized as breathing frameworks that undergo large structural changes upon adsorption-desorption of guest molecules. These structural changes may improve the $CO_2$ selectivity, but could negatively impact the rates of adsorption/desorption. Diffuse reflectance infrared Fourier transform (DRIFTS) and UV-Vis (DRUVS) spectroscopies will be used to monitor functional group and electronic structure changes during $CO_2$ adsorption-desorption cycling in a controlled environment chamber. DRIFTS can be used to monitor $CO_2$ chemisorption and ascertain the binding modes (i.e. monodentate versus chelating) of the resulting bicarbonate and carbonate ligands via changes in the energy and symmetry of vibrational modes involving O—H and C—O bonds. The d-d electronic transitions of first row transition metals such as Co and Ni are very sensitive to changes in coordination number and ligand field strength. Consequently, in situ DRUVS will provide valuable information about changes in electronic structure of these metals upon chemisorption of $CO_2$.

Computational studies. DFT calculations will be used to gain insight into structural features of the chemisorption sites and aid in the interpretation of IR and UV-Vis spectroscopic changes. Similar to the preliminary DFT study, the calculations will utilize small clusters or complexes that effectively model the chemisorption sites, but do not require extensive computational resources.

Example 4. Expanding the Library of MOFs Functionalized with Lewis Basic M-OH Groups MOFs Containing $M_4Cl$ SBUs with Nucleophilic M-OH Groups MOFs containing SBUs with terminal M-X groups (X=$Cl^-$, $Br^-$, $I^-$, $OAc^-$) in which M is a divalent metal are uncommon. Of those reported, most contain monometallic SBUs with poor chemical stability or do not exhibit significant gas-accessible porosity upon desolvation. The Kuratowski cluster-based MOFs described above represent the only family of chemically and thermally robust, porous materials that contain terminal M-X functionalities.

Figure 20A:
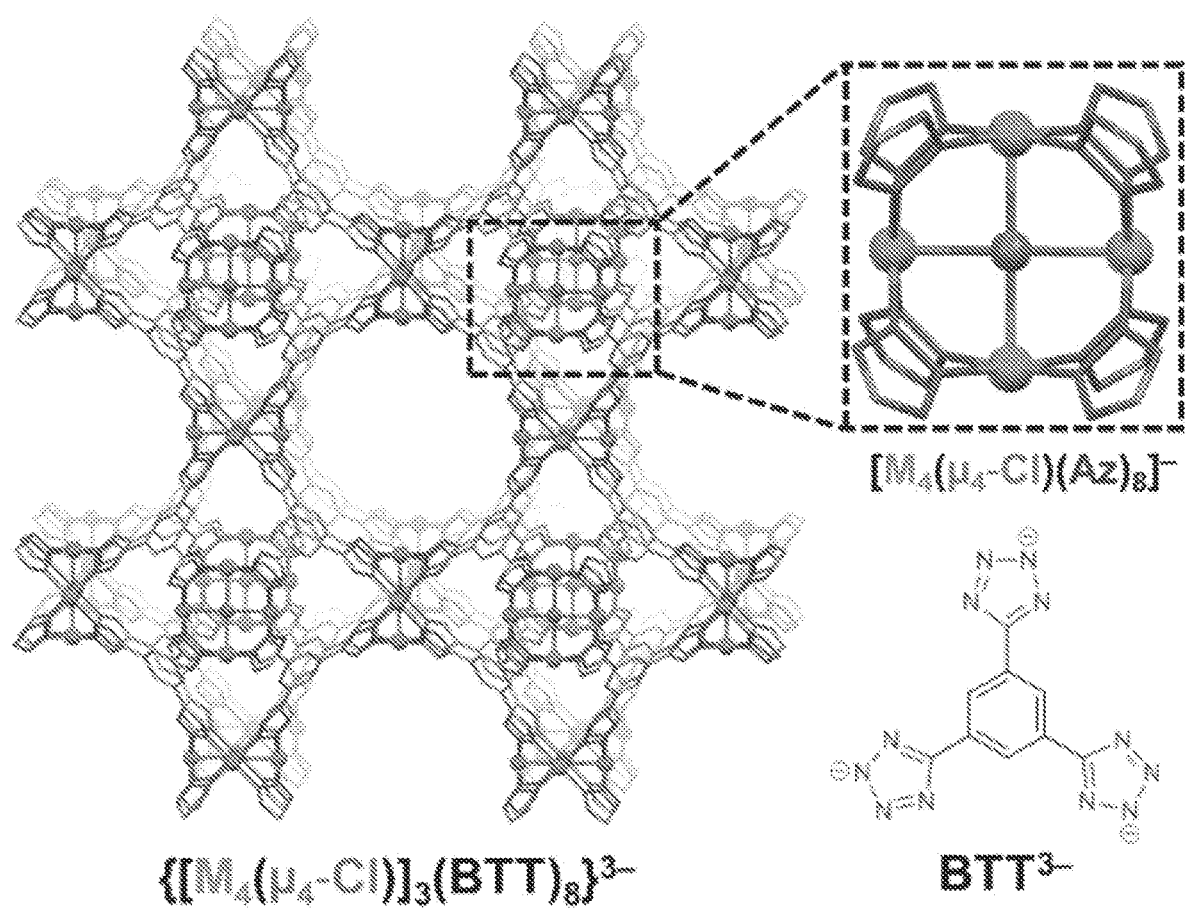
FIG. 20A illustrates the structure of sodalite-type framework with tritopic BTT3-linkers.
Figure 20B:
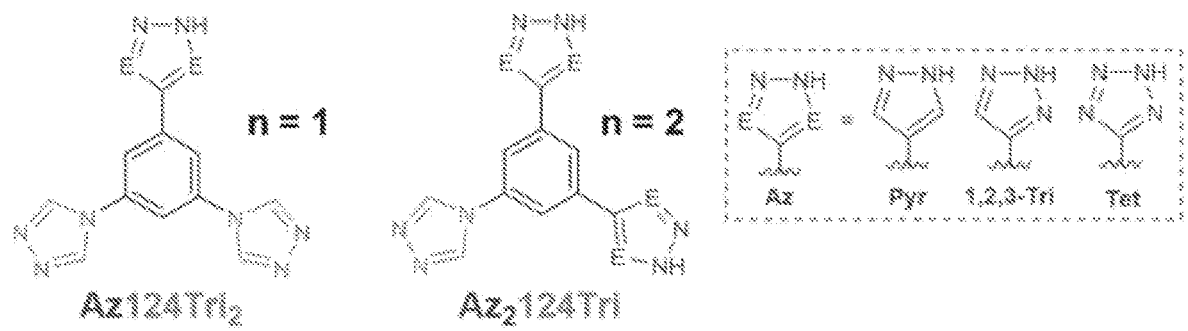
FIG. 20B illustrates proposed mixed donor ligands containing neutral 1,2,4-triazole donor groups along with calculated empirical formulas for charge inverted $M_4Cl$ SBUs.
Figure 20B:
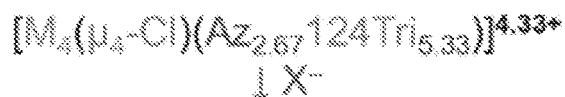
Figure 20B:
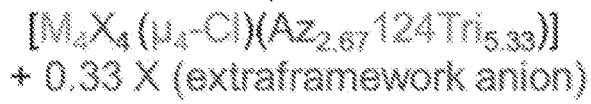
Figure 20B:
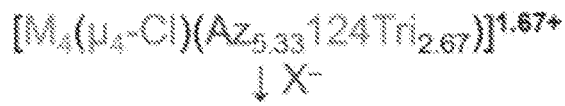
Figure 20B:
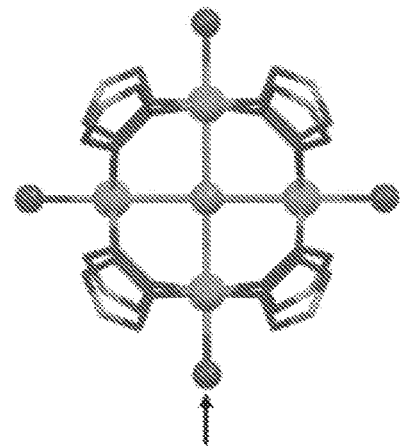

As a general design principle, decreasing the anionic charge of organic linkers used for MOF assembly should favor the formation of SBUs with additional charge balancing anions. MOFs adopting the sodalite-type framework and $[M_4(\mu_4\text{-}Cl)(\text{azolate})_8]^-$ or $[M_4(\text{azolate})_8]$ SBUs (M=Mn, Fe, Co, Ni, Cu; azolate=pyrazolate, triazolate, tetrazolate) can be used in gas sorption applications (FIG. 20A). The metal cations in the 8-connected $M_4Cl$ (or $M_4$) SBUs adopt octahedral coordination geometries upon solvent coordination. Moreover, the presence of the $\mu_4$-$Cl^-$ ligand results in negatively charged SBUs that are charge balanced by $H^+$ or extra-framework metal cations. By replacing the anionic azolate groups of the tritopic linker with neutral 1,2,4-triazole substituents, the charge on these frameworks can be inverted to provide cationic metal clusters (FIG. 20B). Charge compensation for the cationic clusters should then be provided by coordination of terminal X-type ligands such as halides or hydroxide to the remaining coordination sites.

Figure 21:
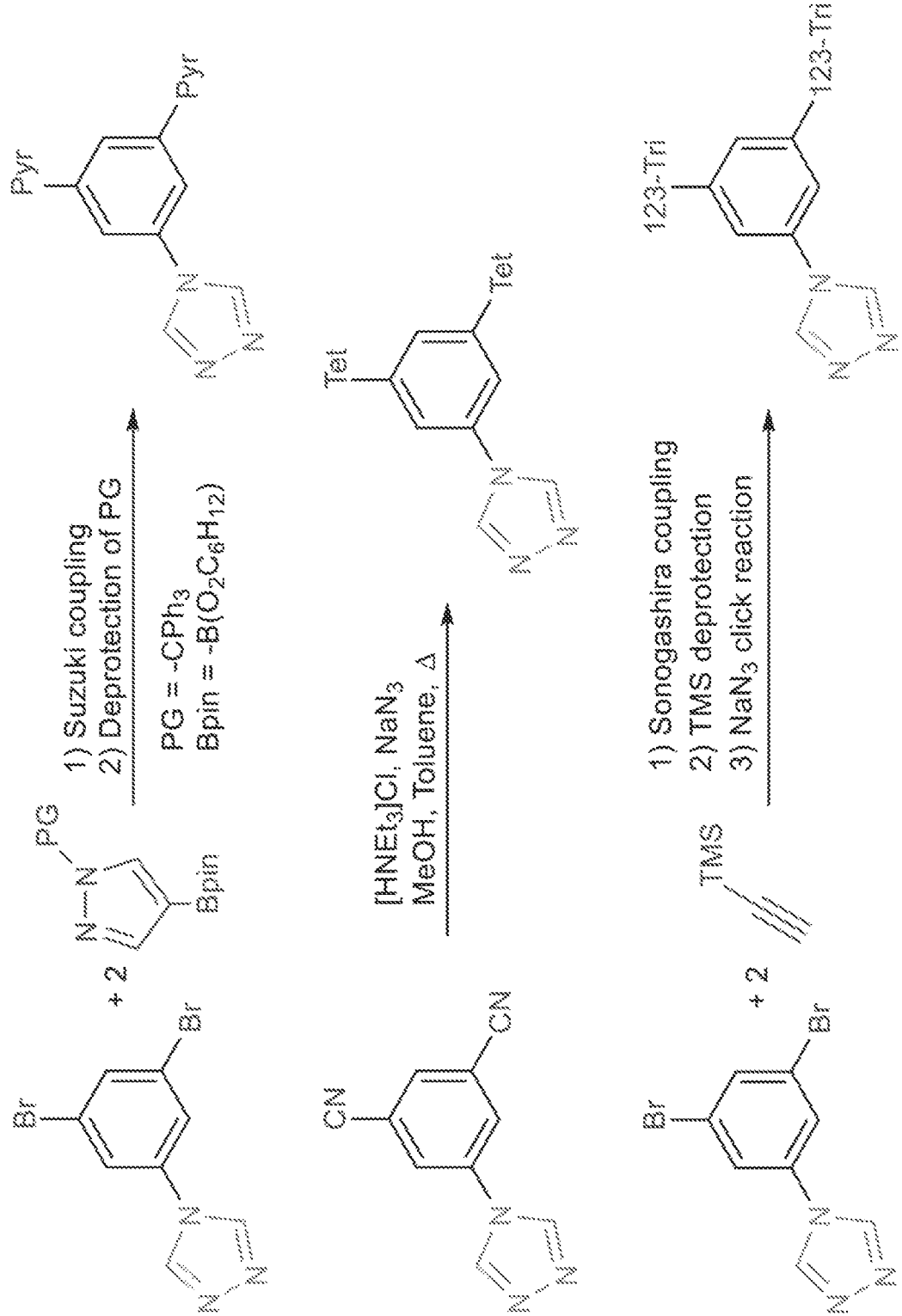
FIG. 21 illustrates proposed tritopic azole linkers containing neutral 1,2,4-triazole donor groups, as well as potential synthetic routes that can be used to prepare the proposed linkers.

Thus, new tritopic azole linkers Az124Tri$_2$ and Az$_2$124Tri will be prepared as a means of obtaining a new family of robust and porous MOFs with M-X groups that can be used to generate nucleophilic M-OH sites. The anionic azolate groups of proposed ligands can be varied as pyrazolate, tetrazolate, or 1,2,3-triazolate. These groups display similar propensities for forming $M_4Cl$ or $M_4$ SBUs, but vary in donor strength, which will allow us to tune the electronic properties of the resulting M-X groups. Moreover, the maximum theoretical density of M-OH chemisorption sites (n=1, FIG. 20B) is 3.7 mmol $g^{-4}$, which is comparable to CFA-1. Proposed routes for the synthesis of Az124Tri$_2$ and Az$_2$124Tri ligands are shown in FIG. 21.

Example 5. Additional Proposed M-OH Bearing MOFs

Figure 22:
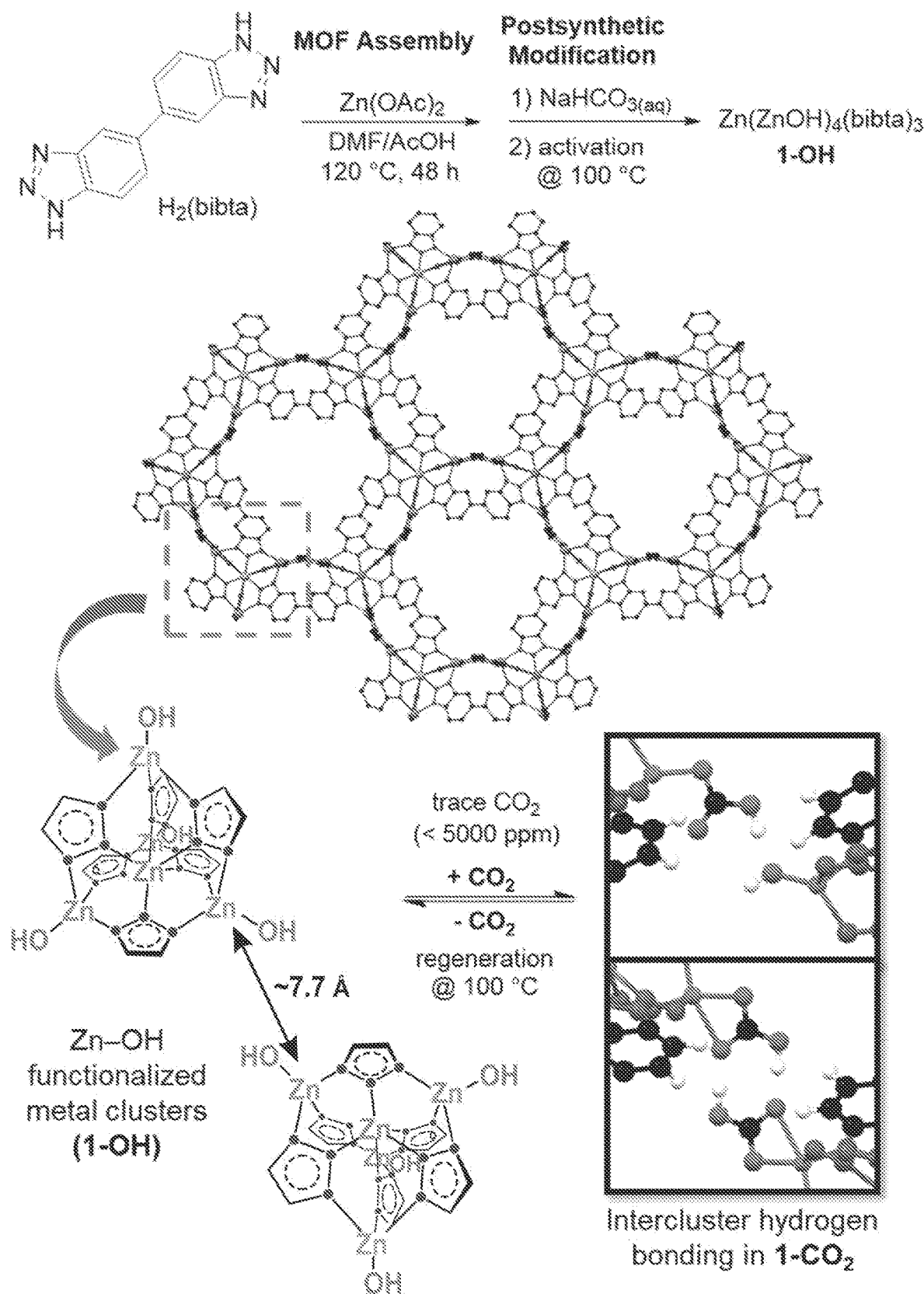
FIG. 22 illustrates the synthesis (top), structure (middle), and $CO_2$ binding mechanism (bottom) of 1-OH.
Figure 23A:
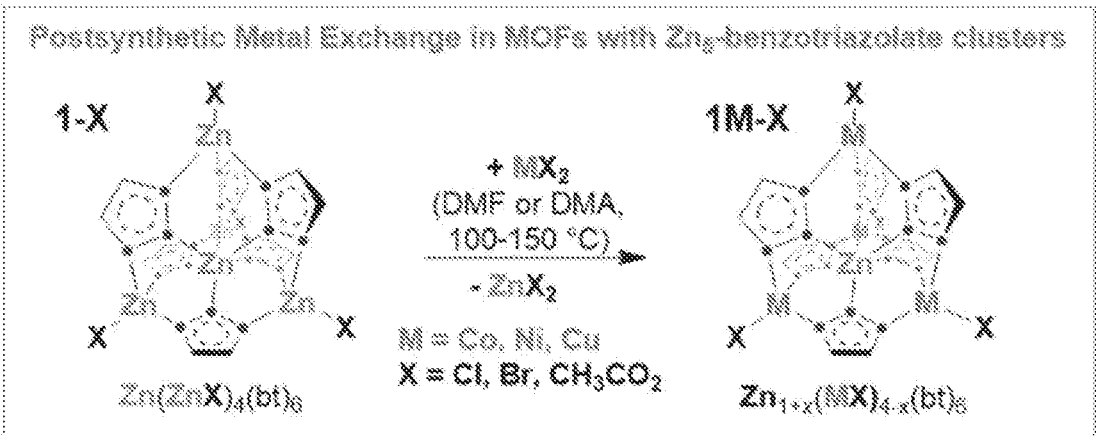
FIG. 23A illustrates the synthesis of metal-exchanged analogues of 1-X.
Figure 23B:
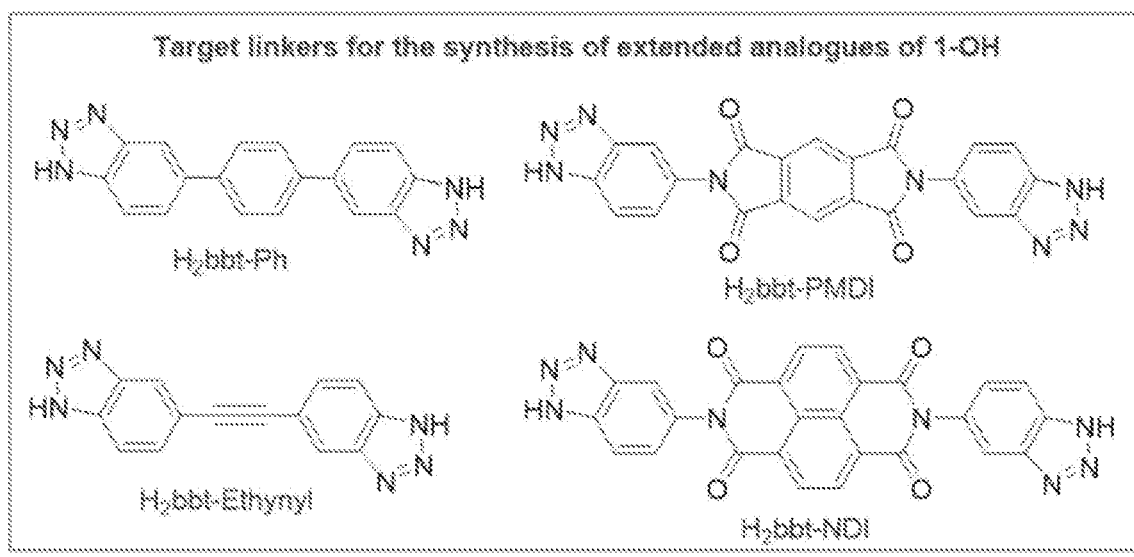
FIG. 23B illustrates linkers for constructing extended isoreticular analogues of 1-OH.
Figure 23C:
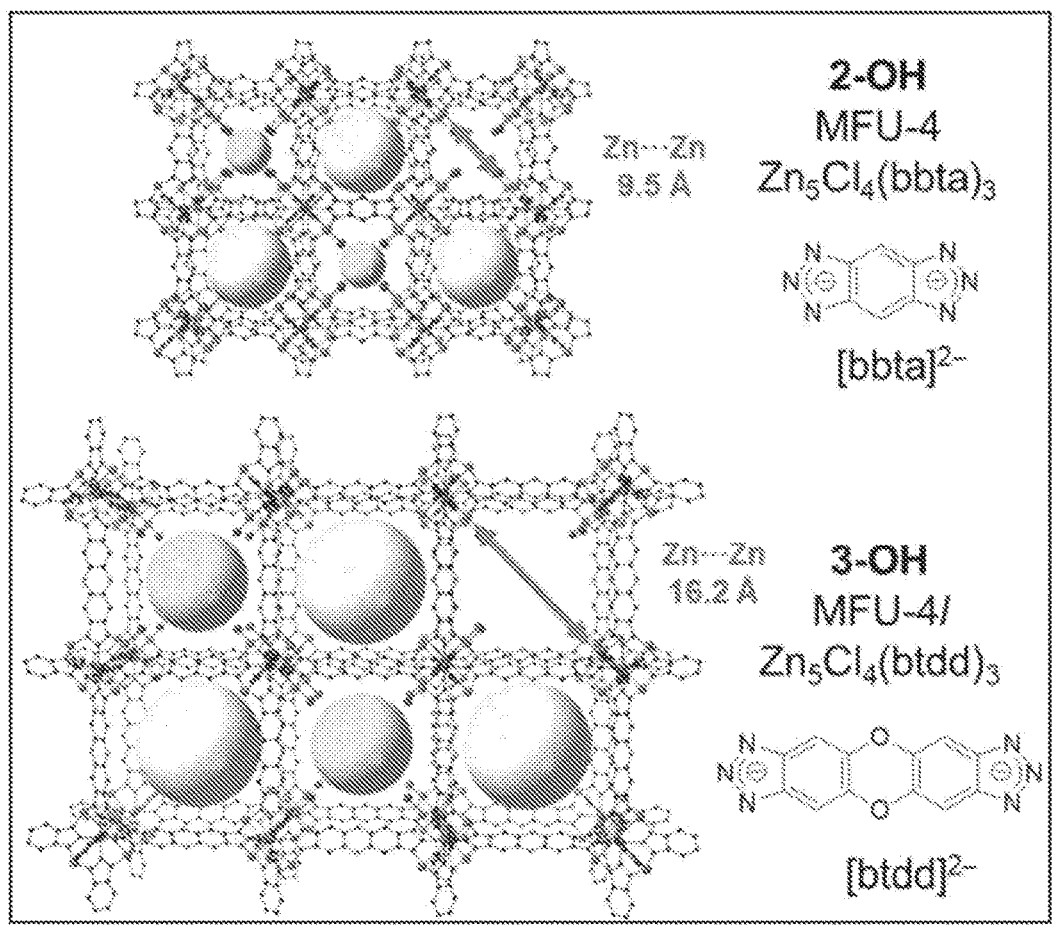
FIG. 23C illustrates benzotriazolate MOFs that adopt a pcu topology.

Metal-organic frameworks (MOFs) have emerged as state-of-the-art adsorbents for molecular separation processes owing to their well-defined porous structures and tunable chemical functionality. While MOFs containing Lewis acidic metal-sites have been widely studied for gas separation applications, materials with Lewis basic functionalities have been much less developed. This knowledge gap has prompted us to explore synthetic methods to generate nucleophilic transition metal hydroxide (M-OH) groups at the Kuratowski-type inorganic building units of benzotriazolate MOFs (FIG. 22). These efforts have led to the design of 1-OH, which shows excellent performance for low pressure $CO_2$ capture via a $CO_2$/$HCO_3^-$ fixation mechanism. Spectroscopic data and a computational study revealed that cooperative inter-cluster hydrogen bonding interactions provide an important contribution to the $CO_2$ capture performance of this material. In addition to Zn-based 1-X, we have developed synthetic routes to metal-exchanged analogues (1M-X) containing Co—X, Ni—X, or Cu—X groups (FIG. 23A). Continuing synthetic work has been aimed at using extended organic linkers to generate isoreticular structures with larger intercluster distances (FIG. 23B) and targeting other topologies of benzotriazolate MOFs with nucleophilic M-OH groups (2-OH and 3-OH, FIG. 23C).

This example describes efforts aimed at exploiting the features that enable strong and selective $CO_2$ capture in 1-OH for the design of materials for other gas separation processes. The work will focus on advancing three specific design features: i) nucleophilic functional groups that have rarely been available in MOFs; ii) the presence of metal sites with X-type ligands that can be readily exchanged to introduce new types of pore surface functionalities; iii) cooperative guest binding mechanisms. The specific objectives of the example include:

1) Develop structure-function and composition-function relationships to inform the design of MOFs containing Lewis basic M-OH groups for selective adsorption of trace gases including $SO_2$, $NO_2$, and acetylene.

2) Explore the use of other metal-based functional groups (M-X) for selective gas adsorption via cooperative binding interactions.

Objective 1

The M-OH functionalized MOFs discussed above were initially designed with $CO_2$ adsorption in mind, but the chemisorption mechanism, namely nucleophilic activation of adsorbate and cooperative hydrogen bonding interactions, should also be relevant for capture of other gases. Similar to $CO_2$, $SO_2$ and $NO_2$ are susceptible to nucleophilic attack by $OH^-$, suggesting that M-OH functionalized MOFs should be good adsorbents for trace capture of these gases. Both gases are highly toxic, and advanced adsorbents could be developed and applied in personal protective equipment or purification of gas streams for catalytic processes. Several MOFs have been studied for $SO_2$ and $NO_2$ capture, but have typically not achieved high adsorption capacities at low partial pressures or suffer from deleterious side reactions with the reactive gases.

Figure 24:
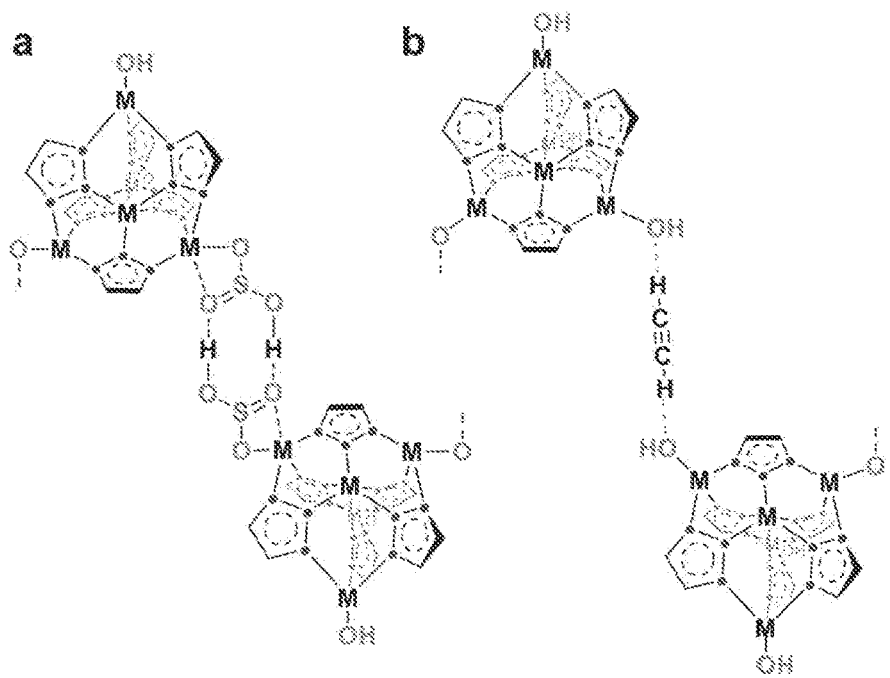
FIG. 24 illustrates the cooperative binding of $SO_2$ (a) and $C_2H_2$ (b) between MOF-supported M-OH sites.

As part of Objective 1, we will investigate the $SO_2$ and $NO_2$ adsorption properties of M-OH functionalized MOFs. Aside from the potential applications, this will offer fundamental insight into the reactivity and stability of M-OH functionalized MOFs. For example, $SO_2$ and $CO_2$ have similar kinetic diameters (3.6 Å vs 3.3 Å) and are expected to adsorb via similar nucleophilic addition mechanisms (FIG. 24). This mechanistic hypothesis raises an interesting question as to whether M-OH functionalized adsorbents can exhibit selectivity for $SO_2$ over $CO_2$, or vice versa. On the other hand, $NO_2$ is a highly reactive adsorbate that can undergo side reactions and disproportionation processes, offering several mechanistic possibilities. Consequently, density functional theory (DFT) calculations will help predict and atomistically understand the selectivity and mechanisms of adsorption of these gases as a function of metal and linker identity and framework structure.

In addition to $SO_2$ and $NO_2$ capture, we also seek to develop M-OH functionalized MOFs for acetylene separation. Acetylene is generated as a byproduct of ethylene production and must be separated from gas feeds to prevent poisoning of catalysts used for polyethylene production. Adsorptive separation processes have been investigated as a more efficient alternative to solvent extraction or partial hydrogenation methods. However, acetylene/ethylene separation requires extraction of trace amounts of acetylene (~1%) from gas streams, demanding that viable adsorbents exhibit high selectivity and capacity at low partial pressures of acetylene. Adsorbents containing Lewis acidic metal sites often have a strong affinity for both molecules, making it difficult achieve high selectivity. Pore size optimization and the introduction of Lewis basic binding sites have resulted in MOFs that show much better selectivity for acetylene adsorption, but these materials still exhibit modest adsorption capacities at low acetylene concentrations.

Late transition metal hydroxide complexes can react with terminal alkynes in solution to afford acetylide complexes. This reactivity stems from the strong basicity of M-OH species and relatively low pKa of alkynyl C—H groups (pKa 24-25). In a gas phase adsorption process, the formation of hydrogen bonding interactions between the acetylene C—H bonds and basic OH groups will allow for cooperative binding and selectivity over ethylene, which contains much less acidic olefinic C—H groups (pKa 40-50) (FIG. 24). Intercluster M . . . M distances in the range of 8-12 Å will facilitate cooperative acetylene binding between M-OH functionalized clusters. The Zn . . . Zn distance in 1-OH (~7.7 Å) gives rise to an intercluster pocket that is likely too small for cooperative binding of acetylene. However, isoreticular analogues assembled from the extended linkers shown in FIG. 23B will have longer M . . . M distances in the appropriate range. DFT calculations can be used to investigate candidate structures for their relative binding strength of acetylene versus ethylene and identify optimized MOF structures and compositions.

The compositions, devices, systems, and methods of the appended claims are not limited in scope by the specific devices, systems, and methods described herein, which are intended as illustrations of a few aspects of the claims. Any compositions, devices, systems, and methods that are functionally equivalent are intended to fall within the scope of the claims. Various modifications of the compositions, devices, systems, and methods in addition to those shown and described herein are intended to fall within the scope of the appended claims. Further, while only certain representative compositions, devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method of forming a porous metal-organic framework (MOF) comprising one or more metal-hydroxide moieties for use in the capture of an acidic gas, the method comprising:
    providing a precursor MOF comprising a plurality of metal ions, each coordinated with an auxiliary ligand and at least one backbone ligand, wherein the at least one backbone ligand comprises a first coordination moiety and a second coordination moiety; and
    reacting the precursor MOF under conditions effective to perform postsynthetic ligand exchange of the auxiliary ligand for a hydroxide ligand, thereby forming the MOF comprising one or more metal-hydroxide moieties.

2. The method of claim 1, wherein reacting the precursor MOF under conditions effective to perform postsynthetic ligand exchange comprises direct reaction with hydroxide.

3. The method of claim 2, wherein the direct reaction with hydroxide comprises contacting the precursor MOF with a hydroxide source.

4. The method of claim 3, wherein the hydroxide source is selected from the group consisting of NaOH, KOH, LiOH, CsOH, a tetraalkylammonium hydroxide, or a combination thereof.

5. The method of claim 1, wherein reacting the precursor MOF under conditions effective to perform postsynthetic ligand exchange comprises reaction with water and an organic base.

6. The method of claim 5, wherein the reaction with water and an organic base comprises contacting the precursor MOF with an aqueous solution comprising an organic base, such as 2,6-Lutidine (Lut), a trialkylamine, 1,8-Diazabicyclo[5.4.0]undec-7-ene (DBU), or a combination thereof.

7. The method of claim 6, wherein the organic base is selected from the group consisting of 2,6-Lutidine (Lut), a trialkylamine, 1,8-Diazabicyclo[5.4.0]undec-7-ene (DBU), or a combination thereof.

8. The method of claim 1, wherein reacting the precursor MOF under conditions effective to perform postsynthetic ligand exchange comprises basic ligand exchange and hydrolysis.

9. The method of claim 8, wherein the basic ligand exchange and hydrolysis comprises contacting the precursor MOF with a nucleophile, such as an alkoxide or a thiolate, followed by hydrolysis.

10. The method of claim 8, wherein the basic ligand exchange and hydrolysis comprises contacting the precursor MOF with formate, followed by heating the precursor MOF to drive off carbon dioxide and hydrolysis.

11. The method of claim 1, wherein reacting the precursor MOF under conditions effective to perform postsynthetic ligand exchange comprises bicarbonate exchange followed by thermolysis.

12. The method of claim 1, wherein the plurality of metal ions are selected from the group consisting Mn, Fe, Co, Ni, Cu, Zn, and combinations thereof.

13. The method of claim 1, wherein the one or more metal-hydroxide moieties are present in the MOF comprising the one or more metal-hydroxide moieties at a M-OH site density of from 1.5 mmol $g^{-1}$ to 7.5 mmol $g^{-1}$.

14. The method of claim 1, wherein the first coordination moiety and the second coordination moiety comprise carboxylate moieties.

15. The method of claim 14, wherein the at least one backbone ligand is defined by the formula below

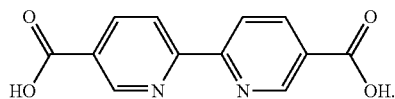

16. The method of claim 1, wherein the first coordination moiety comprises a heterocyclic moiety and the second coordination moiety comprise a carboxylate moiety.

17. The method of claim 16, wherein the at least one backbone ligand is defined by the formula below

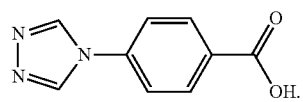 [SMILES: O=C(O)c1ccc(-n2cnnc2)cc1]

18. The method of claim 1, wherein the first coordination moiety and the second coordination moiety comprise heterocyclic moieties.

19. The method of claim 18, wherein the heterocyclic moieties comprise triazole moieties.

20. The method of claim 19, wherein the at least one backbone ligand comprises one or more ligands defined by the formula below

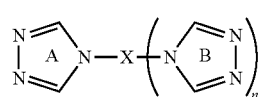

wherein n is 1, 2, or 3, and X represents one or more bonds formed between ring A and each ring B.

21. The method of claim 20, wherein X comprises a phenyl, adamantyl, or azaadamantyl moiety.

22. The method of claim 21, wherein the at least one backbone ligand comprises one of the following

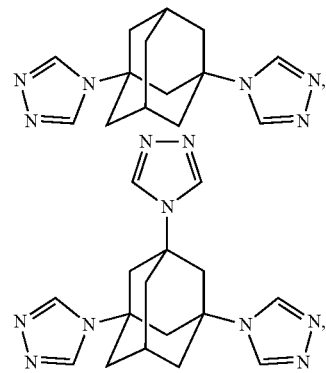

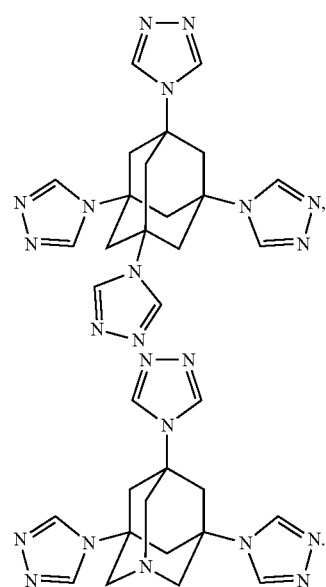

23. The method of claim 19, wherein the at least one backbone ligand comprises one or more ligands defined by the formula below

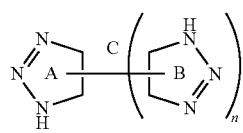

wherein n is 1, 2, or 3, and C represents one or more bonds formed between ring A and each ring B.

24. The method of claim 23, wherein n is 1.

25. The method of claim 24, wherein the at least one backbone ligand comprises one of the following

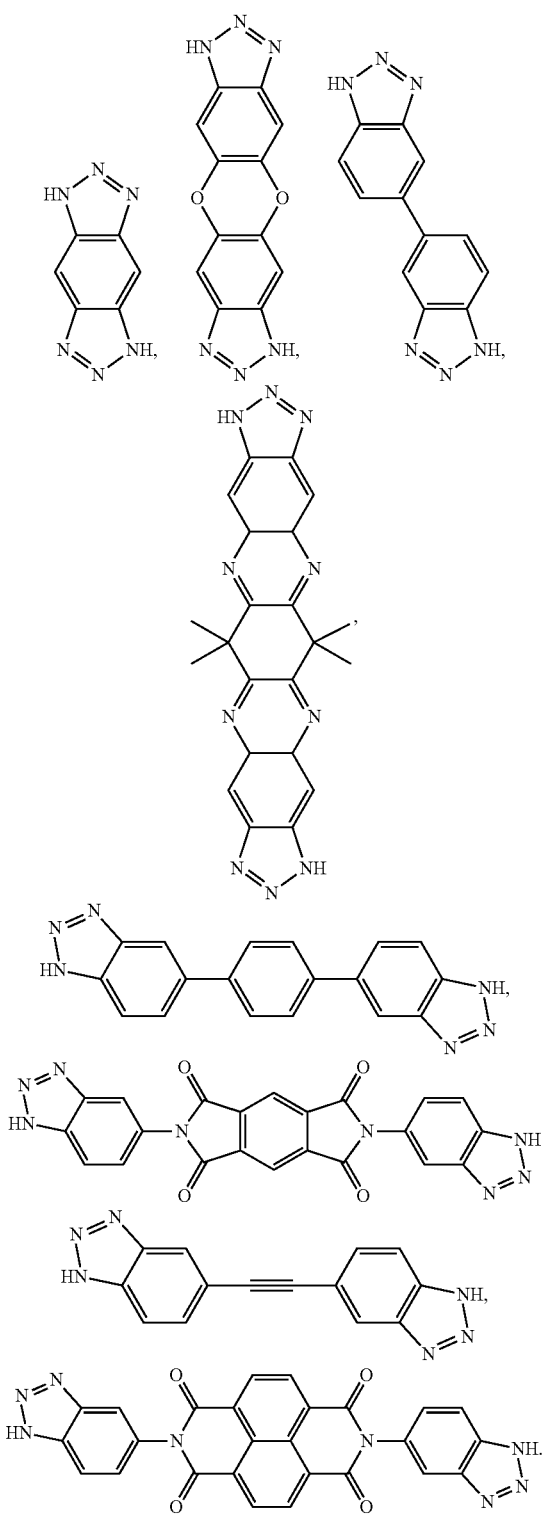

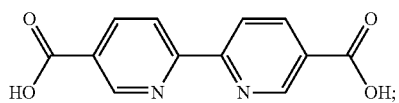 [SMILES: O=C(O)c1ccc(-c2ccc(C(=O)O)cn2)nc1]

metal-metal distance, measured between metal centers of neighboring SBUs by x-ray crystallography, of from 5 Å to 15 Å.

29. The method of claim 1, wherein the MOF comprising one or more metal-hydroxide moieties comprises a CFA-1, MFU-4, or MFU-4l type framework.

30. The method of claim 1, wherein the auxiliary ligand is selected from the group consisting of a halide (e.g., Cl, I, and Br), aliphatic and aromatic carboxylates (e.g., acetate, propionate, butanoate, and benzoate), triflate, nitrate, sulfate, hydrogen sulfate, phosphate, hydrogen phosphate, dihydrogen phosphate, perchlorate, azide, cyanide, nitrite, thiocyanate, hydrogen, $C_1$-$C_4$ alkyl, $C_1$-$C_4$ alkoxy, $C_1$-$C_4$ alkylthio, and a solvent molecule.

31. A method of forming a porous metal-organic framework (MOF) comprising one or more metal-hydroxide moieties for use in the capture of an acidic gas, the method comprising:
providing a precursor MOF selected from the group consisting of MOF-253 (Al(OH)(bpydc)) and UiO-67-bpy ($Zr_6O_4(OH)_4(bpydc)_6$), wherein bpydc is defined by the formula below reacting the precursor MOF under conditions effective to perform postsynthetic metal insertion, thereby immobilizing $MX_2$ species at one or more bipyridine sites within the MOF where M represents a metal ion and X represents an auxiliary ligand; and
performing postsynthetic ligand exchange of the auxiliary ligands for hydroxide ligands, thereby forming the MOF comprising one or more metal-hydroxide moieties.

32. A porous metal-organic framework (MOF) prepared by the method of claim 1.

33. A porous metal-organic framework (MOF) comprising a plurality of metal ions, each coordinated with one or more hydroxide ligands and one or more backbone ligands, wherein each of the one or more backbone ligands comprises a first coordination moiety and a second coordination moiety.

34. A porous metal-organic framework (MOF) selected from the group consisting of MOF-253 (Al(OH)(bpydc)) and UiO-67-bpy ($Zr_6O_4(OH)_4(bpydc)_6$),
wherein bpydc is defined by the formula below

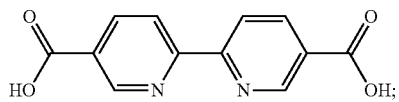 [SMILES: O=C(O)c1ccc(-c2ccc(C(=O)O)cn2)nc1]

and
wherein the MOF further comprises one or more $M(OH)_2$ species immobilized at one or more bipyridine sites within the MOF.

35. A method for capturing an acidic gas from a mixture of gases, the method comprising contacting the mixture of gases with the MOF of claim 32.

26. The method of claim 1, wherein the MOF comprising one or more metal-hydroxide moieties comprises OD secondary building units (SBUs).

27. The method of claim 1, wherein the MOF comprising one or more metal-hydroxide moieties comprises Kuratowski cluster-based secondary building units (SBUs).

28. The method of claim 1, wherein the MOF comprising one or more metal-hydroxide moieties is characterized by a

* * * * *